United States Patent
Sasaki et al.

(10) Patent No.: US 12,365,560 B2
(45) Date of Patent: Jul. 22, 2025

(54) MEDIUM PROCESSING APPARATUS AND IMAGE FORMING SYSTEM INCORPORATING SAME

(71) Applicants: Kei Sasaki, Kanagawa (JP); Kazuki Seto, Kanagawa (JP); Kohta Abe, Kanagawa (JP)

(72) Inventors: Kei Sasaki, Kanagawa (JP); Kazuki Seto, Kanagawa (JP); Kohta Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 18/331,574

(22) Filed: Jun. 8, 2023

(65) Prior Publication Data
US 2023/0416040 A1    Dec. 28, 2023

(30) Foreign Application Priority Data

Jun. 27, 2022 (JP) ................................. 2022-102733
Apr. 25, 2023 (JP) ................................. 2023-071659

(51) Int. Cl.
*B65H 37/04* (2006.01)

(52) U.S. Cl.
CPC ..... *B65H 37/04* (2013.01); *B65H 2301/5142* (2013.01); *B65H 2301/51616* (2013.01)

(58) Field of Classification Search
CPC .. B65H 2301/51616; B65H 2301/5142; B65H 37/04
See application file for complete search history.

(56) References Cited

U.S. PATENT DOCUMENTS

| 2015/0370211 | A1  |    | 12/2015 | Saitou   |           |
|--------------|-----|----|---------|----------|-----------|
| 2016/0041516 | A1  | *  | 2/2016  | Takashima | B31F 5/022 |
|              |     |    |         |          | 412/33    |
| 2017/0139367 | A1  | *  | 5/2017  | Adachi   | G03G 15/6582 |
| 2018/0339484 | A1  | *  | 11/2018 | Takahashi | B65H 37/04 |
| 2022/0394145 | A1  |    | 12/2022 | Seto et al. |        |

FOREIGN PATENT DOCUMENTS

| JP | 2014-201432    |   | 10/2014 |
|----|----------------|---|---------|
| JP | 2015101009 A   | * | 6/2015  |
| JP | 2015-166281    |   | 9/2015  |
| JP | 2016-016973 A  |   | 2/2016  |
| JP | 6171514 B2     | * | 8/2017  |
| JP | 2018-123007 A  |   | 8/2018  |

OTHER PUBLICATIONS

European Search Report dated Nov. 17, 2023 for corresponding European Patent Application 23177201.3.

* cited by examiner

*Primary Examiner* — Jennifer Bahls
(74) *Attorney, Agent, or Firm* — Harness, Dickey & Pierce, P.L.C.

(57) ABSTRACT

A medium processing apparatus includes a liquid applier, a post-processing device, and circuitry. The liquid applier includes a liquid application member that applies liquid to a part of a medium, the medium being at least one medium. The post-processing device binds a bundle of media including the medium to which the liquid is applied by the liquid applier. The circuitry changes, according to a binding condition for the post-processing device, at least one of an amount of movement of the liquid application member toward the medium or a contact time during which the liquid application member is in contact with the medium.

18 Claims, 31 Drawing Sheets

CONVEYANCE DIRECTION →

MAIN SCANNING DIRECTION

FIG. 16A

| BASIS WEIGHT | 0 | 1 | 2 | 3 |
|---|---|---|---|---|
| T | 1 | 1 | 1 | 2 |

FIG. 16B

| NUMBER OF SHEETS TO BE BOUND | 2-5 | 6-10 | 11-15 | 16-20 |
|---|---|---|---|---|
| N | 1 | 2 | 3 | 4 |

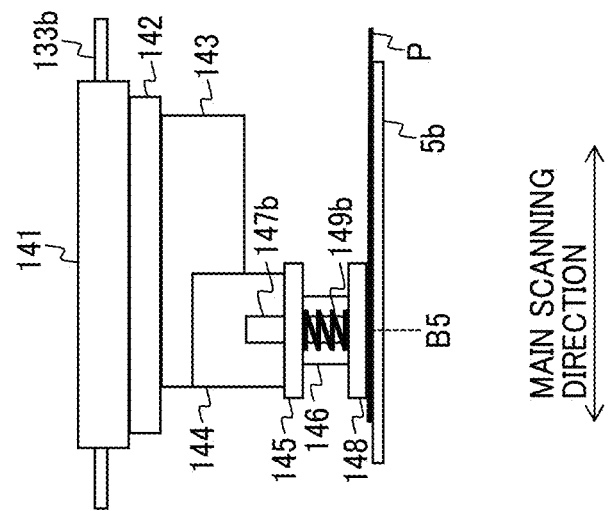
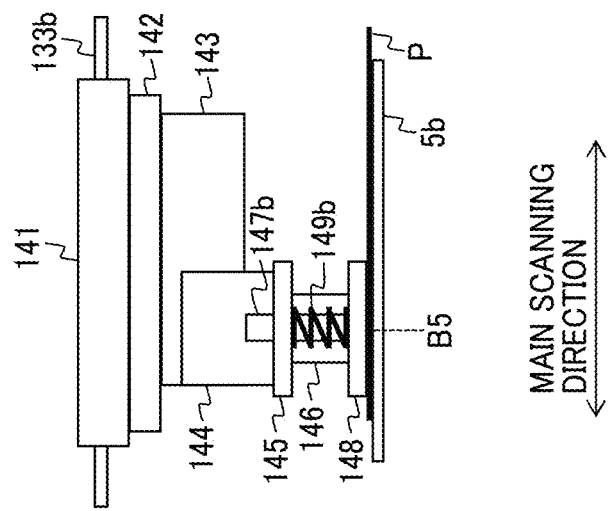
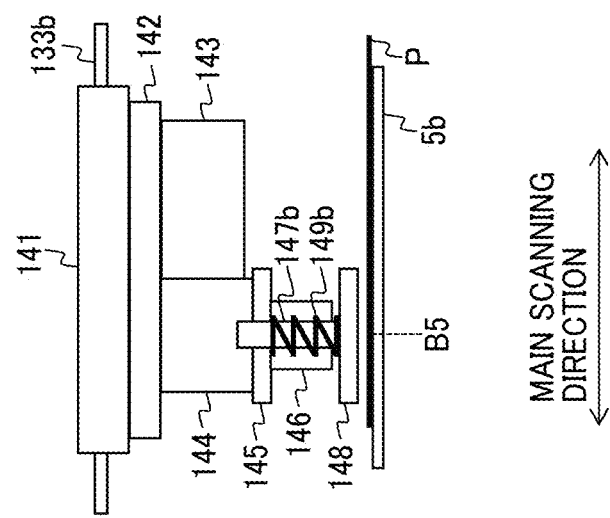

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2022-102733, filed on Jun. 27, 2022, and 2023-071659, filed on Apr. 25, 2023, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Related Art

Medium processing apparatuses are known in the related art that bind, into a bundle, sheet-shaped media on which images are formed by image forming apparatuses. Since sheets of paper are widely known as an example of sheet-shaped media, a "sheet bundle" that is a stack of sheets of paper is used as an example of a bundle of sheet-shaped media in the following description. Some medium processing apparatuses include a crimper that can perform so-called "crimp binding" without metal binding needles from a viewpoint of resource saving and reduction in environmental load. Specifically, the crimper sandwiches a sheet bundle with serrate binding teeth to press and deform the sheet bundle.

An increased number of sheets of the sheet bundle hamper the binding teeth in biting into the sheet bundle and may cause some sheets to peel off from the bound sheets. Thus, the crimp binding has some difficulties in keeping the sheet bundle bound as appropriate. To increase the binding strength, some medium processing apparatuses that execute the crimp binding include a liquid applier that applies liquid in advance to a position on a sheet where the binding teeth contact the sheet, to allow the binding teeth to easily bite into a sheet bundle.

SUMMARY

According to an embodiment of the present disclosure, a novel medium processing apparatus includes a liquid applier, a post-processing device, and circuitry. The liquid applier includes a liquid application member that applies liquid to a part of a medium, the medium being at least one medium. The post-processing device binds a bundle of media including the medium to which the liquid is applied by the liquid applier. The circuitry changes, according to a binding condition for the post-processing device, at least one of an amount of movement of the liquid application member toward the medium or a contact time during which the liquid application member is in contact with the medium.

According to an embodiment of the present disclosure, a novel image forming system includes an image forming apparatus and the medium processing apparatus. The image forming apparatus forms an image on a medium. The medium processing apparatus binds a plurality of media, including the medium, on each of which the image is formed by the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 16A is a table of example parameters for the sheet thickness;

FIG. 16B is a table of example parameters for the number of sheets to be bound;

FIGS. 28A to 28C are cross-sectional views of the liquid application unit of the liquid applier taken through XXVI-XXVI of FIG. 26A;

Figure 1:
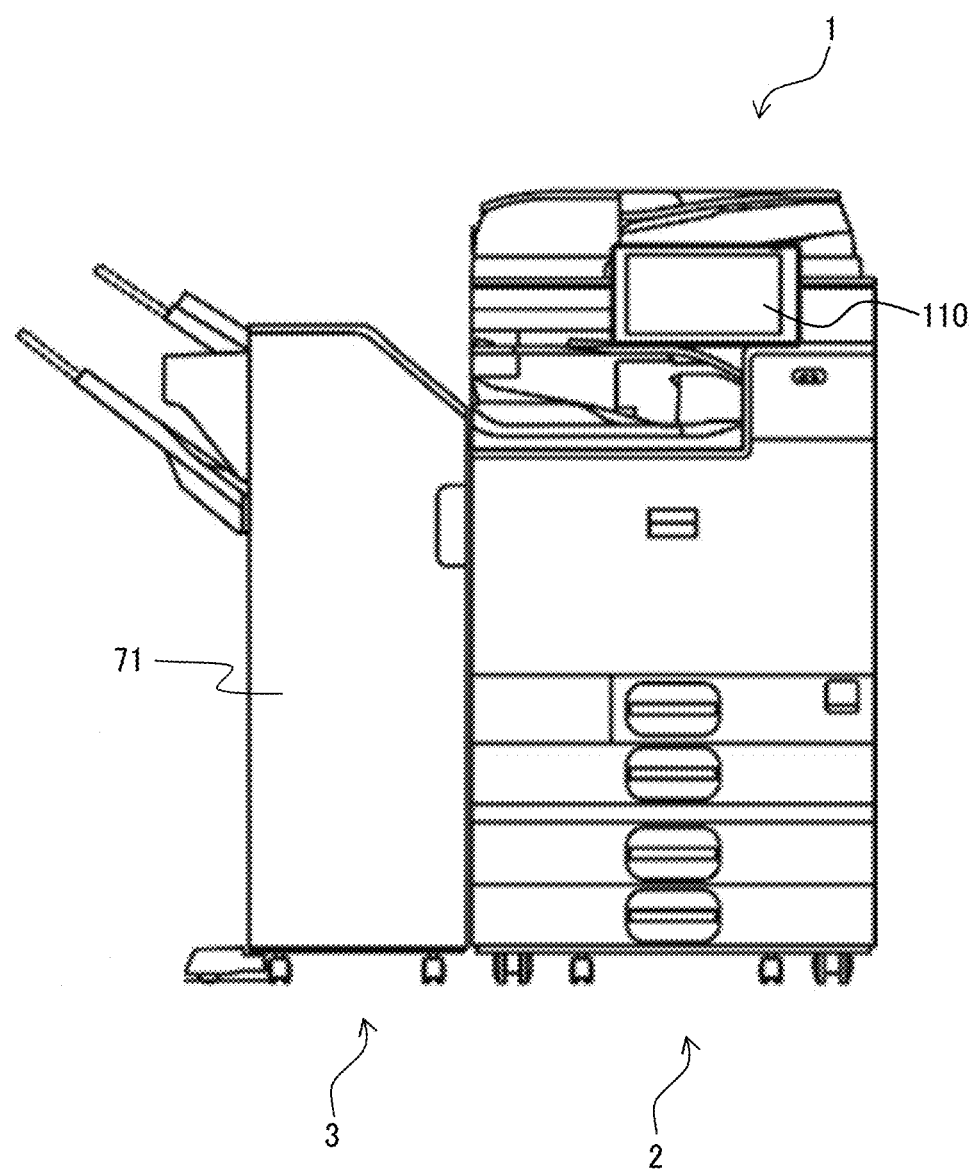
FIG. 1 is a diagram illustrating the overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

With reference to the drawings, a description is now given of an image forming system 1 according to an embodiment of the present disclosure.

FIG. 1 is a diagram illustrating the overall configuration of the image forming system 1.

The image forming system 1 has a function of forming an image on a sheet P as a sheet-shaped medium and performing post-processing on the sheet P on which the image is formed. As illustrated in FIG. 1, the image forming system 1 includes an image forming apparatus 2 and a post-processing apparatus 3 serving as a medium processing apparatus according to the embodiments of the present disclosure.

The image forming apparatus 2 forms an image on the sheet P and outputs the sheet P bearing the image to the post-processing apparatus 3. The image forming apparatus 2 includes a tray that accommodates the sheet P, a conveyor that conveys the sheet P accommodated in the tray, and an image forming device that forms an image on the sheet P conveyed by the conveyor. The image forming device may be an inkjet image forming device that forms an image with ink or an electrophotographic image forming device that forms an image with toner. Since the image forming apparatus 2 has a typical configuration, a detailed description of the configuration and functions of the image forming apparatus 2 will be omitted unless otherwise required.

Now, a description is given of the post-processing apparatus 3 according to a first embodiment of the present disclosure.

Figure 2:
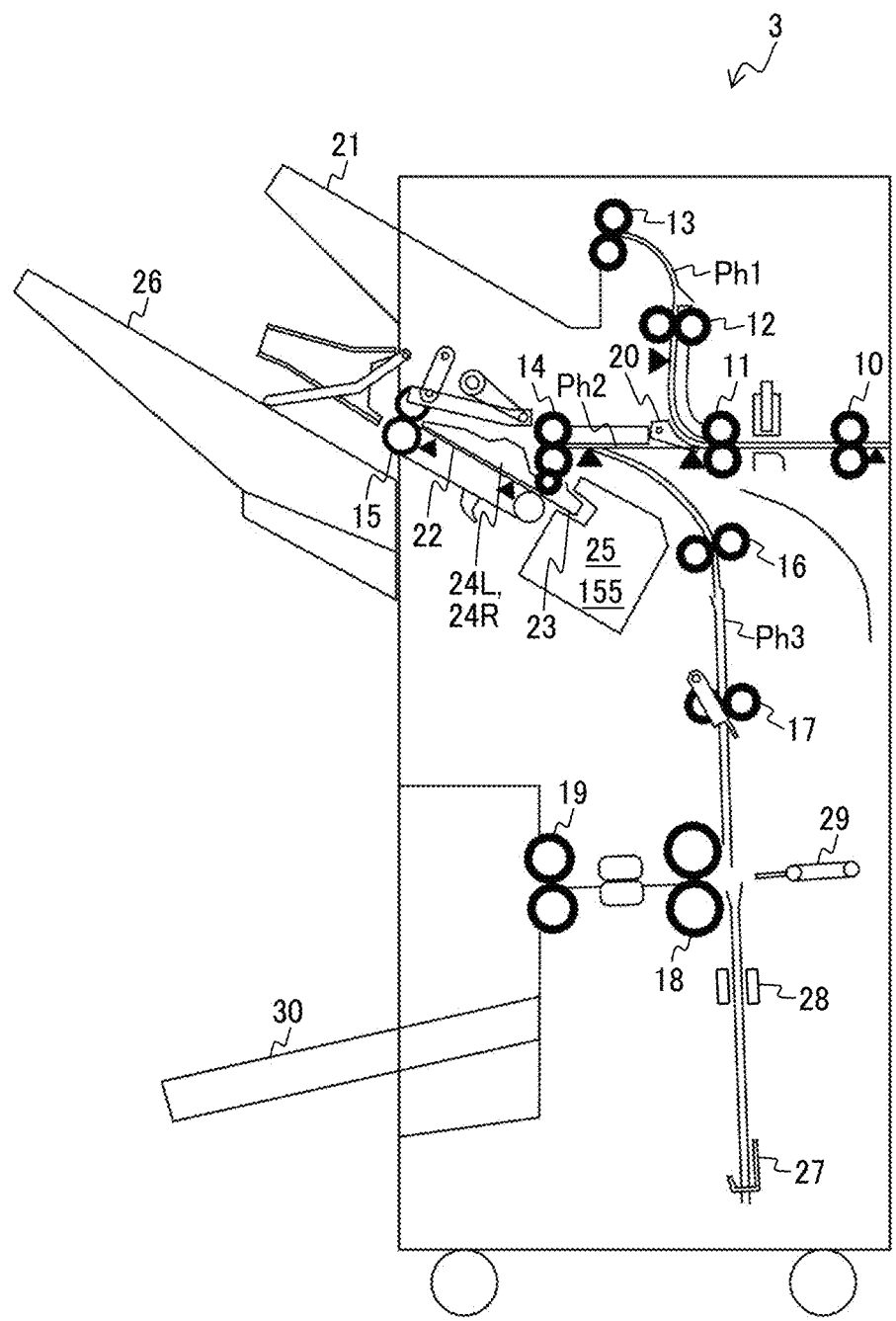
FIG. 2 is a diagram illustrating an internal configuration of a post-processing apparatus according to a first embodiment of the present disclosure.

FIG. 2 is a diagram illustrating an internal configuration of the post-processing apparatus 3 serving as a medium processing apparatus according to the first embodiment of the present disclosure.

The post-processing apparatus 3 performs post-processing on the sheet P on which an image is formed by the image forming apparatus 2. An example of the post-processing according to the present embodiment is binding or a binding process as a "crimp binding process" to bind, without staples, a plurality of sheets P on each of which an image is formed as a bundle of sheets P, which may be referred to as a sheet bundle. Another example of the post-processing according to the present embodiment is binding or a binding process as a "stapling process" to bind, with staples, a plurality of sheets P on each of which an image is formed as a bundle of sheets P (i.e., sheet bundle). In the following description, the bundle of sheets P as a bundle of recording media may be referred to as a "sheet bundle Pb."

More specifically, the "crimp binding process" according to the present embodiment is a process called "crimp binding" to apply pressure to the binding position corresponding to a part of the sheet bundle Pb to deform (pressure-deform) the binding position and bind the sheet bundle Pb. The binding that can be executed by the post-processing apparatus 3 includes edge binding and saddle binding. The edge binding is a process to bind an end (including an edge) of the sheet bundle Pb. The saddle binding is a process to bind the center of the sheet bundle Pb.

The post-processing apparatus 3 includes conveyance roller pairs 10 to 19 serving as conveyors and a switching claw 20. The conveyance roller pairs 10 to 19 convey, inside the post-processing apparatus 3, the sheet P supplied from the image forming apparatus 2. More specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to a first output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to a second output tray 26 via an internal tray 22 serving as a receptacle. The third conveyance passage Ph3 is a passage branching from the first conveyance passage Ph1 between the conveyance roller pairs 11 and 14 in the conveyance direction and extending to a third output tray 30.

The switching claw 20 is disposed at a branching position of the first conveyance passage Ph1 and the second conveyance passage Ph2.

The switching claw 20 can be switched between a first position and a second position. The switching claw 20 in the first position guides the sheet P to be output to the first output tray 21 through the first conveyance passage Ph1. The switching claw 20 in the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Each of the plurality of sensors is indicated by a black triangle mark in FIG. 2.

The post-processing apparatus 3 includes the first output tray 21. The sheet P output through the first conveyance passage Ph1 is placed on the first output tray 21. Among the sheets P supplied from the image forming apparatus 2, the sheets P that are not bound are output to the first output tray 21.

The post-processing apparatus 3 further includes the internal tray 22 serving as a receptacle, an end fence 23, side fences 24L and 24R, an edge binder 25, a stapling unit 155, and the second output tray 26. The internal tray 22, the end fence 23, the side fences 24L and 24R, the edge binder 25, and the stapling unit 155 perform the edge binding on the sheet bundle Pb constructed of the plurality of sheets P conveyed through the second conveyance passage Ph2. Among the sheets P supplied from the image forming apparatus 2, the sheet bundle Pb subjected to the edge binding is output to the second output tray 26.

The "edge binding" includes "parallel binding," "oblique binding," and "vertical binding." The "parallel binding" is a process to bind the sheet bundle Pb along one side of the sheet bundle Pb parallel to a main scanning direction. The "oblique binding" is a process to bind a corner of the sheet bundle Pb. The "vertical binding" is a process to bind the sheet bundle Pb along one side of the sheet bundle Pb parallel to the conveyance direction.

In the following description, a direction in which the sheet P is conveyed from the conveyance roller pair 15 toward the end fence 23 is defined as a "conveyance direction" of the sheet P. In other words, the "conveyance direction" corresponds to a direction in which the sheet P that has been output from the image forming apparatus 2 is moved toward the end fence 23 by the conveyance roller pair 15 after being moved toward the second output tray 26 by, for example, the conveyance roller pair 10. A direction that is orthogonal to the conveyance direction and a thickness direction of the sheet P is defined as a "main scanning direction" or a "width direction of the sheet P."

The sheets P that are sequentially conveyed through the second conveyance passage Ph2 are temporarily placed on the internal tray 22 serving as a receptacle. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 and the stapling unit 155 bind an end of the sheet bundle Pb aligned by the end fence 23 and the side fences 24L and 24R. Then, the conveyance roller pair 15 outputs the sheet bundle Pb subjected to the edge binding to the second output tray 26.

The post-processing apparatus 3 further includes an end fence 27, a saddle binder 28, a sheet folding blade 29, and the third output tray 30. The end fence 27, the saddle binder 28, and the sheet folding blade 29 perform the saddle binding on the sheet bundle Pb constructed of the sheets P that are conveyed through the third conveyance passage Ph3. Among the sheets P supplied from the image forming apparatus 2, the sheet bundle Pb subjected to the saddle binding is output to the third output tray 30.

The end fence 27 aligns the positions of the sheets P that are sequentially conveyed through the third conveyance passage Ph3, in a direction in which the sheets P are conveyed. The end fence 27 is movable between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to sandwich the sheet bundle Pb. The conveyance roller pairs 18 and 19 output the sheet bundle Pb subjected to the saddle binding to the third output tray 30.

Figure 4:
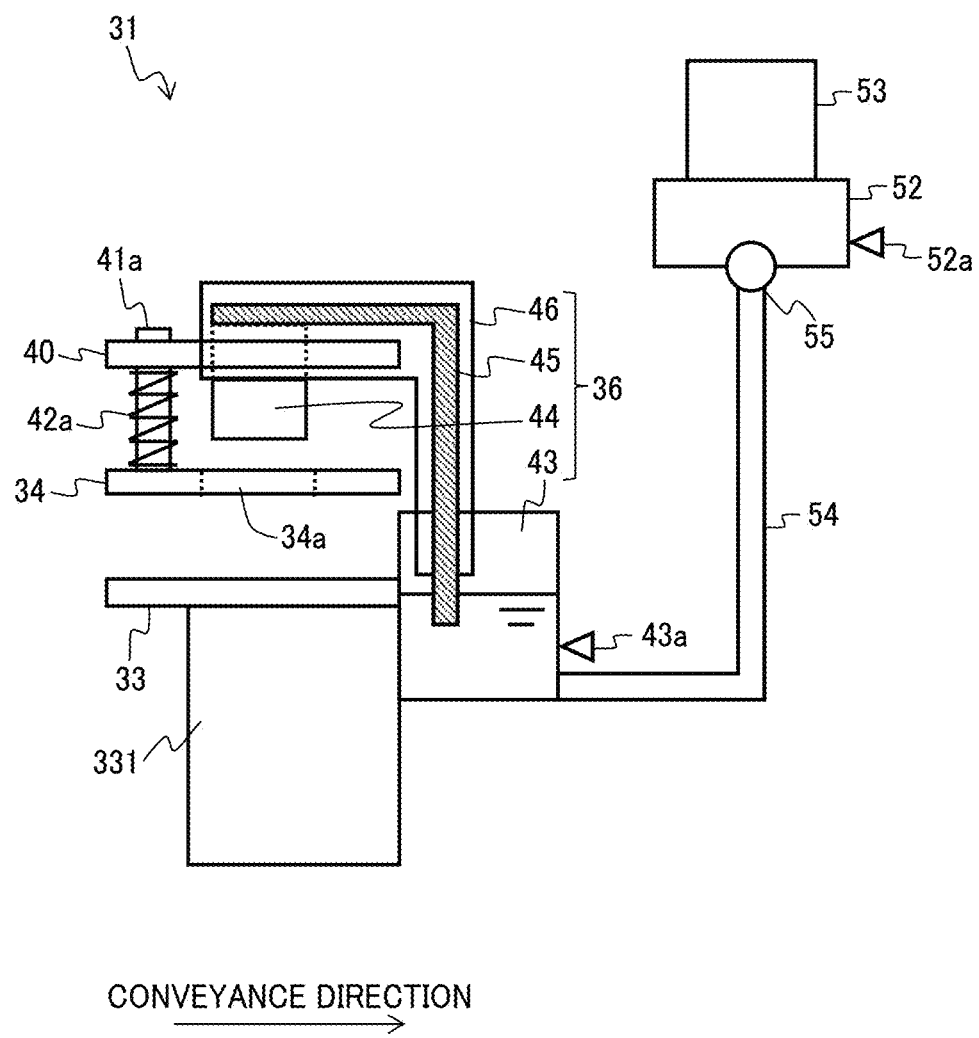
FIG. 4 is a schematic view of a liquid applier of the edge binder of FIG. 3 in a main scanning direction.

The post-processing apparatus 3 includes, in the edge binder 25, a first liquid-storage tank 43 serving as a first liquid storage and a first liquid supplier 45 as a part of a liquid applier, as illustrated in FIG. 4. The post-processing apparatus 3 further includes a second liquid supplier 54 as a part of a liquid supplier, a liquid supply pump 55 as a part of the liquid supplier, a second liquid-storage tank 53 as a part of a second liquid storage, and a second-liquid-storage-tank fixer 52 as a part of the second liquid storage, to replenish the first liquid-storage tank 43 with liquid. The liquid that is stored in the second liquid-storage tank 53 is supplied to the first liquid-storage tank 43 via the second-liquid-storage-tank fixer 52, the liquid supply pump 55, and the second liquid supplier 54.

Now, a description is given of a configuration of the edge binder 25.

Figure 3:
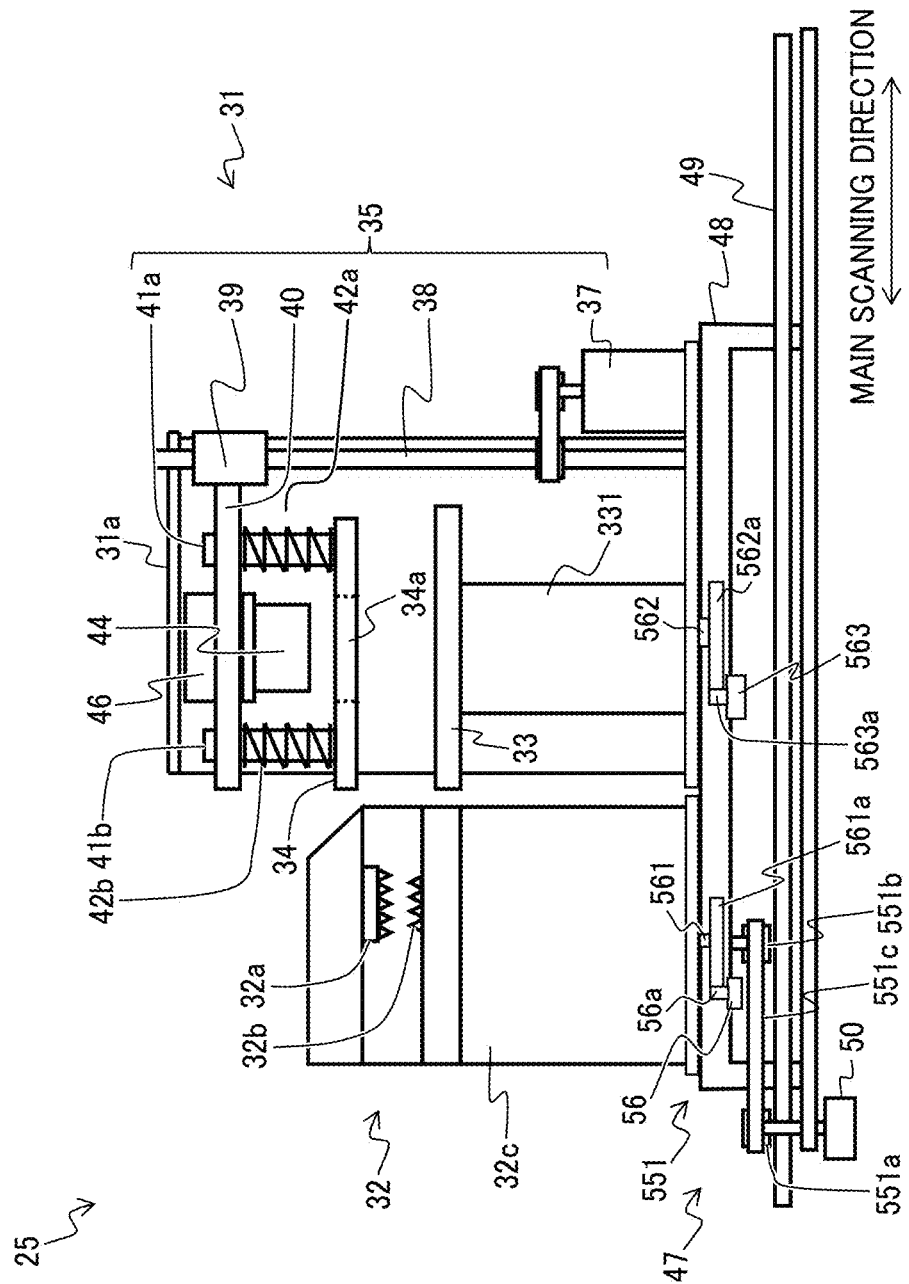
FIG. 3 is a schematic view of an upstream side of an edge binder of the post-processing apparatus of FIG. 2 in a conveyance direction.

FIG. 3 is a schematic view of an upstream side of the edge binder 25 in the conveyance direction. The edge binder 25 performs liquid application and crimp binding.

FIG. 4 is a schematic view of a liquid applier 31 of the edge binder 25 in the main scanning direction.

As illustrated in FIG. 3, the edge binder 25 includes the liquid applier 31 and a crimper 32. The liquid applier 31 executes a processing operation related to the liquid application. The crimper 32 serves as a post-processing device and executes the crimp binding. The liquid applier 31 and the crimper 32 are disposed downstream from the internal tray 22 in the conveyance direction and adjacent to each other in the main scanning direction.

The liquid applier 31 applies the liquid that is stored in the first liquid-storage tank 43 to the sheet P or the sheet bundle Pb placed on the internal tray 22. In the following description, the application of liquid to the sheet P or the sheet bundle Pb may be referred to as "liquid application" whereas a process to apply liquid may be referred to as a "liquid application process."

More specifically, the liquid that is stored in the first liquid-storage tank 43 for the "liquid application" includes, as a main component, the liquid state of a compound of hydrogen and oxygen represented by the chemical formula $H_2O$. The liquid state of the compound of hydrogen and oxygen is at any temperature. For example, the liquid state of the compound of hydrogen and oxygen may be so-called warm water or hot water. The liquid state of the compound of hydrogen and oxygen is not limited to pure water. The liquid state of the compound of hydrogen and oxygen may be purified water or may contain ionized salts. The metal ion content ranges from so-called soft water to ultrahard water. In other words, the liquid state of the compound of hydrogen and oxygen is at any hardness.

The liquid that is stored in the first liquid-storage tank 43 may include an additive in addition to the main component. The liquid that is stored in the first liquid-storage tank 43 may include residual chlorine used as tap water. Preferably, for example, the liquid that is stored in the first liquid-storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above enhances the binding strength of the sheet bundle Pb, as compared with a liquid of which the main component is not water.

The liquid applier 31 and the crimper 32 can be moved together in the main scanning direction by a driving force transmitted from the edge-binder movement motor 50. A liquid application position or a liquid application region to which the liquid is applied on the sheet P or the sheet bundle Pb by the liquid applier 31 corresponds to a binding position or a binding region on the sheet bundle Pb to be crimped and bound by the crimper 32. For this reason, in the following description, the liquid application position (or the liquid application region) and the binding position (or the binding region) are denoted by the same reference numeral.

Now, a description is given of a configuration of the liquid applier 31.

As illustrated in FIGS. 3 and 4, the liquid applier 31 can be moved in the main scanning direction together with the crimper 32 by the driving force transmitted from the edge-binder movement motor 50.

The liquid applier 31 includes a lower pressure plate 33 serving as a receptacle for the sheet P or the sheet bundle Pb, an upper pressure plate 34, a liquid-applier movement assembly 35, and a liquid application assembly 36. The components of the liquid applier 31 such as the lower pressure plate 33, the upper pressure plate 34, the liquid-applier movement assembly 35, and the liquid application assembly 36 are held by a liquid application frame 31a and a base 48.

The lower pressure plate 33 and the upper pressure plate 34 are disposed downstream from the internal tray 22 in the conveyance direction. The sheets P or the sheet bundle Pb that is placed on the internal tray 22 is also placed on the lower pressure plate 33. The lower pressure plate 33 is disposed on a lower-pressure-plate holder 331. The upper pressure plate 34 is movable in the thickness direction of the sheet P or the sheet bundle Pb at a position where the upper pressure plate 34 faces the sheet P or the sheet bundle Pb placed on the internal tray 22. In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as "thickness direction." The upper pressure plate 34 has a through hole 34a penetrating in the thickness direction at a position where the through hole 34a faces an end of a liquid application member 44, which is a part of the liquid applier 31, held via a holder 46 attached to a base plate 40.

The liquid-applier movement assembly 35 moves the upper pressure plate 34, the base plate 40, the holder 46, the liquid application member 44, the first liquid supplier 45, and the first liquid-storage tank 43 in the thickness direction of the sheet P or the sheet bundle Pb. The liquid-applier movement assembly 35 according to the present embodiment moves the upper pressure plate 34, the base plate 40, the first liquid-storage tank 43, the liquid application member 44, the first liquid supplier 45, and the holder 46 in conjunction with each other (in a unified way) by a single liquid-applier movement motor 37.

The liquid-applier movement assembly 35 includes, for example, the liquid-applier movement motor 37, a trapezoidal screw 38, a nut 39, the base plate 40, columns 41a and 41b, and coil springs 42a and 42b.

The liquid-applier movement motor 37 generates a driving force to move the upper pressure plate 34, the base plate 40, the holder 46, the liquid application member 44, the first liquid supplier 45, and the first liquid-storage tank 43. The trapezoidal screw 38 extends in the thickness direction of the sheet P or the sheet bundle Pb and is supported by the liquid application frame 31a of the liquid applier 31 so as to be rotatable in the forward and reverse directions. The trapezoidal screw 38 is coupled to an output shaft of the liquid-applier movement motor 37 via, for example, a pulley and a belt. The nut 39 is screwed to the trapezoidal screw 38. The trapezoidal screw 38 is rotated in the forward and reverse directions by the driving force transmitted from the liquid-applier movement motor 37. The rotation of the trapezoidal screw 38 causes the nut 39 to reciprocate on the trapezoidal screw 38.

The base plate 40 is positioned apart from the upper pressure plate 34.

The base plate 40 holds the liquid application member 44 with the end of the liquid application member 44 projecting from the base plate 40 toward the upper pressure plate 34. The base plate 40 is coupled to the trapezoidal screw 38 via the nut 39 so as to reciprocate along the trapezoidal screw 38 when the trapezoidal screw 38 rotates in the forward and reverse directions. The position of the base plate 40 in the thickness direction of the sheet P or the sheet bundle Pb is detected by a position sensor 40a illustrated in FIG. 13.

The columns 41a and 41b project from the base plate 40 toward the upper pressure plate 34 around the end of the liquid application member 44. The columns 41a and 41b are movable relative to the base plate 40 in the thickness direction. The columns 41a and 41b hold the upper pressure plate 34 with the respective ends closer to the lower pressure plate 33 than the other ends of the columns 41a and 41b. The other ends of the columns 41a and 41b are provided with stoppers that prevent the columns 41a and 41b from being removed from the base plate 40. The coil springs 42a and 42b are fitted around the columns 41a and 41b, respectively, between the base plate 40 and the upper pressure plate 34.

The coil springs 42a and 42b bias the upper pressure plate 34 and the columns 41a and 41b toward the lower pressure plate 33 with respect to the base plate 40.

The liquid application assembly 36 applies liquid to the sheet P or the sheet bundle Pb placed on the internal tray 22. More specifically, the liquid applier 31 brings the liquid application member 44 into contact with the sheet P or the sheet bundle Pb to apply the liquid to at least one sheet P of the sheet bundle Pb.

The liquid application assembly 36 includes a first liquid-amount sensor 43a serving as a first liquid detector, the first liquid-storage tank 43, the liquid application member 44, the first liquid supplier 45, and the holder 46. The first liquid-storage tank 43 stores the liquid to be applied to the sheet P or the sheet bundle Pb. The amount of liquid that is stored in the first liquid-storage tank 43 is detected by the first liquid-amount sensor 43a.

The first liquid-storage tank 43 is coupled to the base plate 40 via the holder 46.

The liquid application member 44 applies the liquid stored in the first liquid-storage tank 43 to the sheet P or the sheet bundle Pb. The liquid application member 44 and the first liquid supplier 45 disposed in close contact with the liquid application member 44 are both held by the holder 46. The holder 46 is held by the base plate 40. The holder 46 is an elongated cylindrical body (for example, a tube) that is fitted around the first liquid supplier 45. The holder 46 prevents the liquid absorbed by the first liquid supplier 45 from leaking or evaporating.

The first liquid supplier 45 has a first end in close contact with the liquid application member 44 and a second end immersed in the liquid stored in the first liquid-storage tank 43. In other words, the second end of the first liquid supplier 45 corresponds to an immersion portion that sucks up the liquid and supplies the liquid to the liquid application member 44. Each of the liquid application member 44 and the first liquid supplier 45 is made of a material having a relatively high liquid absorption such as an elastic resin formed of open cells. For example, the liquid application member 44 and the first liquid supplier 45 may be made of sponge or fiber. Accordingly, when the other second end of the first liquid supplier 45 is immersed in the stored liquid, the liquid is sucked up by capillary action. As a result, the first liquid supplier 45 and the liquid application member 44 are filled with the liquid.

The liquid application member 44 according to the present embodiment has a planar end face. The liquid application member 44 according to the present embodiment is supported by the base plate 40 such that the end face is parallel to the sheet P or the sheet bundle Pb placed on the internal tray 22.

A liquid-applier shaft 562 provided with a drive transmission gear 562a is fixed to a bottom face of the liquid application frame 31a that holds the components of the liquid applier 31. The liquid-applier shaft 562 and the drive transmission gear 562a are held by the base 48 on which the liquid application frame 31a is disposed, so as to be rotatable in the forward and reverse directions. The drive transmission gear 562a meshes with an output gear 563a of a liquid-applier pivot motor 563. The liquid applier 31 can be rotated in the forward and reverse directions about the liquid-applier shaft 562 on the base 48 by a driving force transmitted from the liquid-applier pivot motor 563 to the liquid-applier shaft 562 via the output gear 563a and the drive transmission gear 562a.

Now, a description is given of the second liquid storage.

As illustrated in FIG. 4, the post-processing apparatus 3 includes the second-liquid-storage-tank fixer 52 as a part of the second liquid storage, the second liquid-storage tank 53 as a part of a second liquid storage, the second liquid supplier 54, and the liquid supply pump to supply liquid to the first liquid-storage tank 43. For example, the liquid is supplied to the first liquid-storage tank 43 in a way described below. However, the way of supplying the liquid to the first liquid-storage tank 43 is not limited to the following example. Alternatively, for example, a user may directly replenish the first liquid-storage tank 43 with the liquid.

Figure 5A:
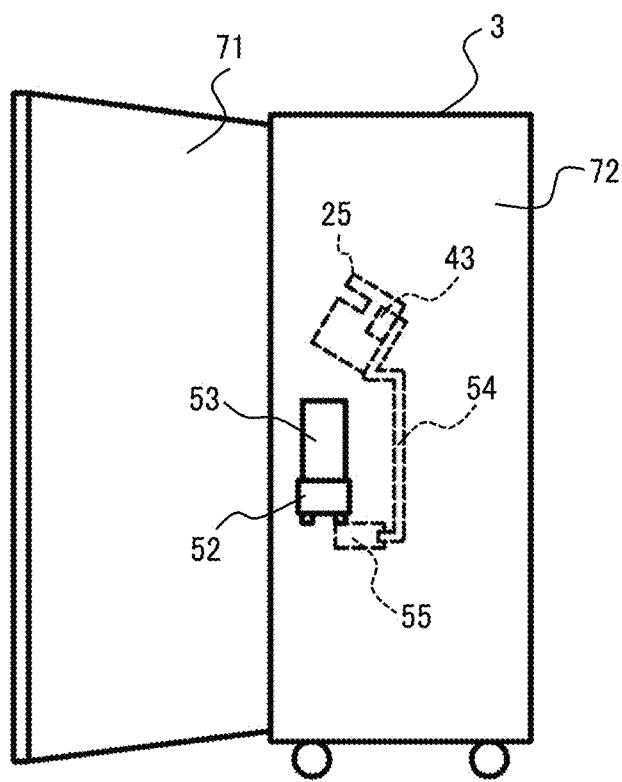
FIGS. 5A and 5B are diagrams illustrating example location and configuration of a second liquid storage in the post-processing apparatus of FIG. 2.
Figure 5B:
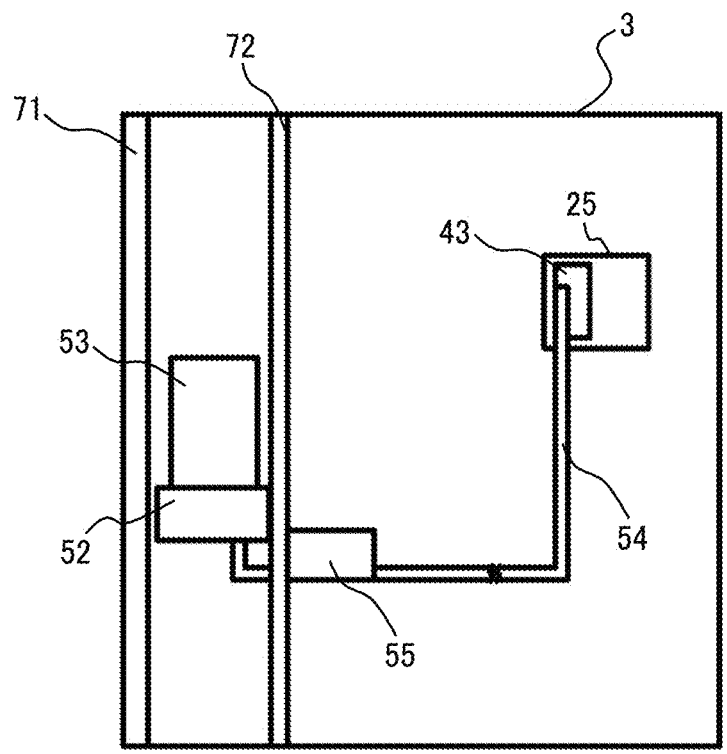
Figure 6:
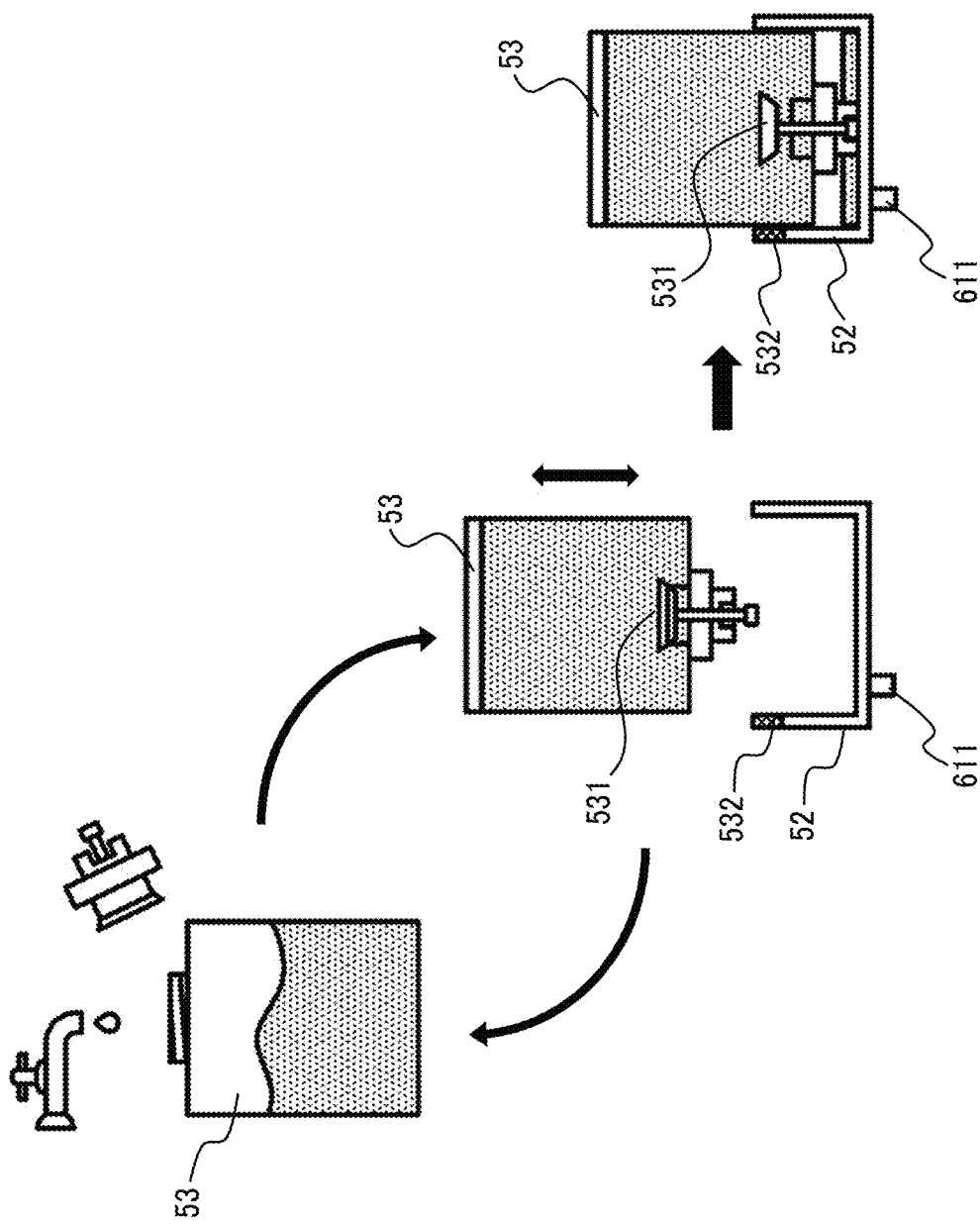
FIG. 6 is a diagram illustrating an attachment and detachment configuration of the second liquid storage of FIGS. 5A and 5B.

Referring now to FIGS. 5A to 6, a description is given of the location and configuration of the second liquid-storage tank 53.

FIGS. 5A and 5B illustrate example location and configuration of the second liquid-storage tank 53 as the main tank.

Specifically, FIG. 5A illustrates the post-processing apparatus 3 with a cover (i.e., a front door 71) opened. FIG. 5B is a cross-sectional side view of the post-processing apparatus 3. FIG. 5B illustrates the post-processing apparatus 3 with the cover (i.e., the front door 71) closed.

As illustrated in FIGS. 5A and 5B, the second liquid-storage tank 53 is located so as to be accessible when the front door 71 of the post-processing apparatus 3 is opened. A main-body side plate 72 of the post-processing apparatus 3 is disposed between where the second liquid-storage tank 53 and the second-liquid-storage-tank fixer 52 are disposed and where the first liquid-storage tank 43 is disposed. The second-liquid-storage-tank fixer 52 is provided with a liquid drain plug 611. After the liquid remaining in the first liquid-storage tank 43 and the second liquid supplier 54 is reversely fed to the second-liquid-storage-tank fixer 52, the liquid drain plug 611 is opened to discharge the liquid stored in the second-liquid-storage-tank fixer 52 from the inside of the post-processing apparatus 3. Thus, the liquid is prevented from being frozen during maintenance of the post-processing apparatus 3.

FIG. 6 illustrates the second liquid-storage tank 53 attachable to and detachable from the second-liquid-storage-tank fixer 52 and replenished with liquid.

As illustrated in FIG. 6, the second liquid-storage tank 53 is attachable to and detachable from the second-liquid-storage-tank fixer 52 so as to be replenished with liquid. The second-liquid-storage-tank fixer 52 is provided with a set sensor 532 that detects that the second liquid-storage tank 53 is set in second-liquid-storage-tank fixer 52. When the second liquid-storage tank 53 is not set in the second-liquid-storage-tank fixer 52, an outlet of the second liquid-storage tank 53 is closed by a liquid supply valve 531 so that the liquid does not leak. When the second liquid-storage tank 53 is set in the second-liquid-storage-tank fixer 52, the liquid supply valve 531 is pushed up and the liquid stored in the second liquid-storage tank 53 flows to the second-liquid-storage-tank fixer 52, allowing the liquid to be stored in the second-liquid-storage-tank fixer 52.

The second-liquid-storage-tank fixer 52 stores the liquid to be supplied to the first liquid-storage tank 43.

The second-liquid-storage-tank fixer 52 is attached to the main-body side plate 72 of the post-processing apparatus 3 outside the moving range, in the main scanning direction, of the edge binder 25 including the liquid applier 31. The amount of liquid that is stored in the second-liquid-storage-tank fixer 52 is detected by a second liquid-amount sensor 52a serving as a second liquid detector.

The second liquid-storage tank 53, which is a liquid bottle, stores the liquid to be supplied to the second-liquid-storage-tank fixer 52. The second liquid-storage tank 53 is attachable to and detachable from the second-liquid-storage-tank fixer 52. When the second liquid-storage tank 53 is attached to the second-liquid-storage-tank fixer 52, the liquid moves from the second liquid-storage tank 53 to the second-liquid-storage-tank fixer 52 until the amount of liquid in the second-liquid-storage-tank fixer 52 reaches a second upper-limit value. When the amount of liquid in the second-liquid-storage-tank fixer 52 reaches the second upper-limit value, the liquid stops moving from the second liquid-storage tank 53 to the second-liquid-storage-tank fixer 52.

The second liquid supplier 54 couples the second-liquid-storage-tank fixer 52 and the first liquid-storage tank 43 to each other. The second liquid supplier 54 supplies the liquid stored in the second-liquid-storage-tank fixer 52 to the first liquid-storage tank 43. The second liquid supplier 54 is, for example, a pipe, a hose, or a combination thereof. The diameter (inner diameter) of the second liquid supplier 54 is set to such a size that allows the speed at which the liquid is supplied from the second-liquid-storage-tank fixer 52 to the first liquid-storage tank 43 through the second liquid supplier 54 to be higher than the speed at which the liquid is supplied from the first liquid-storage tank 43 to the liquid application member 44 through the first liquid supplier 45. In the following description, the speed at which the liquid is supplied from the first liquid-storage tank 43 to the liquid application member 44 through the first liquid supplier 45 may be referred to as a first supply speed whereas the speed at which the liquid is supplied from the second-liquid-storage-tank fixer 52 to the first liquid-storage tank 43 through the second liquid supplier 54 may be referred to as a second supply speed.

The liquid supply pump 55 is attached to the main-body side plate 72 of the post-processing apparatus 3 together with the second-liquid-storage-tank fixer 52. The liquid supply pump 55 supplies (pumps) the liquid stored in the second-liquid-storage-tank fixer 52 to the first liquid-storage tank 43 through the second liquid supplier 54.

Now, a description is given of a configuration of the crimper 32.

As illustrated in FIG. 3, the crimper 32 serving as a post-processing device sandwiches, with serrate upper crimping teeth 32a and serrate lower crimping teeth 32b, at least a part (in other words, the liquid application position) of the sheet bundle Pb to which the liquid is applied by the liquid applier 31, to press and deform at least the part of the sheet bundle Pb. Thus, the crimper 32 binds the sheet bundle Pb. In the following description, such a binding way in which the upper crimping teeth 32a and the lower crimping teeth 32b sandwich and press the sheet bundle Pb to deform at least a part of the sheet bundle Pb may be referred to as "crimp binding." In other words, the crimper 32 crimps and binds the sheet bundle Pb or performs the crimp binding on the sheet bundle Pb. In short, the crimper 32 binds the sheet bundle Pb without binding materials such as staples. The components of the crimper 32 such as the upper crimping teeth 32a and the lower crimping teeth 32b are disposed on a crimping frame 32c.

Figure 7A:
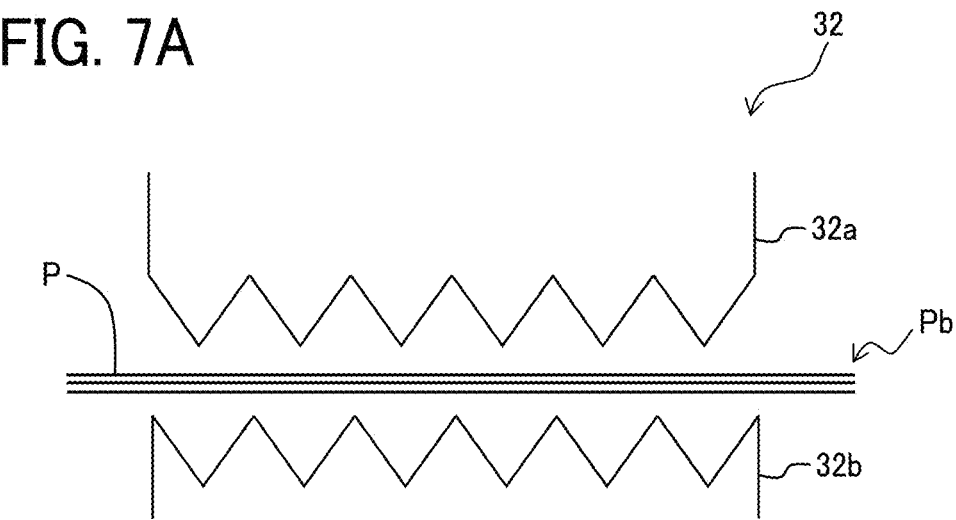
FIGS. 7A and 7B are schematic diagrams illustrating a configuration of a crimper of the edge binder of FIG. 3.
Figure 7B:
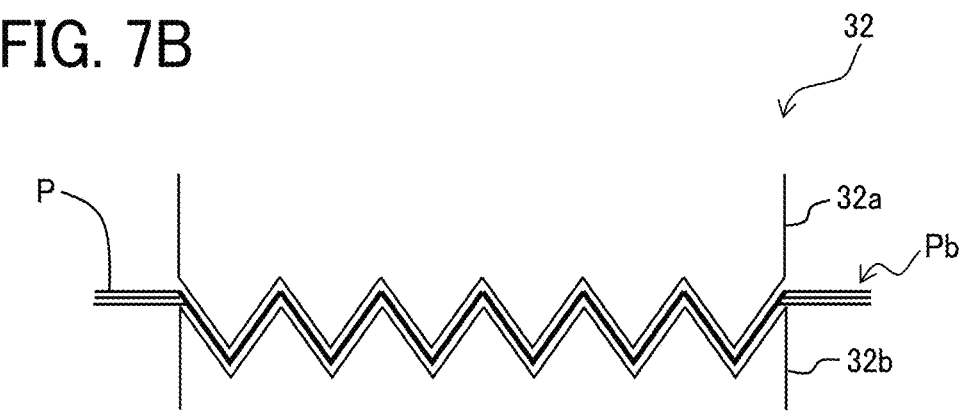

FIGS. 7A and 7B are schematic diagrams illustrating the configuration of the crimper 32.

As illustrated in FIGS. 7A and 7B, the crimper 32 includes a pair of binding teeth (i.e., the upper crimping teeth 32a and the lower crimping teeth 32b). The upper crimping teeth 32a and the lower crimping teeth 32b are disposed to face each other in the thickness direction of the sheet bundle Pb so as to sandwich the sheet bundle Pb placed on the internal tray 22. The upper crimping teeth 32a and the lower crimping teeth 32b have respective serrate faces facing each other. The serrate face of each of the upper crimping teeth 32a and the lower crimping teeth 32b includes concave portions and convex portions alternately formed. The concave portions and the convex portions of the upper crimping teeth 32a are shifted from those of the lower crimping teeth 32b such that the upper crimping teeth 32a are engaged with the lower crimping teeth 32b. The upper crimping teeth 32a and the lower crimping teeth 32b are brought into contact with and separated from each other by a driving force of a contact-separation motor 32d illustrated in FIG. 13.

In the process of supplying the sheets P of the sheet bundle Pb to the internal tray 22, the upper crimping teeth 32a and the lower crimping teeth 32b are apart from each other as illustrated in FIG. 7A. When all the sheets P of the sheet bundle Pb are placed on the internal tray 22, the upper crimping teeth 32a and the lower crimping teeth 32b are engaged with each other to press and deform the sheet bundle Pb in the thickness direction as illustrated in FIG. 7B. As a result, the sheet bundle Pb that has been placed on the internal tray 22 is crimped and bound. The sheet bundle Pb thus crimped and bound is output to the second output tray 26 by the conveyance roller pair 15.

The configuration of the crimper 32 as a crimping assembly is not limited to the configuration of a moving assembly exemplified in the present embodiment, provided that the upper crimping teeth 32a and the lower crimping teeth 32b of the crimping assembly are engaged with each other. For example, the crimping assembly may be a crimping assembly disclosed in Japanese Patent No. 6057167 or its corresponding U.S. Patent Application Publication No. 2014-0219747, which is hereby incorporated by reference as though disclosed herein in its entirety. In this case, the crimping assembly brings the upper crimping teeth 32a and the lower crimping teeth 32b into contact with each other and separates the upper crimping teeth 32a and the lower crimping teeth 32b from each other with a link assembly and a driving source that simply rotates forward or that rotates forward and backward. Alternatively, the crimping assembly may employ a linear motion system to linearly bring the upper crimping teeth 32a and the lower crimping teeth 32b into contact with each other and separate the upper crimping teeth 32a and the lower crimping teeth 32b from each other with a screw assembly that converts the forward and backward rotational motions of a driving source into linear reciprocating motion.

A crimper shaft 561 provided with a drive transmission gear 561a is fixed to a bottom face of the crimping frame 32c that holds the components of the crimper 32. The crimper shaft 561 and the drive transmission gear 561a are held by the base 48 on which the crimping frame 32c is disposed, so as to be rotatable in the forward and reverse directions. The drive transmission gear 561a meshes with an output gear 56a of a crimper pivot motor 56. The crimper 32 can be rotated in the forward and reverse directions about the crimper shaft 561 on the base 48 by a driving force transmitted from the crimper pivot motor 56 to the crimper shaft 561 via the output gear 56a and the drive transmission gear 561a.

As illustrated in FIG. 3, the edge binder 25 includes an edge-binder movement assembly 47.

Figure 13:
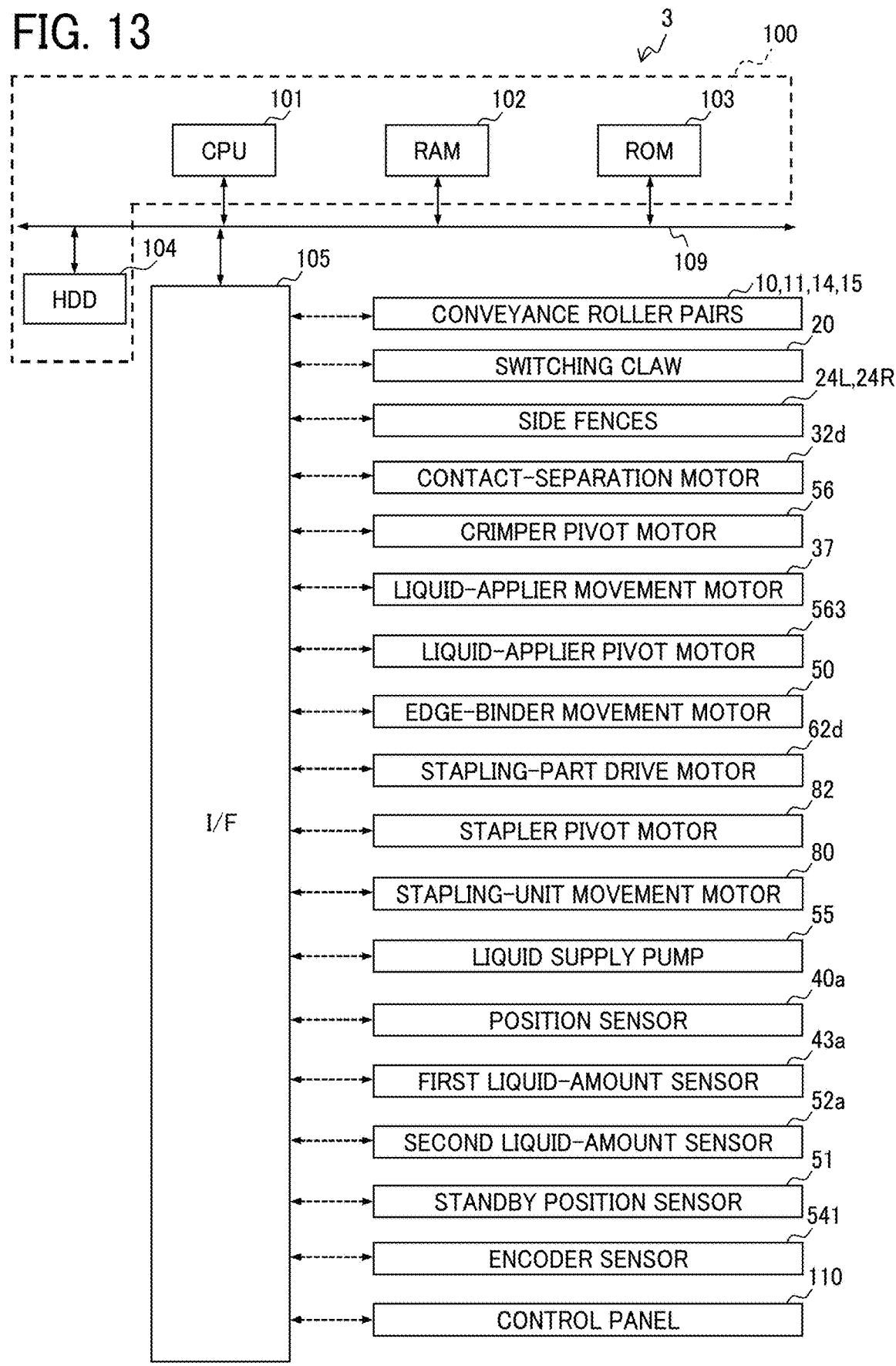
FIG. 13 is a block diagram illustrating a hardware configuration of the post-processing apparatus of FIG. 2 to control the post-processing apparatus.

The edge-binder movement assembly 47 moves the edge binder 25, specifically, the liquid applier 31 and the crimper 32, in the main scanning direction along a downstream end, in the conveyance direction, of the sheet P placed on the internal tray 22. The edge-binder movement assembly 47 includes, for example, the base 48, a guide shaft 49, the edge-binder movement motor 50, a driving force transmission assembly 551, and a standby position sensor 51, which is illustrated in FIG. 13.

The liquid applier 31 and the crimper 32 are attached to the base 48 so as to be adjacent to each other in the main scanning direction. The guide shaft 49 extends in the main scanning direction at a position downstream from the internal tray 22 in the conveyance direction. The guide shaft 49 supports the base 48 movably in the main scanning direction. The edge-binder movement motor 50 generates a driving force to move the edge binder 25. The driving force transmission assembly 551 transmits the driving force of the edge-binder movement motor 50 to the base 48 via pullies 551a and 551b and a timing belt 551c.

As a result, the liquid applier 31 and the crimper 32 integrated by the base 48 move in the main scanning direction along the guide shaft 49. The positions of the liquid applier 31 and the crimper 32 may be ascertained with, for example, an encoder sensor 541 illustrated in FIG. 13. The encoder sensor 541 is attached to an output shaft of the edge-binder movement motor 50. The standby position sensor 51, which is illustrated in FIG. 13, detects the arrival of the edge binder 25 at a standby position HP1 illustrated in FIGS. 15A and 15D.

Figure 15A:
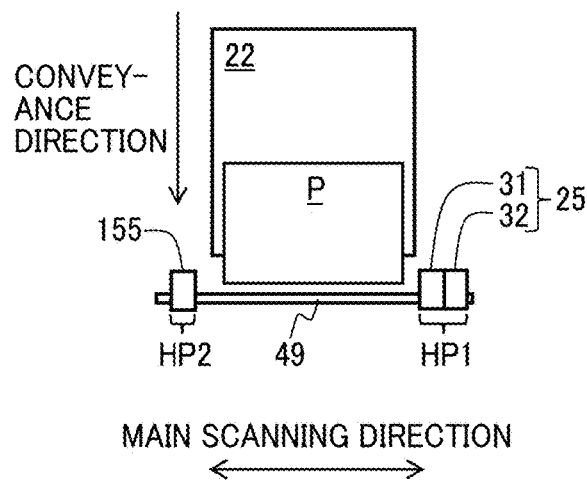
FIGS. 15A to 15D are diagrams illustrating the positions of the liquid applier and the crimper during the binding process of FIG. 14.
Figure 15B:
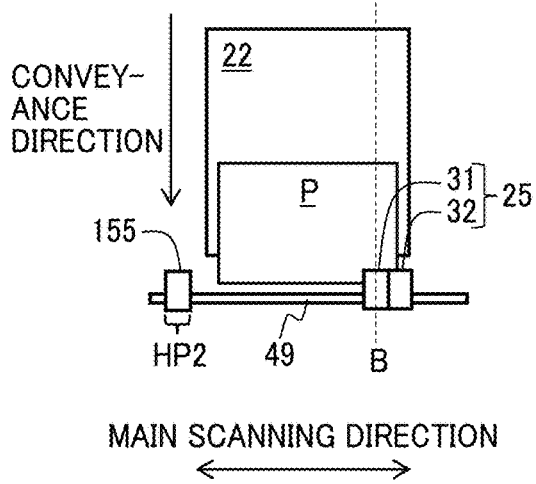
Figure 15C:
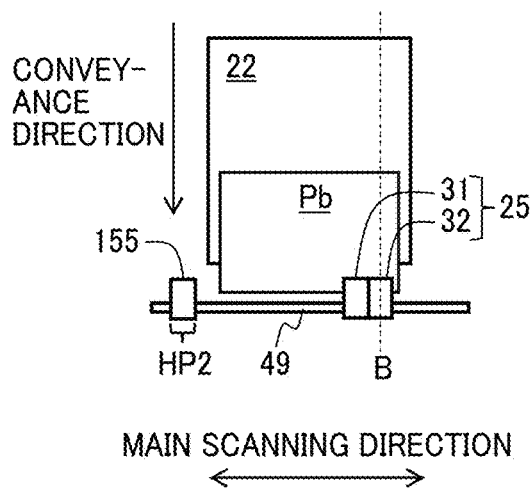
Figure 15D:
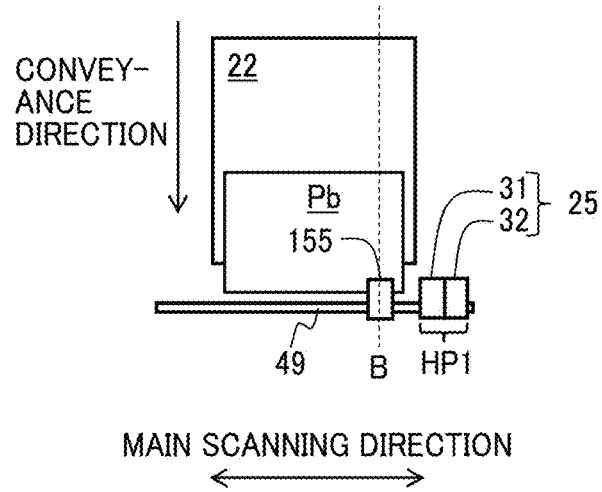

As illustrated in FIGS. 15A and 15D, the standby position HP1 is away in the width direction from the sheet P or the sheet bundle Pb placed on the internal tray 22. As illustrated in FIGS. 15B and 15C, the liquid applier 31 and the crimper 32 are movable along the guide shaft 49 to a position where the liquid applier 31 and the crimper 32 can face a binding position B (liquid application position B) on the sheet bundle Pb placed on the internal tray 22 in the main scanning direction.

Now, a description is given of a configuration of a modification of the edge binder 25 described above.

Specifically, referring now to FIGS. 8 to 10C, a description is given of an edge binder 25' as a post-processing device and as a modification of the edge binder 25 included in the post-processing apparatus 3.

The edge binder 25' is different from the edge binder 25 described above in that the liquid applier 31 and the crimper 32 are integrated as a single unit. In the following description, components like those of the edge binder 25 described above are denoted by like reference numerals, and redundant descriptions thereof may be omitted unless otherwise required.

Figure 8:
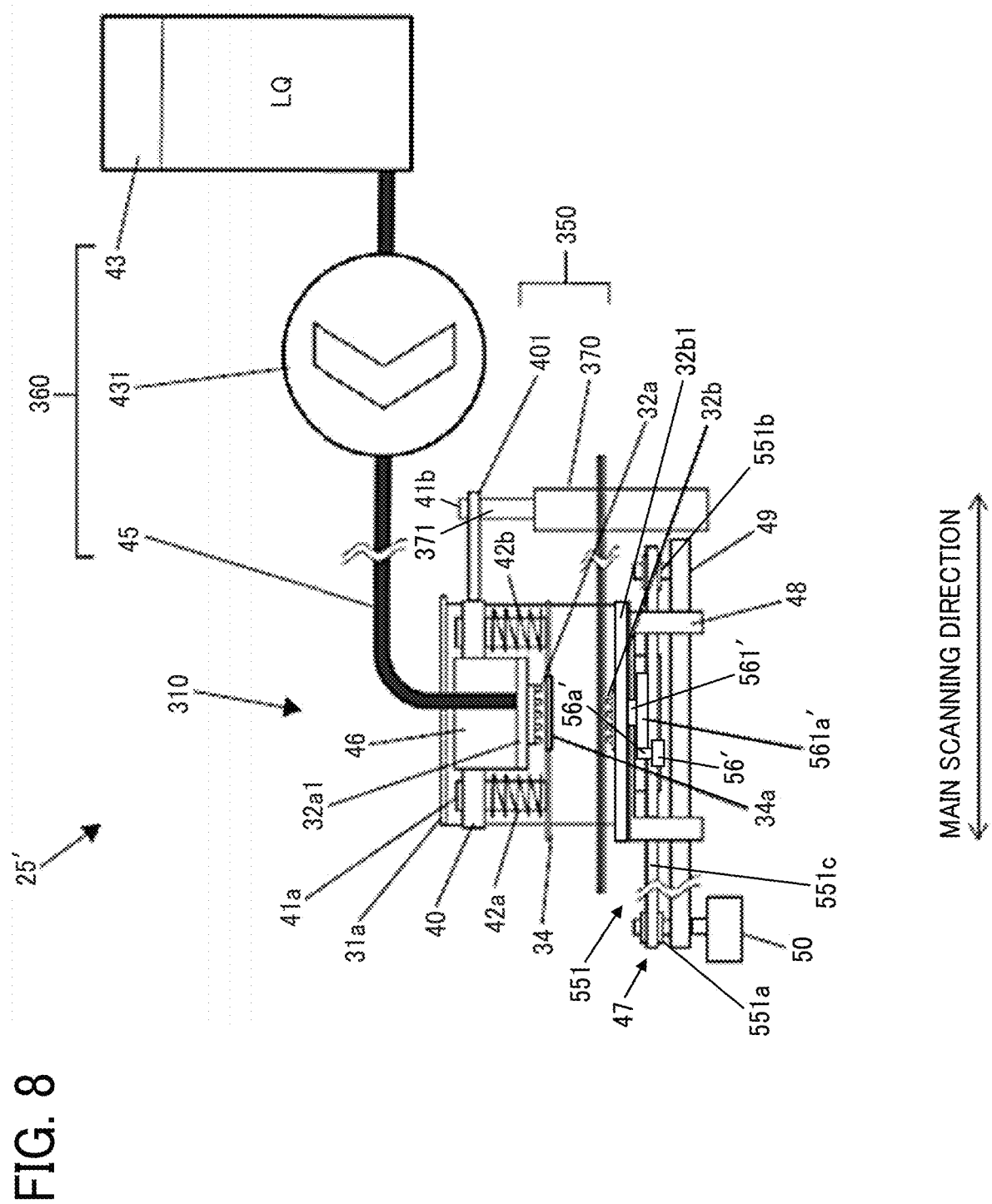
FIG. 8 is a diagram illustrating an edge binder as a modification of the edge binder of FIG. 3.

FIG. 8 is a schematic view of an upstream side of the edge binder 25' in the conveyance direction.

Figure 9A:
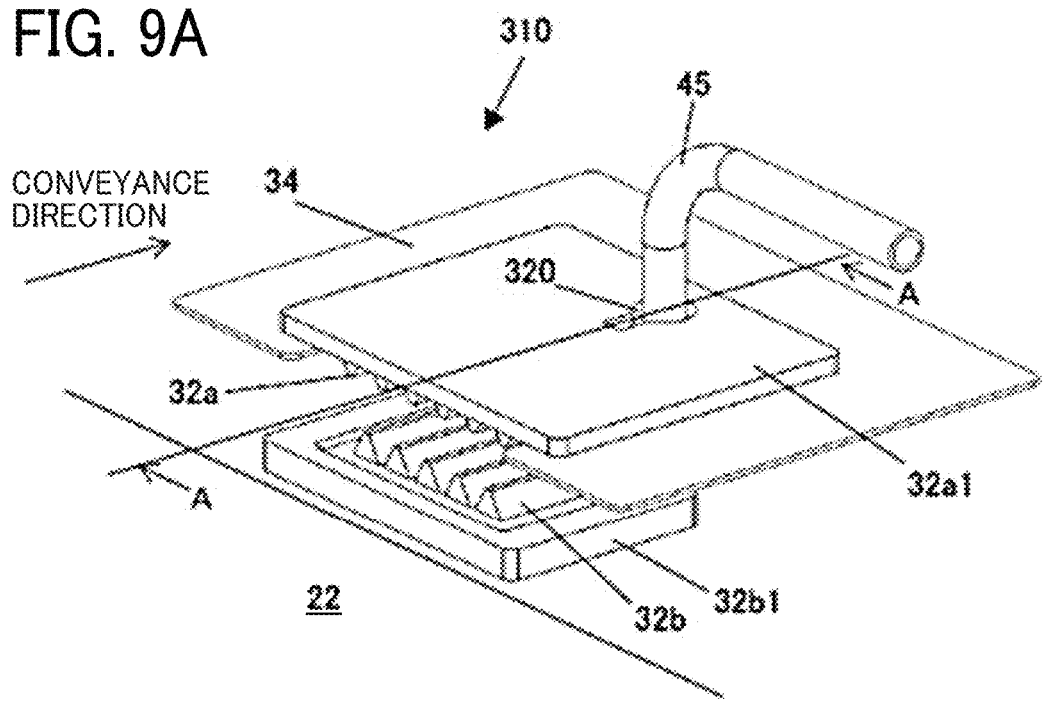
FIGS. 9A to 9C are diagrams illustrating a liquid application crimper of the edge binder of FIG. 8.

FIG. 9A is a perspective view of a liquid application crimper 310.

Figure 9B:
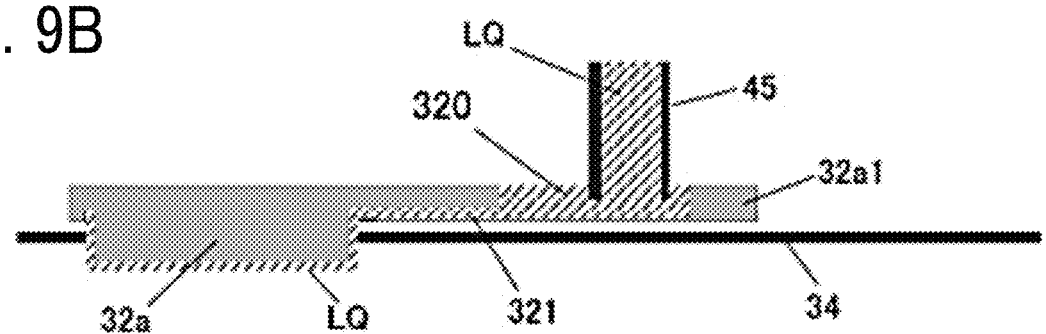

FIG. 9B is a cross-sectional view of the liquid application crimper 310 taken along line A-A in FIG. 9A.

Figure 9C:
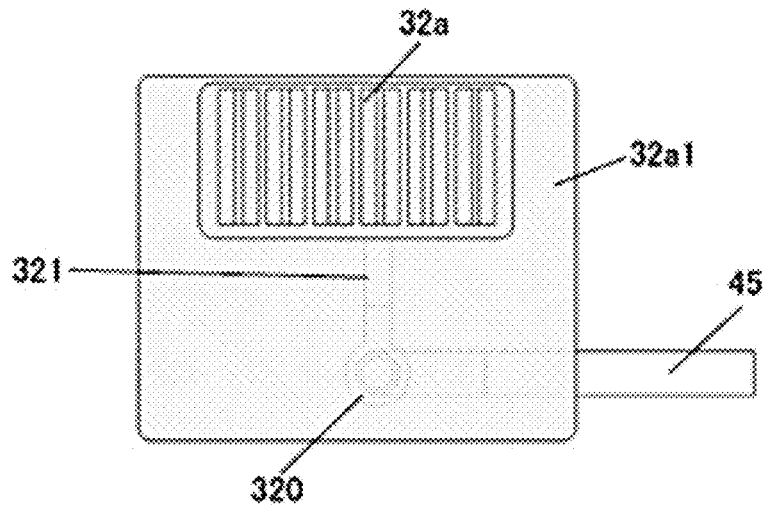

FIG. 9C is a plan view of the upper crimping teeth 32a of FIG. 9A as viewed from where the lower crimping teeth 32b are disposed.

Figure 10A:
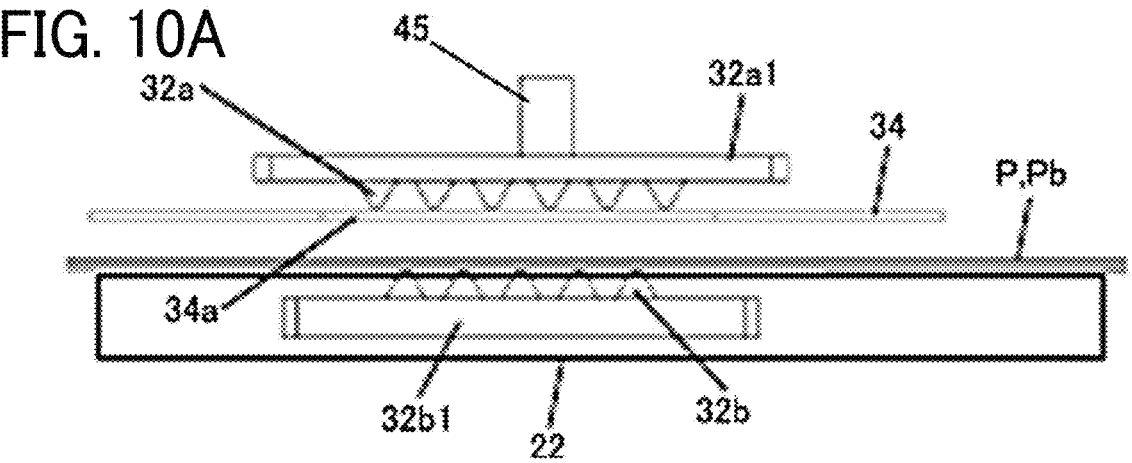
FIGS. 10A to 10C are diagrams illustrating a liquid applying operation and a crimp binding operation performed by the liquid application crimper of FIGS. 9A to 9C.
Figure 10B:
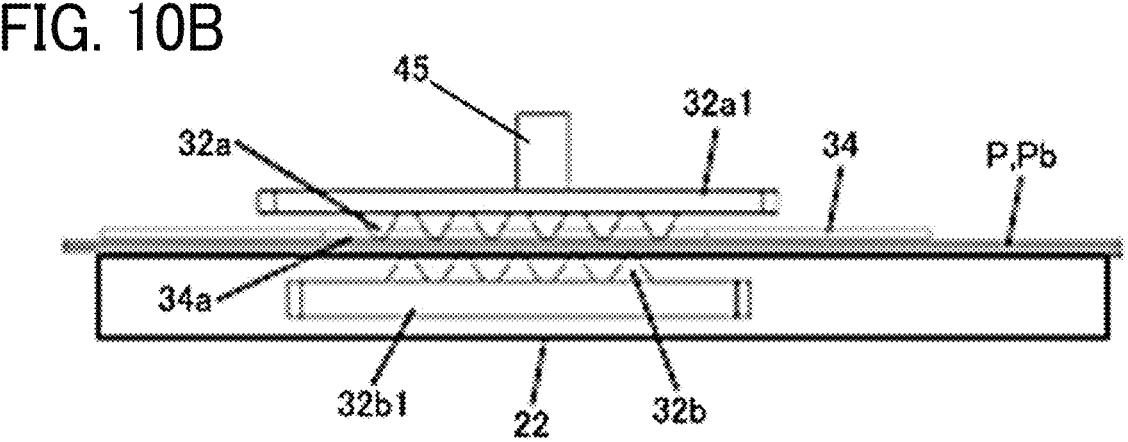
Figure 10C:
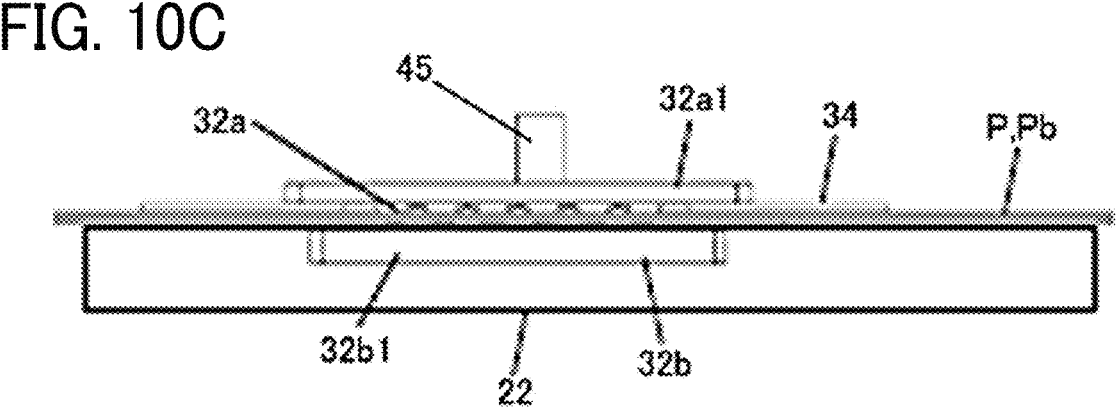

FIGS. 10A to 10C are diagrams illustrating a liquid applying operation and a crimp binding operation performed by the liquid application crimper 310.

In other words, FIGS. 10A to 10C are schematic views of a downstream side of the liquid application crimper 310 in the conveyance direction.

As illustrated in FIG. 8, the edge binder 25' includes the liquid application crimper 310 in which the liquid applier 31 and the crimper 32 of the edge binder 25 according to the first embodiment are integrated as a single unit. The liquid application crimper 310 is disposed downstream from the internal tray 22 in the conveyance direction.

The liquid application crimper 310 applies liquid LQ stored in the first liquid-storage tank 43 to the sheet P or the sheet bundle Pb placed on the internal tray 22. The liquid application crimper 310 can be moved in the main scanning direction by the driving force that is transmitted from the edge-binder movement motor 50 to the base 48 by the driving force transmission assembly 551. The liquid application crimper 310 includes the upper pressure plate 34, the upper crimping teeth 32a, the lower crimping teeth 32b, a liquid-application-crimper movement assembly 350, and a liquid supply assembly 360. The components of the liquid application crimper 310 are held by the liquid application frame 31a and the base 48. A liquid-application-crimper shaft 561' provided with a drive transmission gear 561a' is fixed to a bottom face of the liquid application frame 31a. The liquid-application-crimper shaft 561' and the drive transmission gear 561a' are held by the base 48 on which the liquid application frame 31a is disposed, so as to be rotatable in the forward and reverse directions. The drive transmission gear 561a' meshes with an output gear 56a' of a liquid-application-crimper pivot motor 56'. The liquid application crimper 310 can be rotated in the forward and reverse directions about the liquid-application-crimper shaft 561' on the base 48 by a driving force transmitted from the liquid-application-crimper pivot motor 56' to the liquid-application-crimper shaft 561' via the output gear 56a' and the drive transmission gear 561a'.

The liquid-application-crimper movement assembly 350 moves the upper pressure plate 34, the base plate 40, and the upper crimping teeth 32a in conjunction with each other in the thickness direction of the sheet P or the sheet bundle Pb by an electric cylinder 370. The base plate 40 holds an upper-crimping-teeth holder 32a1 and the upper crimping teeth 32a via the holder 46. The base plate 40 movably holds the upper pressure plate 34 via the columns 41a and 41b. The base plate 40 is attached to an end of a rod 371 of the electric cylinder 370 via a connecter 401.

The columns 41a and 41b have respective lower ends holding the upper pressure plate 34. The coil springs 42a and 42b are fitted around the columns 41a and 41b, respectively, between the base plate 40 and the upper pressure plate 34. The coil springs 42a and 42b bias the upper pressure plate 34 and the columns 41a and 41b in a direction away from the base plate 40.

The liquid supply assembly 360 includes the first liquid-storage tank 43, a liquid supply pump 431, and the first liquid supplier 45. The liquid supply pump 431 supplies the liquid LQ via the first liquid supplier 45 to a liquid reservoir 320 of the upper-crimping-teeth holder 32a1 as illustrated in FIG. 9A. The first liquid supplier 45 is an elastic elongated member having a base end (proximal end) coupled to the liquid supply pump 431 and a distal end coupled to the liquid reservoir 320.

As illustrated in FIG. 9B, the upper crimping teeth 32a are integrated with the upper-crimping-teeth holder 32a1. The upper-crimping-teeth holder 32a1 includes the liquid reservoir 320 and a liquid supply path 321 to supply the liquid LQ stored in the liquid reservoir 320 to the upper crimping teeth 32a. The surface of the upper crimping teeth 32a is subjected to a hydrophilic treatment so that the liquid LQ that is supplied through the liquid supply path 321 uniformly spreads over the surface of the upper crimping teeth 32a. On the other hand, the portion of the upper-crimping-teeth holder 32a1 other than the upper crimping teeth 32a is subjected to a hydrophobic treatment so that the liquid LQ efficiently spreads over the surface of the upper crimping teeth 32a.

As illustrated in FIG. 8, the lower crimping teeth 32b are integrated with a lower-crimping-teeth holder 32b1, which is a part of the liquid application frame 31a. The lower crimping teeth 32b are attached to the base 48 via the lower-crimping-teeth holder 32b1.

Referring now to FIGS. 10A to 10C, a description is given of the liquid applying operation and the crimp binding operation performed by the liquid application crimper 310.

In the process of supplying the sheet P to the internal tray 22, as illustrated in FIG. 10A, the upper crimping teeth 32a and the lower crimping teeth 32b are apart from each other. When the sheet P is placed on the internal tray 22, the electric cylinder 370 is contracted to move the upper crimping teeth 32a and the upper pressure plate 34 toward the sheet P. Then, as illustrated in FIG. 10B, the upper pressure plate 34 first contacts the sheet P, and then the upper crimping teeth 32a pass through the through hole 34a of the upper pressure plate 34 and contacts the sheet P. At this time, since the liquid LQ has spread over the surface of the upper crimping teeth 32a, the liquid is applied from the upper crimping teeth 32a in contact with the sheet P to the liquid application position on the sheet P. When the liquid application to the liquid application position is completed, the electric cylinder 370 is extended to separate the upper crimping teeth 32a and the upper pressure plate 34 from the sheet P. The aforementioned contact and separation operation of the upper crimping teeth 32a and the upper pressure plate 34 with respect to the sheet P corresponds to the liquid applying operation, which is repeated on the sheets P of the sheet bundle Pb.

When the sheet bundle Pb constructed of a given number of sheets P is placed on the internal tray 22, the electric cylinder 370 is further contracted to move the upper crimping teeth 32a toward the lower crimping teeth 32b. As illustrated in FIG. 10C, the upper crimping teeth 32a further moves toward the lower crimping teeth 32b with the sheet bundle Pb sandwiched between the upper crimping teeth 32a and the lower crimping teeth 32b. Thus, the upper crimping teeth 32a and the lower crimping teeth 32b press and deform the sheet bundle Pb to crimp and bind the sheet bundle Pb. In short, the crimp binding operation is performed.

Now, a description is given of a configuration of the stapling unit 155.

Specifically, a detailed description is now given of the stapling unit 155 having a function of executing a stapling process.

Figure 11:
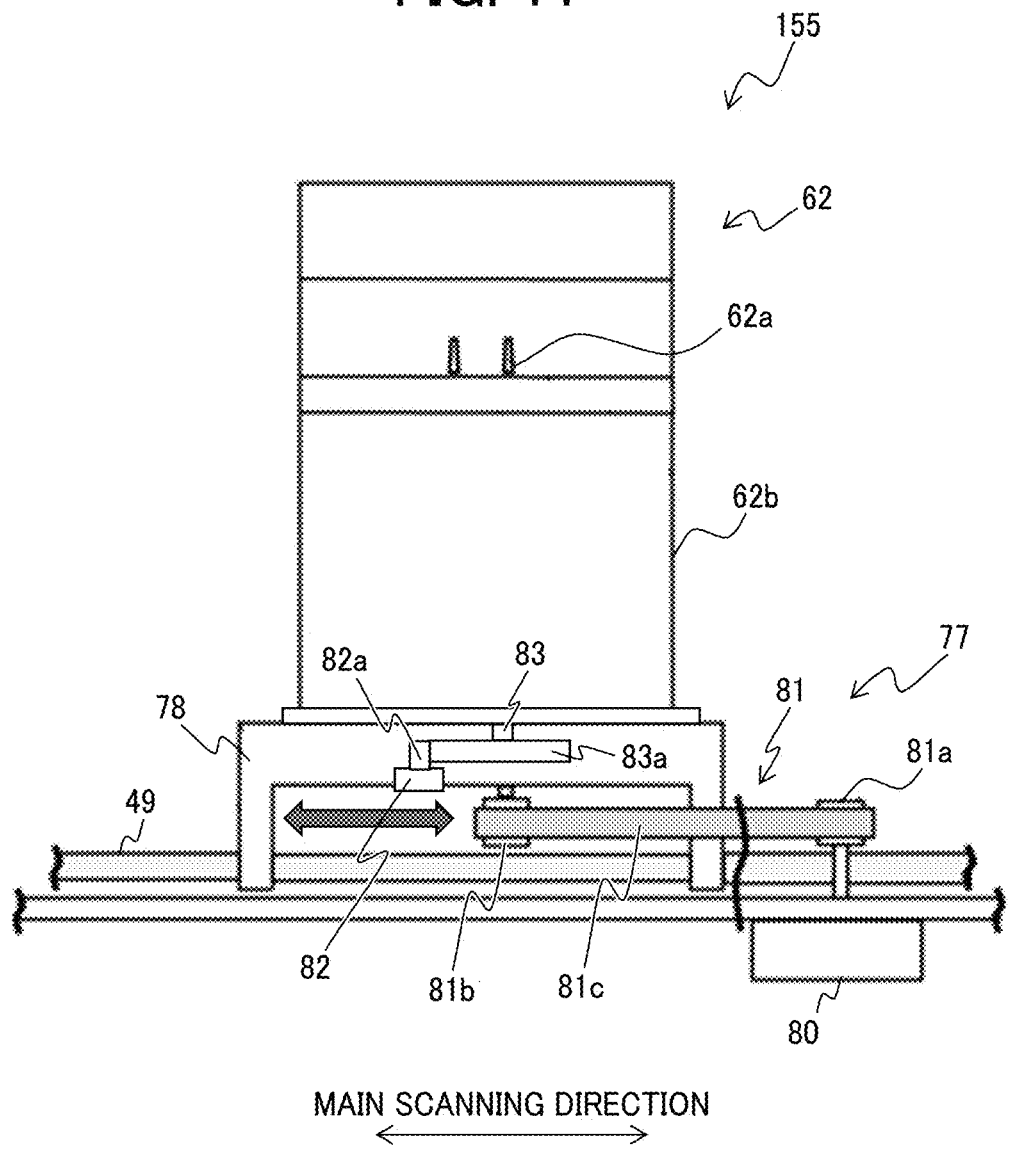
FIG. 11 is a schematic view of an upstream side of a stapling unit of the post-processing apparatus of FIG. 2 in a conveyance direction.

FIG. 11 is a view of an upstream side of the stapling unit 155 in the conveyance direction.

The stapling unit 155 includes a stapler 62 that binds the sheet bundle Pb with staples. The stapler 62 is disposed downstream from the internal tray 22 in the conveyance direction and apart from the edge binder 25 in the main scanning direction.

The stapler 62 serving as a post-processing device has a configuration of performing so-called "stapling" (i.e., stapling process) to bind the sheet bundle Pb with a staple or staples. More specifically, the stapler 62 includes a stapling-part drive motor 62d illustrated in FIG. 13. The stapling-part drive motor 62d drives a stapling part 62a. A driving force of the stapling-part drive motor 62d causes a staple loaded in the stapling part 62a to pass through the sheet bundle Pb. Thus, the stapling part 62a binds the sheet bundle Pb. Since the stapler 62 has a typical configuration, a detailed description thereof will be omitted unless otherwise required.

As illustrated in FIG. 11, the stapling unit 155 includes a stapling-unit movement assembly 77. The stapling-unit movement assembly 77 moves the stapling unit 155 in the main scanning direction along the downstream end, in the conveyance direction, of the sheet P or the sheet bundle Pb placed on the internal tray 22. In other words, the stapling unit 155 moves in the main scanning direction along the guide shaft 49 between a standby position HP2 as illustrated in FIGS. 15A to 15C and a position where the stapling unit 155 faces the binding position B as illustrated in FIG. 15D.

The stapling-unit movement assembly 77 includes, for example, a base 78, the guide shaft 49, a stapling-unit movement motor 80, and a driving force transmission assembly 81. The driving force transmission assembly 81 transmits a driving force of the stapling-unit movement motor 80 to the base 78 via pullies 81a and 81b and a timing belt 81c. A stapler shaft 83 provided with a drive transmission gear 83a is fixed to a bottom face of a stapling frame 62b that holds the components of the stapler 62. The stapler shaft 83 and the drive transmission gear 83a are held by the base 78 on which the stapling frame 62b is disposed, so as to be rotatable in the forward and reverse directions. The drive transmission gear 83a meshes with an output gear 82a of a stapler pivot motor 82. The stapler 62 can be rotated in the forward and reverse directions about the stapler shaft 83 on the base 78 by a driving force transmitted from the stapler pivot motor 82 to the stapler shaft 83 via the output gear 82a and the drive transmission gear 83a.

The edge binder 25 and the stapling unit 155 are supported by the common guide shaft 49. The edge-binder movement assembly 47 and the stapling-unit movement assembly 77 move the edge binder 25 and the stapling unit 155 in the main scanning direction along the common guide shaft 49. The edge-binder movement assembly 47 and the stapling-unit movement assembly 77 can independently move the edge binder 25 and the stapling unit 155.

Now, a description is given of a configuration of a modification of the stapling unit 155 described above.

Figure 12:
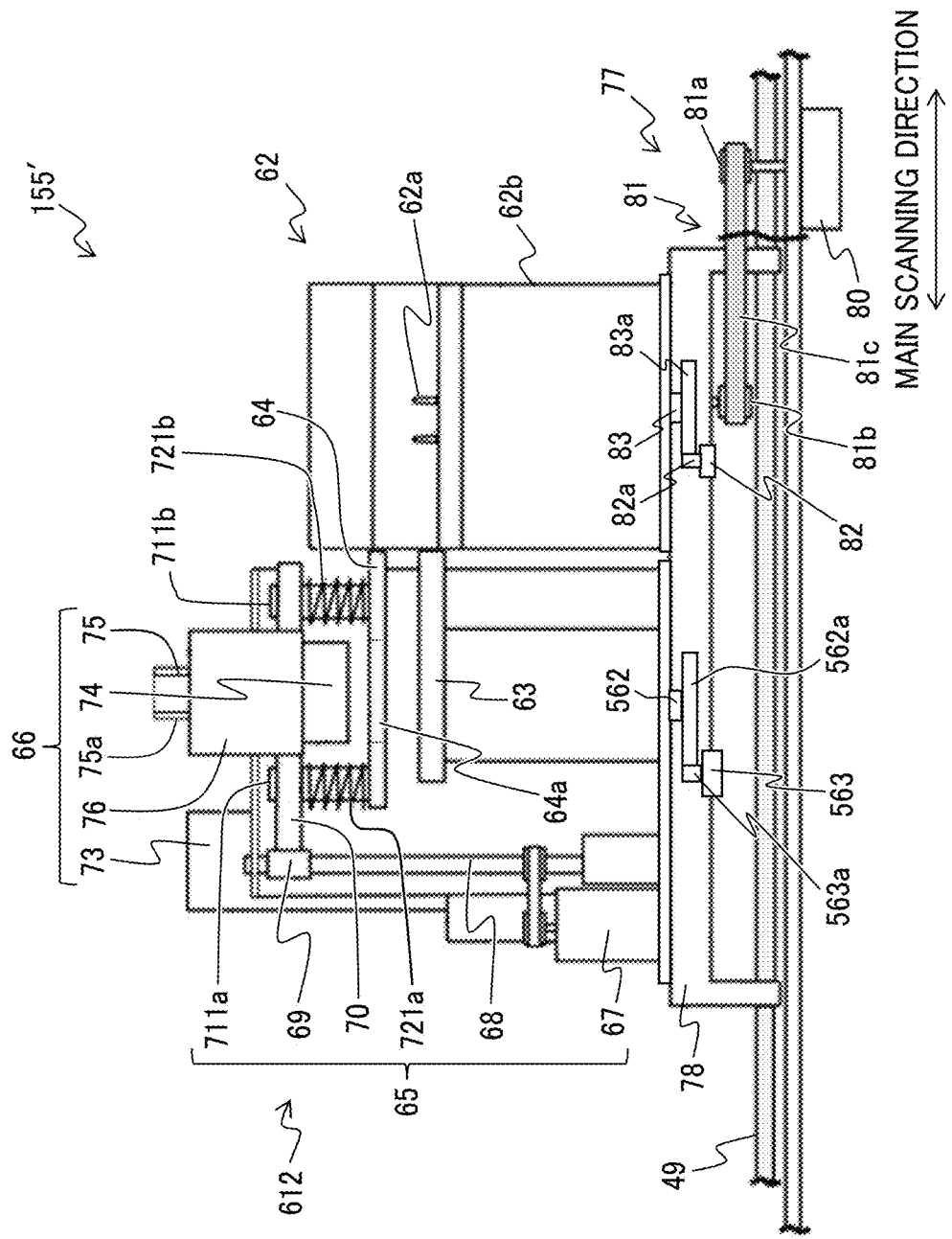
FIG. 12 is a schematic view of an upstream side of a stapling unit as a modification of the stapling unit of FIG. 11 in the conveyance direction.

FIG. 12 illustrates a stapling unit 155' as a modification of the stapling unit 155.

Specifically, FIG. 12 is a view of an upstream side of the stapling unit 155' in the conveyance direction.

The stapling unit 155' is different from the stapling unit 155 in that the stapling unit 155' includes a second liquid applier 612 in addition to the stapler 62. As illustrated in FIG. 12, the stapling unit 155' includes the second liquid applier 612 and the stapler 62. The second liquid applier 612 and the stapler 62 are disposed downstream from the internal tray 22 in the conveyance direction and adjacent to each other in the main scanning direction.

The second liquid applier 612 executes "liquid application" of applying liquid stored in a second liquid storage tank 73 to the sheet P or the sheet bundle Pb placed on the internal tray 22. A given region including a position to which the liquid is applied on the sheet P or the sheet bundle Pb by the second liquid applier 612 corresponds to a binding position to be stapled. As illustrated in FIG. 12, the second liquid applier 612 includes a second lower pressure plate 63, a second upper pressure plate 64 having a through hole 64a, a second liquid-applier movement assembly 65, and a second liquid application assembly 66. The second liquid-applier movement assembly 65 includes, for example, a second liquid-applier movement motor 67, a second trapezoidal screw 68, a second nut 69, a second base plate 70, second columns 711a and 711b, and second coil springs 721a and 721b. The second liquid application assembly 66 includes the second liquid storage tank 73, a second liquid application member 74, a third liquid supplier 75 around which a protector 75a is fitted, and a second joint 76. Since the second liquid application assembly 66 and the liquid application assembly 36 have common configurations, redundant descriptions thereof will be omitted unless otherwise required. Since the configuration of the stapler 62 is like the configuration illustrated in FIG. 11, a detailed description thereof will be omitted unless otherwise required. Since the second liquid applier 612 and the liquid applier 31 that is illustrated in FIG. 3 have common pivot mechanisms, redundant descriptions thereof will be omitted unless otherwise required.

In the binding process, the stapling unit 155' that is illustrated in FIG. 12 performs the liquid application process on the sheet P to loosen and soften the binding position, allowing the staple to easily pass through the sheet bundle Pb. As a result, the number of sheets to be bound per sheet bundle Pb is increased as compared with a case where the stapling process is performed without applying the liquid.

Now, a description is given of a configuration of a control block of the post-processing apparatus 3.

FIG. 13 is a diagram illustrating a hardware configuration of the post-processing apparatus 3.

As illustrated in FIG. 13, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the OF 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller that is thus configured cooperates with hardware resources of the post-processing apparatus 3 to construct functional blocks that implement functions of the post-processing apparatus 3. In other words, the CPU 101, the RAM 102, the ROM 103, and the HDD 104 construct the controller 100 that controls the operation of the post-processing apparatus 3.

The OF 105 is an interface that connects the conveyance roller pairs 10, 11, 14, and the switching claw 20, the side fences 24L and 24R, the contact-separation motor 32d, the crimper pivot motor 56, the liquid-applier movement motor 37, the liquid-applier pivot motor 563, the edge-binder movement motor 50, the stapling-part drive motor 62d, the stapler pivot motor 82, the stapling-unit movement motor 80, the liquid supply pump 55, the position sensor 40a, the first liquid-amount sensor 43a, the second liquid-amount sensor 52a, the standby position sensor 51, the encoder sensor 541, and a control panel 110 to the common bus 109.

The controller 100 controls, via the OF 105, the operations of the conveyance roller pairs 10, 11, 14, and 15, the switching claw 20, the side fences 24L and 24R, the contact-separation motor 32d, the crimper pivot motor 56, the liquid-applier movement motor 37, the liquid-applier pivot motor 563, the edge-binder movement motor 50, the stapling-part drive motor 62d, the stapler pivot motor 82, the stapling-unit movement motor 80, and the liquid supply pump 55. On the other hand, the controller 100 acquires detection results from the position sensor 40a, the first liquid-amount sensor 43a, the second liquid-amount sensor 52a, the standby position sensor 51, and the encoder sensor 541. Although FIG. 13 illustrates the components related to the stapling unit 155 and the edge binder 25 that executes the edge binding, the components related to the saddle binder 28 that executes the saddle binding are controlled by the controller 100 like the components related to the stapling unit 155 and the edge binder 25 that executes the edge binding.

As illustrated in FIG. 1, the image forming apparatus 2 includes the control panel 110. The control panel 110 includes an operation unit that receives instructions input by a user and a display serving as a notifier that notifies the user of information. Thus, the control panel 110 serves as an operation device. The operation unit includes, for example, hard keys and a touch panel superimposed on the display. The control panel 110 acquires information from the user through the operation unit and provides information to the user through the display. Note that a specific example of the notifier is not limited to the display and may be a light emitting diode (LED) lamp or a speaker. The post-processing apparatus 3 may include the control panel 110 like the control panel 110 described above.

As described above, the post-processing apparatus 3 implements a function of performing operation control related to the liquid application by software (control programs) executed by the CPU 101 with hardware resources included in the controller 100.

Now, a description is given of a binding process.

Specifically, a description is now given of a flow of a binding process executed by the edge binder 25 included in the post-processing apparatus 3.

Figure 14:
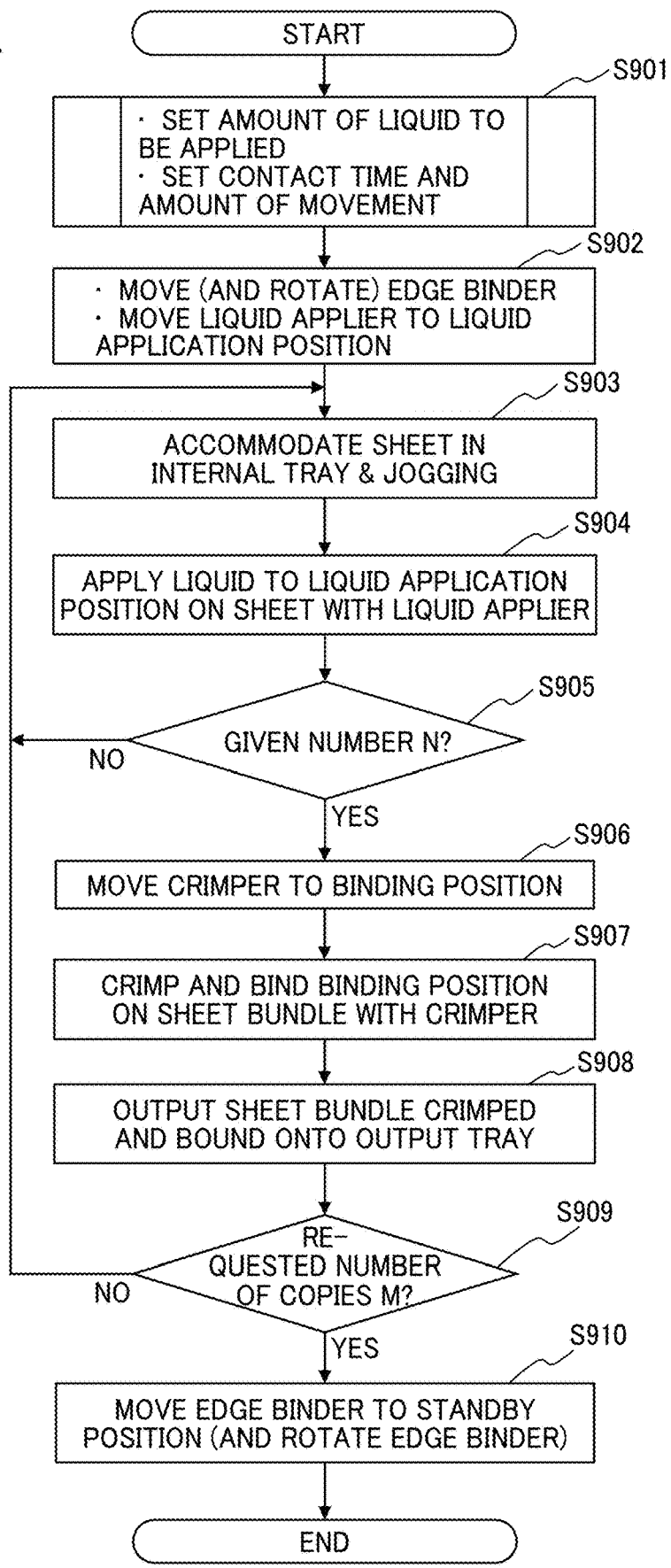
FIG. 14 is a flowchart of a binding process performed by the edge binder of FIG. 3.

FIG. 14 is a flowchart of an example binding process.

FIGS. 15A to 15D are diagrams illustrating the positions of the liquid applier 31 and the crimper 32 during the binding process.

FIGS. 15A to 15D do not illustrate changes in the postures of the liquid applier 31 and the crimper 32. For example, the controller 100 starts the binding process illustrated in FIG. 14 when the controller 100 acquires an instruction to execute the binding process from the image forming apparatus 2. In the following description, the instruction to execute the binding process may be referred to as a "binding command."

The binding command includes the condition for the crimp binding performed by the crimper 32, which may be referred to as "binding condition" in the following description. Examples of the binding condition include, but are not limited to, the type of the sheet P (i.e., information affecting the spread of liquid, such as material and thickness), the number of sheets P of the sheet bundle Pb, the number of sheet bundles Pb to be bound, the binding position B (liquid application position B) in the main scanning direction, the binding posture of the edge binder 25, and the operating mode selected through the control panel 110. In the following description, the number of sheets P of the sheet bundle Pb may be referred to as "given number N" whereas the number of sheet bundles Pb to be bound may be referred to as "requested number of copies M." The liquid applier 31 and the crimper 32 are in the parallel binding posture and at the standby position HP1 as illustrated in FIG. 15A at the start of the binding process. As illustrated in FIG. 15A, the standby position HP1 is away in the width direction from the sheet P placed on the internal tray 22.

As illustrated in FIG. 14, in step S901, the controller 100 executes a process for setting the amount of liquid to be applied and a process for setting the contact time and the amount of movement. In the process for setting the amount of liquid to be applied, the amount of liquid to be applied to the liquid application position B illustrated in FIG. 15B is set. In the following description, the amount of liquid to be applied may be referred to simply as "liquid application amount." In the process for setting the contact time and the amount of movement, the time during which the end of the liquid application member 44 is in contact with the liquid application position B on the sheet P and the amount by which the liquid application member 44 in contact with the sheet P or the sheet bundle Pb further moves toward the sheet P or the sheet bundle Pb. In the following description, the time during which the leading end of the liquid application member 44 is in contact with the liquid application position B on the sheet P may be referred to simply as the "contact time" whereas the amount by which the liquid application member 44 in contact with the sheet P or the sheet bundle Pb further moves toward the sheet P or the sheet bundle Pb may be referred to simply as the "amount of movement." In a case where the liquid application member 44 is an elastic member, the "amount of movement" may also be ascertained as the amount of deformation of the liquid application member 44. A detailed description is given later of the process for setting the amount of liquid to be applied with reference to FIG. 17. A detailed description is given later of the process for setting the contact time and the amount of movement with reference to FIG. 18.

When the posture that is instructed by the binding command is the "oblique binding posture," in step S902, the controller 100 drives the crimper pivot motor 56 to rotate the liquid applier 31 and the crimper 32 of the edge binder 25 into the oblique binding posture. Alternatively, when the posture that is instructed by the binding command is the "oblique binding posture," only the crimper 32 may be rotated to the oblique binding posture while the liquid applier 31 may not be rotated. In this case, the driving assembly may be simplified as compared with a case where both the liquid applier 31 and the crimper 32 are rotated, and thus effects of cost reduction, downsizing of the apparatus, and reduction of failure of the device are exhibited.

On the other hand, when the posture that is instructed by the binding command is the "parallel binding posture," the controller 100 omits the aforementioned operation of rotating the liquid applier 31 and the crimper 32 of the edge binder 25 to the oblique binding posture.

In step S902, the controller 100 also drives the edge-binder movement motor 50 to move the edge binder 25 in the main scanning direction so that the liquid applier 31 faces the liquid application position B instructed by the binding command. Note that the controller 100 executes the operation of step S902 before a first sheet P is conveyed to the internal tray 22 by the conveyance roller pairs 10, 11, 14, and 15.

Subsequently, in step S903, the controller 100 rotates the conveyance roller pairs 10, 11, 14, and 15 to accommodate the sheet P on which an image is formed by the image forming apparatus 2 in the internal tray 22. In step S903, the controller 100 also moves the side fences 24L and 24R to align the position, in the main scanning direction, of the sheet P placed on the internal tray 22. In short, the controller 100 performs so-called jogging.

Subsequently, in step S904, the controller 100 causes the liquid applier 31 positioned at the liquid application position B to execute the liquid application process on the sheet P, which has been placed on the internal tray 22 in the immediately preceding step S903. In other words, the controller 100 drives the liquid-applier movement motor 37 to cause the liquid application member 44 to contact the liquid application position B on the sheet P placed on the internal tray 22 as illustrated in FIG. 15B.

More specifically, the controller 100 adjusts the time from when the liquid application member 44 comes into contact with the sheet P to when the liquid application member 44 starts to separate from the sheet P so as to be a contact time $\beta$ set in the process for setting the contact time and the amount of movement. The controller 100 also adjusts the amount of movement of the liquid application member 44 toward the sheet P so as to be an amount of movement $\gamma$ set in the process for setting the contact time and the amount of movement. As a result, the liquid is applied to the sheet P by a liquid application amount $\alpha$ set in the process for setting the amount of liquid to be applied.

A greater amount of liquid is applied from the liquid application member 44 to the sheet P as the contact time $\beta$ increases. In addition, a greater amount of the liquid application member 44 is elastically deformed or crushed as the amount of movement $\gamma$ increases. Thus, a greater amount of liquid is applied to the sheet P per unit time. In other words, the liquid application amount $\alpha$ increases as the contact time $\beta$ increases. The liquid application amount $\alpha$ also increases as the amount of movement $\gamma$ increases. The amount of movement $\gamma$ indicates the area of contact between the liquid application member 44 and the sheet P or a pressure from the liquid application member 44 against the sheet P. The amount of movement $\gamma$ may be controlled based on the amount of movement of the liquid application member 44 (in other words, the base plate 40) toward the sheet P. In other words, the amount of movement $\gamma$ increases as the amount of movement of the liquid application member 44 toward the sheet P increases whereas the amount of movement $\gamma$ decreases as the amount of movement of the liquid application member 44 toward the sheet P decreases.

Subsequently, in step S905, the controller 100 determines whether the number of sheets P accommodated in the internal tray 22 has reached the given number N instructed by the binding command.

When the controller 100 determines that the number of sheets P accommodated in the internal tray 22 has not reached the given number N (NO in step S905), the controller 100 executes the operations of steps S903 and S904 again. In other words, the controller 100 executes the operations of steps S903 and S904 each time the sheet P is conveyed to the internal tray 22 by the conveyance roller pairs 10, 11, 14, and 15. Note that the liquid applier 31 may execute the liquid application process on all or some of the sheets P of the sheet bundle Pb. For example, the controller 100 may cause the liquid applier 31 to execute the liquid application process on the sheet P at intervals of one in every "n" sheets.

When the controller 100 determines that the number of sheets P accommodated in the internal tray 22 has reached the given number N (YES in step S905), in step S906, the controller 100 drives the edge-binder movement motor 50 to move the edge binder 25 in the main scanning direction so that the crimper 32 faces the binding position B as illustrated in FIG. 15C.

Subsequently, in step S907, the controller 100 causes the crimper 32 to perform crimp binding on the sheet bundle Pb accommodated in the internal tray 22.

In step S908, the controller 100 causes the conveyance roller pair 15 to output the sheet bundle Pb thus crimped and bound by the crimper 32 to the second output tray 26.

Specifically, the controller 100 drives the contact-separation motor 32d to cause the upper crimping teeth 32a and the lower crimping teeth 32b to sandwich the binding position B on the sheet bundle Pb placed on the internal tray 22. The sheet bundle Pb is pressed and deformed between the upper crimping teeth 32a and the lower crimping teeth 32b. Thus, the crimper 32 crimps and binds the sheet bundle Pb. Thereafter, the controller 100 rotates the conveyance roller pair 15 to output the sheet bundle Pb thus crimped and bound to the second output tray 26.

The sheet bundle Pb that is placed on the internal tray 22 has the binding region sandwiched between the upper crimping teeth 32a and the lower crimping teeth 32b in step S907. The binding region overlaps the liquid application region contacted by the end of the liquid application member 44 in step S904. In other words, the crimper 32 crimps and binds a region to which the liquid has been applied by the liquid applier 31 on the sheet bundle Pb placed on the internal tray 22. The binding region that is sandwiched by the upper crimping teeth 32a and the lower crimping teeth 32b may completely or partially overlaps the liquid application region contacted by the end of the liquid application member 44, to obtain a sufficient binding strength.

Subsequently, in step S909, the controller 100 determines whether the number of sheet bundles Pb thus output has reached the requested number of copies M indicated by the binding command.

When the controller 100 determines that the number of sheet bundles Pb thus output has not reached the requested number of copies M (NO in step S909), the controller 100 executes the operations of step S903 and the following steps again. In other words, when NO in step S909, the controller 100 repeats the operations of steps S903 to S908 until the number of sheet bundles Pb output to the second output tray 26 reaches the requested number of copies M.

When the controller 100 determines that the number of sheet bundles Pb output to the second output tray 26 has reached the requested number of copies M (YES in step S909), in step S910, the controller 100 drives the edge-binder movement motor 50 to move the edge binder 25 to the standby position HP1 as illustrated in FIG. 15D. When the posture that is instructed by the binding command is the "oblique binding posture," in step S910, the controller 100 also drives the crimper pivot motor 56 to rotate the liquid applier 31 and the crimper 32 into the parallel binding posture. By contrast, when the posture that is instructed by the binding command is the "parallel binding posture," the controller 100 omits the aforementioned operation of rotating the liquid applier 31 and the crimper 32 to the parallel binding posture. As a result, the liquid applier 31 and the crimper 32 return to the standby position HP1 position illustrated in FIG. 15D. Note that, in steps S902 and S910, the execution order of the movement in the main scanning direction and the rotation in the forward and reverse directions of the liquid applier 31 and the crimper 32 is not limited to the aforementioned order and may be reversed.

Now, a description is given of parameters for setting the amount of liquid to be applied.

FIG. 16A is a table of example parameters T for the sheet thickness.

FIG. 16B is a table of example parameters N for the number of sheets to be bound.

More specifically, the table illustrated in FIG. 16A retains a correspondence relationship between the parameter T and the "basis weight ($g/m^2$)" representing the thicknesses of the sheet P. The table illustrated in FIG. 16B retains a correspondence relationship between the parameter N and the "number of sheets to be bound" representing the number of sheets P of the sheet bundle Pb. The tables illustrated in FIGS. 16A and 16B are stored in the HDD 104.

The parameters T and N are parameters for setting the liquid application amount α in the process for setting the amount of liquid to be applied, which will be described later. As illustrated in FIG. 16A, the parameter T has a greater value as the thickness of the sheet P increases, in other words, as the basis weight increases. In other words, there is a positive correlation between the parameter T and the thickness of the sheet P. As illustrated in FIG. 16B, the parameter N has a greater value as the number of sheets to be bound increases. In other words, there is a positive correlation between the parameter N and the number of sheets to be bound. Note that specific values of the parameters T and N are not limited to the examples illustrated in FIGS. 16A and 16B.

The operating mode of the post-processing apparatus 3 is changeable through the control panel 110. Examples of the operating mode of the post-processing apparatus 3 includes, but are not limited to, a productivity priority mode and a binding-strength priority mode. Before executing the binding process described above with reference to FIG. 14, the controller 100 receives, through the control panel 110, a user's operation of selecting one of the productivity priority mode and the binding-strength priority mode.

The productivity priority mode is an operating mode in which priority is given to the productivity of the post-processing apparatus 3 (i.e., the speed at which the sheet bundles Pb are produced) over the binding strength in the crimp binding performed by the crimper 32. The binding-strength priority mode is an operating mode in which priority is given to the binding strength of the sheet bundle Pb in the crimp binding process performed by the crimper 32 over the productivity of the post-processing apparatus 3. In the present embodiment, the liquid applier 31 takes shorter time to apply liquid to the sheet P in the productivity priority mode than in the binding-strength priority mode, to enhance the productivity of the post-processing apparatus 3 in the productivity priority mode more than in the binding-strength priority mode. Note that a specific method for enhancing the productivity of the post-processing apparatus 3 is not limited to the example described above.

Now, a description is given of a process for setting the amount of liquid to be applied (i.e., the liquid application amount).

Figure 17:
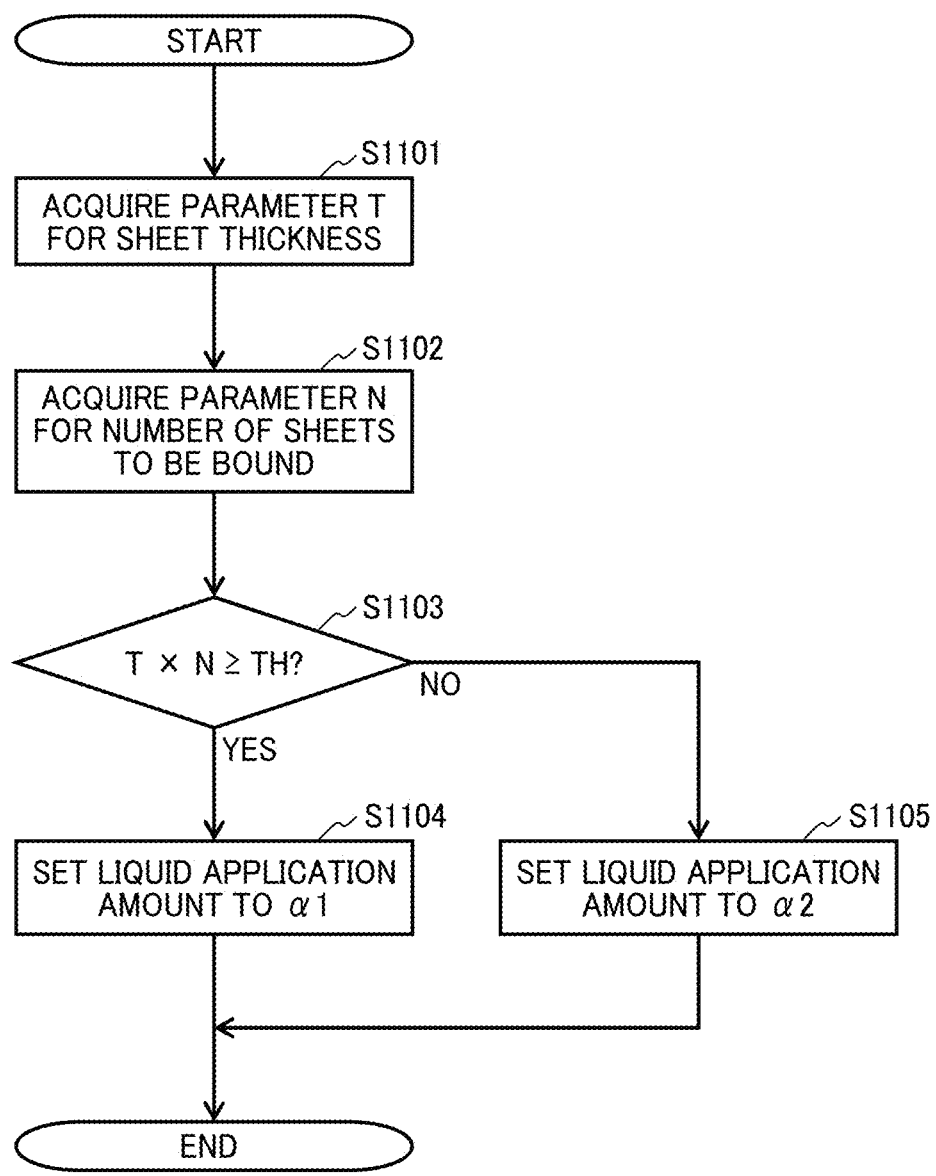
FIG. 17 is a flowchart of an example process for setting the amount of liquid to be applied.

FIG. 17 is a flowchart of an example process for setting the amount of liquid to be applied.

In the process for setting the amount of liquid to be applied, the amount of liquid to be applied to the sheet P in step S904 in FIG. 14 is set.

First, in step S1101, the controller 100 acquires, from the table illustrated in FIG. 16A, the parameter T for the sheet thickness that is instructed by the binding command.

In step S1102, the controller 100 acquires, from the table illustrated in FIG. 16B, the parameter N for the number of sheets to be bound that is instructed by the binding command.

Subsequently, in step S1103, the controller 100 compares the product of the acquired parameters T and N (=T×N) with a predetermined threshold TH.

When the product of the parameters T and N is equal to or greater than the threshold TH (YES in step S1103), in step S1104, the controller 100 sets the liquid application amount to α1.

By contrast, when the product of the parameters T and N is less than the threshold TH (NO in step S1103), in step S1105, the controller 100 sets the liquid application amount to α2.

Note that α1 is a value greater than α2 (α1>α2). In this way, the controller 100 increases the liquid application amount α as the product of the parameters T and N increases. More specifically, the controller 100 increases the liquid application amount α as the sheet thickness increases or as the number of sheets to be bound increases. In other words, the controller 100 changes the liquid application amount α according to the binding condition.

Now, a description is given of the process for setting the contact time and the amount of movement.

Figure 18:
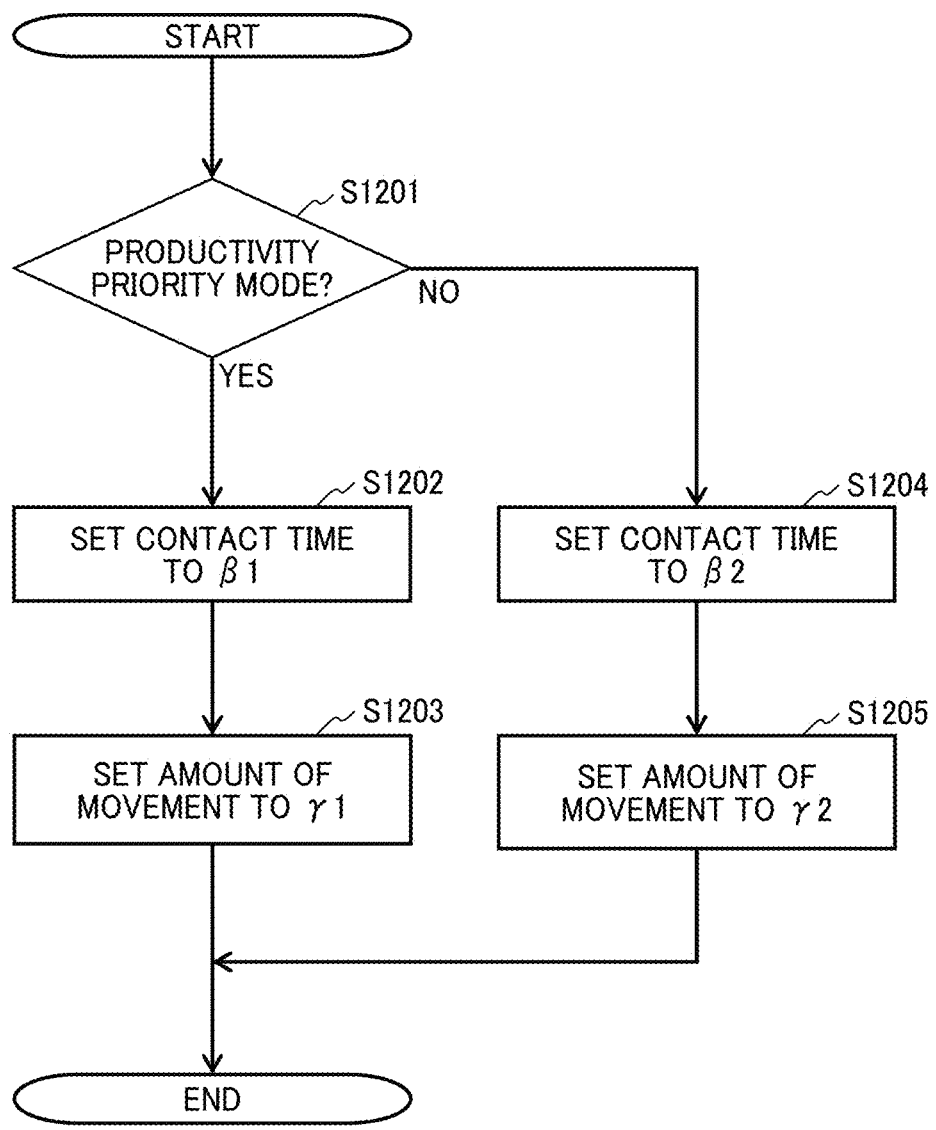
FIG. 18 is a flowchart of an example process for setting the contact time and the amount of movement.

FIG. 18 is a flowchart of an example process for setting the contact time and the amount of movement.

In the process for setting the contact time and the amount of movement, a combination of the contact time β and the amount of movement γ is set to attain the liquid application amount α1 or α2 set in the process for setting the amount of liquid to be applied, according to the operating mode of the post-processing apparatus 3. In the following description, the liquid application amounts α1 and α2 may be collectively referred to as "liquid application amount α."

First, in step S1201, the controller 100 determines the operating mode instructed by the binding command.

When the productivity priority mode is set (YES in step S1201), in step S1202, the controller 100 sets the contact time to β1.

In step S1203, the controller 100 sets the amount of movement to γ1 based on the liquid application amount α set in the process for setting the amount of liquid to be applied and the contact time β1 set in step S1202.

By contrast, when the binding-strength priority mode is set (NO in step S1201), in step S1204, the controller 100 sets the contact time to β2.

In step S1205, the controller 100 sets the amount of movement to γ2 based on the liquid application amount α set in the process for setting the amount of liquid to be applied and the contact time β2 set in step S1204.

Note that β1 is a value smaller than β2 (β1<β2). In other words, the contact time β is shorter when the productivity priority mode is selected than when the binding-strength priority mode is selected. When the contact time β is fixed, the amount of movement γ increases as the liquid application amount α increases. In other words, the amount of movement γ increases as the thickness of the sheet P increases. The amount of movement γ also increases as the number of sheets to be bound increases. The amount of movement γ is inversely proportional to the contact time β. In other words, when the liquid application amount α is fixed, the amount of movement γ decreases as the contact time β increases whereas the amount of movement γ increases as the contact time β decreases (i.e., γ1>γ2).

Now, a description is given of a liquid-amount control process.

Figure 19:
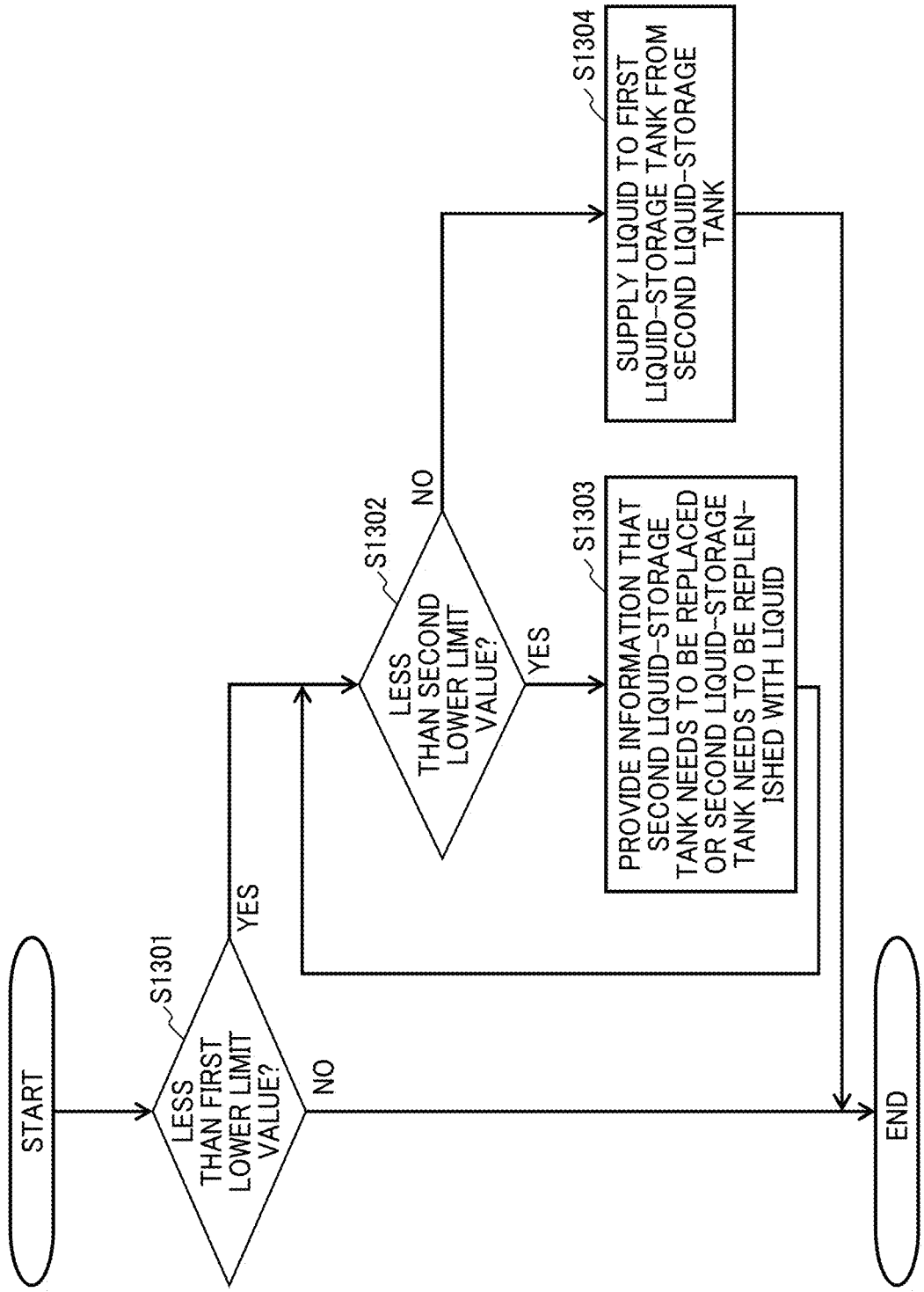
FIG. 19 is a flowchart of an example liquid-amount control process.

FIG. 19 is a flowchart of an example liquid-amount control process.

In the liquid-amount control process, the amount of liquid that is stored in the first liquid-storage tank 43 is controlled.

The controller 100 executes the liquid-amount control process illustrated in FIG. 19 at a desired time, for example, at the time of initial processing when the power of the post-processing apparatus 3 is turned on or at the time of starting the binding process illustrated in FIG. 14.

First, in step S1301, the controller 100 determines whether the amount of liquid in the first liquid-storage tank 43 detected by the first liquid-amount sensor 43a has fallen below a first lower limit value.

The first lower limit value is set to, for example, a value corresponding to the maximum amount of liquid to be applied in one binding process. When the controller 100 determines that the amount of liquid in the first liquid-storage tank 43 is equal to or greater than the first lower limit value (NO in step S1301), the controller 100 ends the liquid-amount control process without executing the operations in step S1302 and the following steps.

By contrast, when the controller 100 determines that the amount of liquid in the first liquid-storage tank 43 has fallen below the first lower limit value (YES in step S1301), in step S1302, the controller 100 determines whether the amount of liquid in the second-liquid-storage-tank fixer 52 detected by the second liquid-amount sensor 52a has fallen below a second lower limit value. The second lower limit value is set to, for example, a value corresponding to the amount of liquid supplied to the first liquid-storage tank 43 in step S1304 described later.

When the controller 100 determines that the amount of liquid in the second-liquid-storage-tank fixer 52 has fallen below the second lower limit value (YES in step S1302), in step S1303, the controller 100 provides information through the control panel 110 that the second liquid-storage tank 53 attached to the second-liquid-storage-tank fixer 52 needs to be replaced or the second liquid-storage tank 53 needs to be replenished with liquid in a case where the second liquid-storage tank 53 is not detachable. The way of providing the information in step S1303 is not particularly limited. For example, a message may be displayed on a display, or an LED lamp may be lit (blinked) as an alternative to the message on the display. The controller 100 continues to provide the information in step S1303 until the second liquid-storage tank 53 is replaced and the amount of liquid in the second-liquid-storage-tank fixer 52 becomes equal to or greater than the second lower limit value.

When the controller 100 determines that the amount of liquid in the second-liquid-storage-tank fixer 52 is equal to or greater than the second lower limit value (NO in step S1302), in step S1304, the controller 100 drives the liquid supply pump 55 to supply a predetermined amount of liquid from the second-liquid-storage-tank fixer 52 to the first liquid-storage tank 43. The amount of liquid that is supplied to the first liquid-storage tank 43 in step S1304 is set so that the amount of liquid in the first liquid-storage tank 43 does not exceed the first upper limit value.

A description is now given of some or all of the advantages according to the embodiment described above, enumeration of which is not exhaustive or limiting.

According to the embodiment described above, at least one of the contact time β and the amount of movement γ is changed to attain the liquid application amount α set according to the binding condition. Since the contact time β and the amount of movement γ can be adjusted simply by controlling the liquid-applier movement motor 37, the liquid application amount α can be adjusted with a simple and inexpensive configuration. As a result, the binding strength appropriate for the binding condition is obtained.

According to the embodiment described above, the binding conditions for determining the liquid application amount α indicate the thickness of the sheet P and the number of sheets to be bound (the number of sheets P of the sheet bundle Pb). The controller 100 increases the liquid application amount α as the thickness of the sheet P increases. The controller 100 also increases the liquid application amount α as the number of sheets to be bound increases. Thus, a stable binding strength is obtained. However, specific examples of the binding condition are not limited to the examples described above. For example, the binding condition may indicate the number of the binding positions B (liquid application positions B) on the sheet bundle Pb or the area of the binding position B (liquid application position B) such as the liquid application region or the binding region.

According to the embodiment described above, the contact time β is shorter when the post-processing apparatus 3 is in the productivity priority mode than when the post-processing apparatus 3 is in the binding-strength priority mode, to shorten the time taken for the liquid applier 31 to apply liquid to the sheet P. As a result, the time taken for the post-processing apparatus 3 to produce the sheet bundles Pb is shortened. According to the embodiment described above, since the amount of movement γ is increased in conjunction with a decrease in the contact time β, the post-processing apparatus 3 maintains both the productivity of the sheet bundles Pb and the appropriate binding strength of the sheet bundles Pb.

According to the embodiment described above, the liquid is supplied to the first liquid-storage tank 43 from the second-liquid-storage-tank fixer 52, which is fixed outside the movement range of the liquid applier 31. Thus, the capacity of the first liquid-storage tank 43 is reduced. Such a reduced capacity of the first liquid-storage tank 43 downsizes the liquid applier 31 and reduces the output of the edge-binder movement motor 50 that moves the liquid applier 31.

Now, a description is given of a liquid application member according to a first modification of the embodiment described above.

Figure 20A:
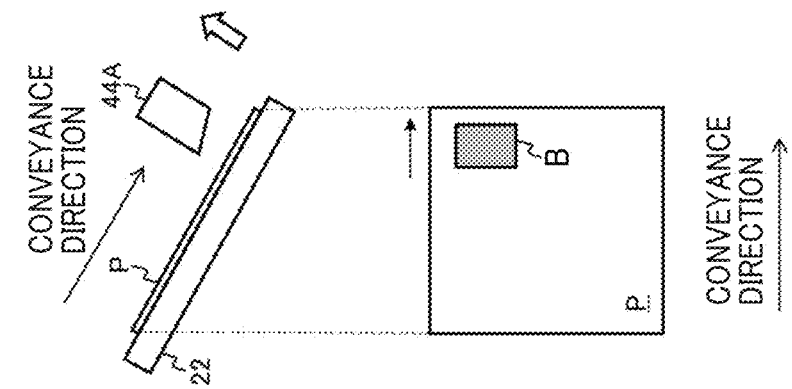
FIGS. 20A to 20C are diagrams illustrating the shape of a liquid application member according to a first modification of the embodiment described above.
Figure 20B:
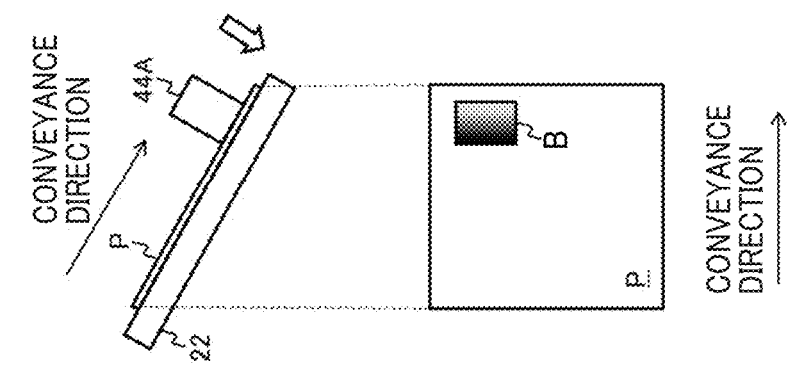
Figure 20C:
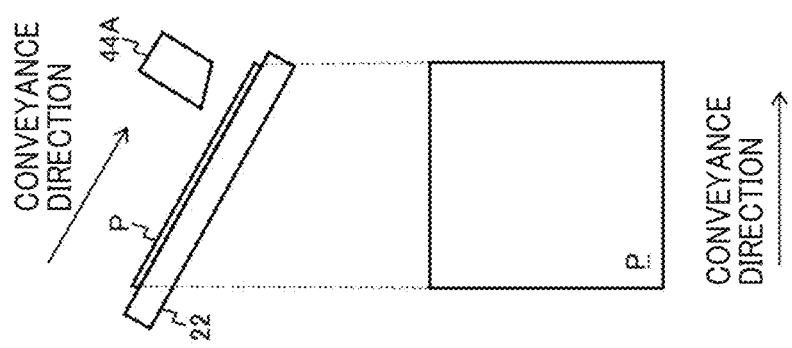

FIGS. 20A to 20C are diagrams illustrating the shape of a liquid application member 44A according to the first modification of the embodiment described above.

Note that detailed descriptions will be omitted of common features of the embodiment described above and the present modification. The following description concentrates on the differences between the embodiment described above and the present modification. The liquid application member 44A according to the first modification is different from the liquid application member 44 having an end face parallel to the sheet P in that an end face of the liquid application member 44A is inclined to be farther from the sheet P placed on the internal tray 22 downstream in the conveyance direction.

As illustrated in FIG. 20A, when the liquid application member 44A is apart from the sheet P, the distance between the end face of the liquid application member 44A and the sheet P decreases upstream and increases downstream in the conveyance direction. When the liquid application member 44A is moved in the thickness direction of the sheet P from the state illustrated in FIG. 20A, the end face of the liquid application member 44A contacts the sheet P from upstream to downstream in the conveyance direction. When the liquid application member 44A is moved back in the thickness direction of the sheet P from the state illustrated in FIG. 20B, the end face of the liquid application member 44A is separated from the sheet P from downstream to upstream in the conveyance direction as illustrated in FIG. 20C.

In other words, according to the first modification, the contact time β during which the liquid application member 44A is in contact with the sheet P and the amount of movement γ of the liquid application member 44A toward the sheet P increase upstream in the conveyance direction. As a result, as illustrated in FIG. 20B, the liquid application amount α in a liquid application region B increases upstream and decreases downstream in the conveyance direction. However, the liquid applied to the liquid application region B moves downstream in the conveyance direction due to gravity. As a result, as illustrated in FIG. 20C, the liquid application amount α in the liquid application region B is leveled after the liquid application member 44A is separated from the sheet P.

Now, a description is given of a liquid application member according to a second modification of the embodiment described above.

Figure 21A:
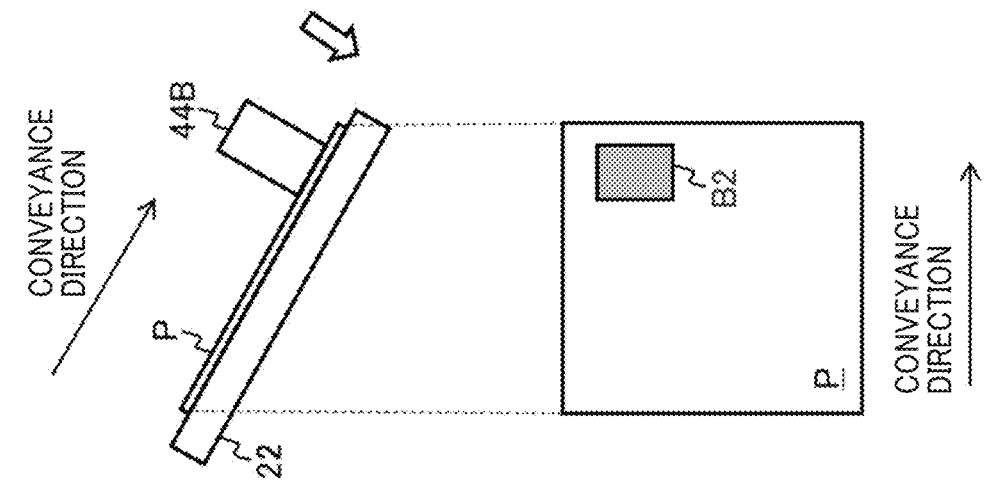
FIGS. 21A to 21C are diagrams illustrating the shape of a liquid application member according to a second modification of the embodiment described above.
Figure 21B:
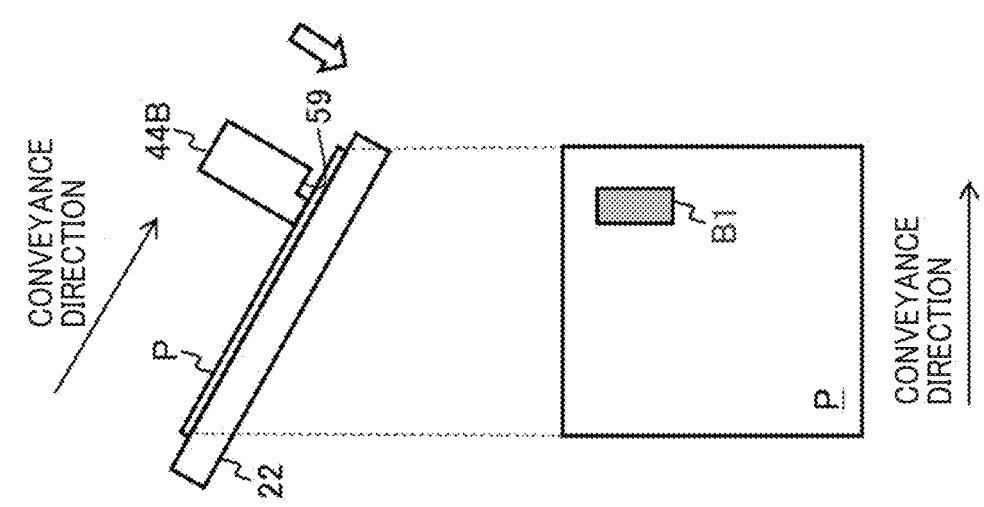
Figure 21C:
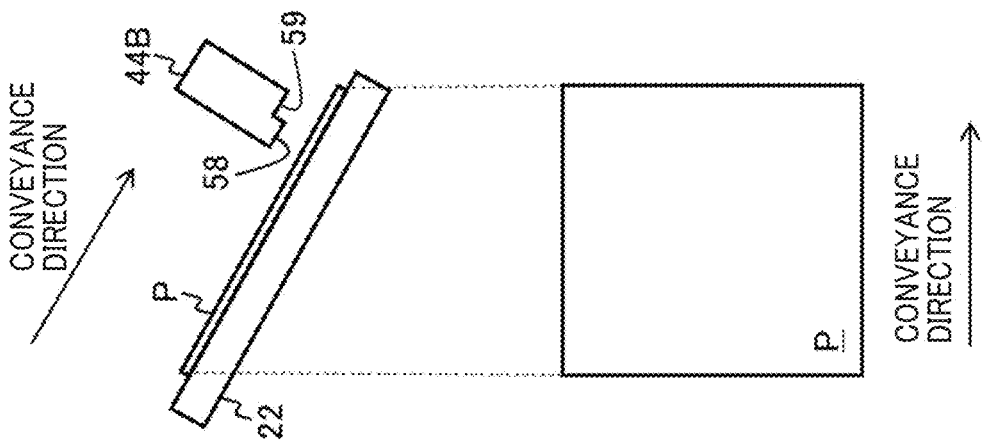

FIGS. 21A to 21C are diagrams illustrating the shape of a liquid application member 44B according to the second modification of the embodiment described above.

Note that detailed descriptions will be omitted of common features of the embodiment described above and the present modification. The following description concentrates on the differences between the embodiment described above and the present modification. The liquid application member 44B according to the second modification is different from the liquid application member 44 having a planar end face in that an end face of the liquid application member 44B includes a first contact surface 58 and a second contact surface 59 that is farther from the sheet P than the first contact surface 58.

As illustrated in FIG. 21A, when the liquid application member 44B is apart from the sheet P, the first contact surface 58 is positioned upstream from the second contact surface 59 in the conveyance direction and closer to the sheet P placed on the internal tray 22 than the second contact surface 59. On the other hand, the second contact surface 59 is positioned downstream from the first contact surface 58 in the conveyance direction and farther from the sheet P placed on the internal tray 22 than the first contact surface 58.

When the liquid application member 44B is moved in the thickness direction of the sheet P from the state illustrated in FIG. 21A, the first contact surface 58 contacts the sheet P whereas the second contact surface 59 is still apart from the sheet P as illustrated in FIG. 21B. When the liquid application member 44B is further moved in the thickness direction of the sheet P from the state illustrated in FIG. 21B, the liquid application member 44B is crushed (deformed) and the second contact surface 59 also contacts the sheet P as illustrated in FIG. 21C.

In other words, the controller 100 brings the liquid application member 44B into contact with the sheet P placed on the internal tray 22 by a first amount of movement $\gamma b1$ to bring only the first contact surface 58 out of the first contact surface 58 and the second contact surface 59 of the liquid application member 44B into contact with the sheet P as illustrated in FIG. 21B. At this time, the area of a liquid application region B1, which is the area of contact between the first contact surface 58 of the liquid application member 44B and the sheet P, is smaller than the area of a liquid application region B2, which is the area of contact between both the first contact surface 58 and the second contact surface 59 of the liquid application member 44B and the sheet P.

On the other hand, the controller 100 brings the liquid application member 44B into contact with the sheet P placed on the internal tray 22 by a second amount of movement γb2 to bring both the first contact surface 58 and the second contact surface 59 of the liquid application member 44B into contact with the sheet P as illustrated in FIG. 21C. The second amount of movement γb2 is greater than the first amount of movement γb1. At this time, the area of the liquid application region B2 is greater than the area of the liquid application region B1 in which only the first contact surface 58 of the liquid application member 44B is in contact with the sheet P.

According to the second modification, the amount of movement γ is changed to adjust the area of the liquid application region B. For example, in a case where the sheet bundle Pb is crimped and bound in a single row in a direction orthogonal to the conveyance direction, the area of the liquid application region B may be reduced as the liquid application region B1 illustrated in FIG. 21B. By contrast, in a case where sheet bundle Pb is crimped and bound in a plurality of rows in the direction orthogonal to the conveyance direction, the area of the liquid application region B may be increased as the liquid application region B2 illustrated in FIG. 21C.

Now, a description is given of a liquid application member according to a third modification of the embodiment described above.

Figure 22A:
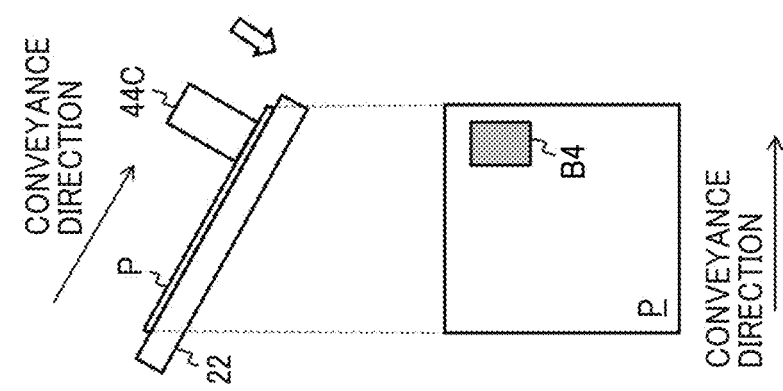
FIGS. 22A to 22C are diagrams illustrating the shape of a liquid application member according to a third modification of the embodiment described above.
Figure 22B:
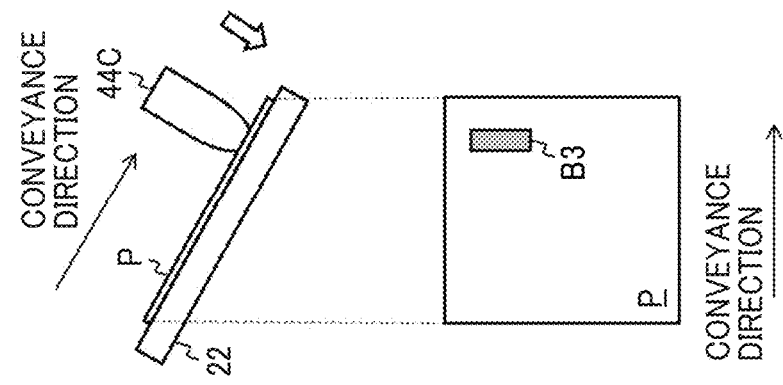
Figure 22C:
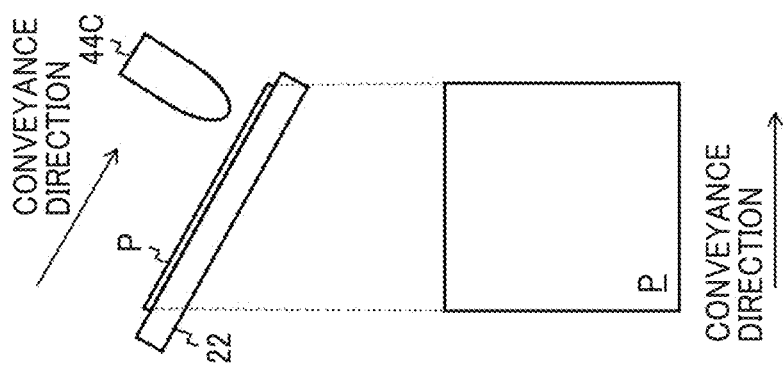

FIGS. 22A to 22C are diagrams illustrating the shape of a liquid application member 44C according to the third modification of the embodiment described above.

Note that detailed descriptions will be omitted of common features of the embodiment described above and the present modification. The following description concentrates on the differences between the embodiment described above and the present modification. The liquid application member 44C according to the third modification is different from the liquid application member 44 having a planar end face in that an end face of the liquid application member 44C is a convex face.

As illustrated in FIG. 22A, when the liquid application member 44C is apart from the sheet P, the end face of the liquid application member 44C is a convex face having a center in the conveyance direction projecting and both ends in the conveyance direction apart from the sheet P. When the liquid application member 44C is moved from the state illustrated in FIG. 22A in the thickness direction of the sheet P as indicated by the arrow in FIG. 22B, the center of the convex face contacts the sheet P and both ends of the convex face are apart from the sheet P as illustrated in FIG. 22B. When the liquid application member 44C is further moved in the thickness direction of the sheet P from the state illustrated in FIG. 22B, the center of the liquid application member 44C is crushed and both ends of the convex face also contact the sheet P as illustrated in FIG. 22C.

In other words, the controller 100 brings the liquid application member 44C into contact with the sheet P placed on the internal tray 22 by a first amount of movement γb3 to bring only a part of the center of the convex face into contact with the sheet P as illustrated in FIG. 22B. At this time, the area of a liquid application region B3 is smaller than the area of a liquid application region B4 in which the entire convex face is in contact with the sheet P.

On the other hand, the controller 100 brings the liquid application member 44B into contact with the sheet P placed on the internal tray 22 by a second amount of movement γb4 to bring the entire convex face into contact with the sheet P as illustrated in FIG. 22C. The second amount of movement γb4 is greater than the first amount of movement γb3. At this time, the area of the liquid application region B4 is greater than the area of the liquid application region B3 in which only a part of the convex face is in contact with the sheet P.

As described above, according to the third modification, the amount of movement γ is changed to adjust the area of the liquid application region B. Since the fine adjustment of the area of the liquid application region B is easier in the third modification than in the second modification, optimum liquid application and crimp binding processes are performed according to the binding condition of the sheet P.

Referring now to FIGS. 23 to 31, a description is given of a post-processing apparatus 3A according to a second embodiment of the present disclosure.

In the following description, components like those of the post-processing apparatus 3 according to the first embodiment are denoted by like reference numerals, and redundant descriptions thereof may be omitted unless otherwise required.

The post-processing apparatus 3A according to the second embodiment includes an edge binder 251. The edge binder 251 is different from the edge binder 25 of the post-processing apparatus 3 according to the first embodiment in which the liquid applier 31 and the crimper 32 are arranged side by side. The edge binder 251 includes a crimper 32' and a liquid applier 131 is disposed at an upstream position in a direction in which the sheet P is conveyed. Such a configuration allows a given number of sheets P to be stacked after the liquid application process and conveyed to the crimper 32' of the edge binder 251 disposed at a downstream position in the direction in which the sheet P is conveyed. Accordingly, the productivity of the binding process performed by the crimper 32' is enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to the opposite conveyance direction and the thickness direction of the sheet P is defined as the "main scanning direction" or the "width direction of the sheet P." The liquid application position to which the liquid is applied on the sheet P or the sheet bundle Pb by the liquid applier 131 corresponds to the binding position on the sheet bundle Pb to be crimped and bound by the crimper 32'. For this reason, in the following description, the liquid application position and the binding position are denoted by the same reference numeral.

Figure 23:
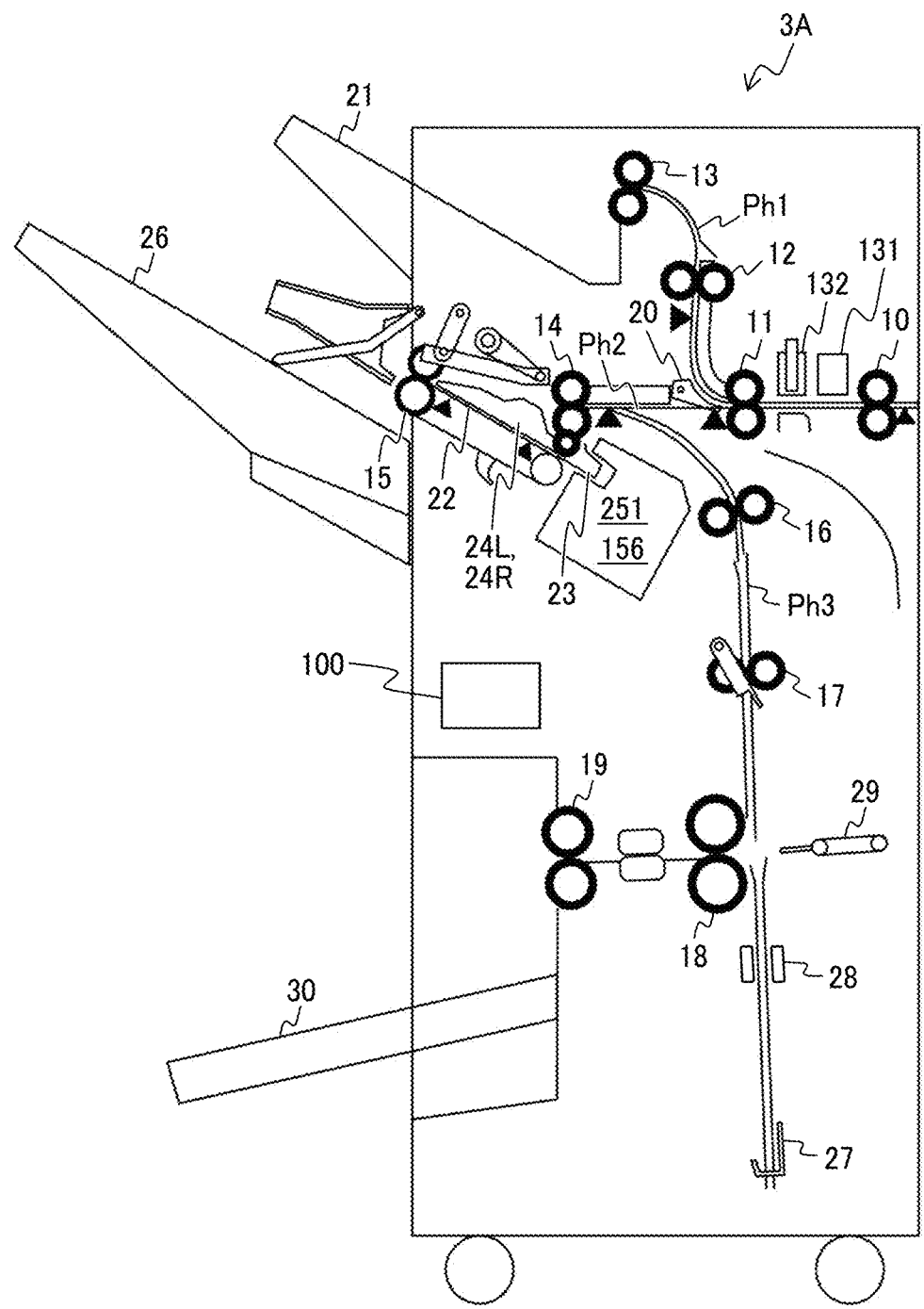
FIG. 23 is a diagram illustrating an internal configuration of a post-processing apparatus according to a second embodiment of the present disclosure.

FIG. 23 is a diagram illustrating an internal configuration of the post-processing apparatus 3A according to the second embodiment of the present disclosure.

Figure 24A:
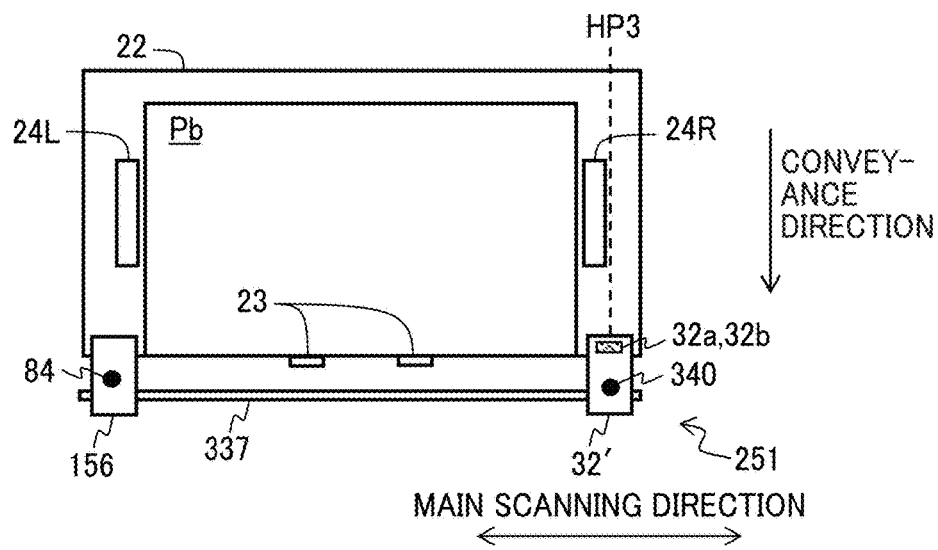
FIGS. 24A to 24C are views of an internal tray of the post-processing apparatus of FIG. 23 in a thickness direction of a sheet.
Figure 24B:
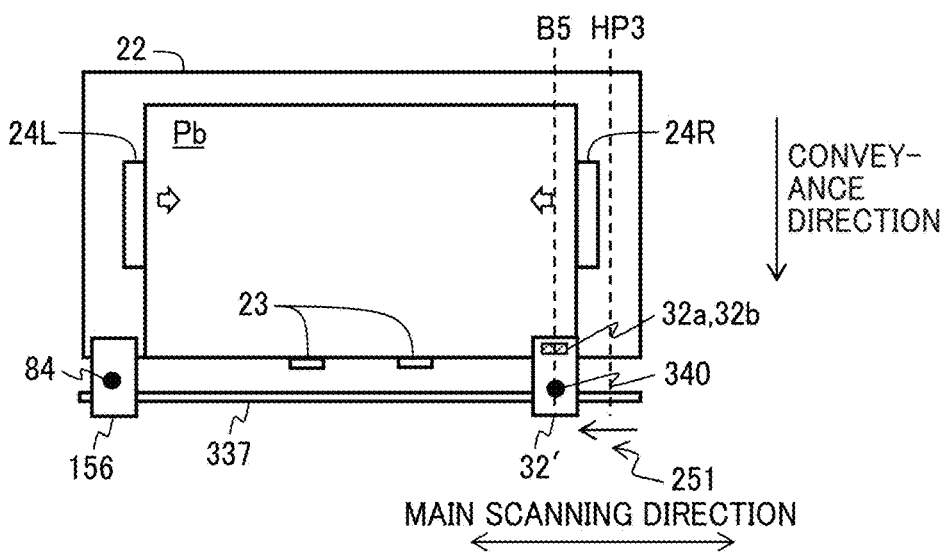
Figure 24C:
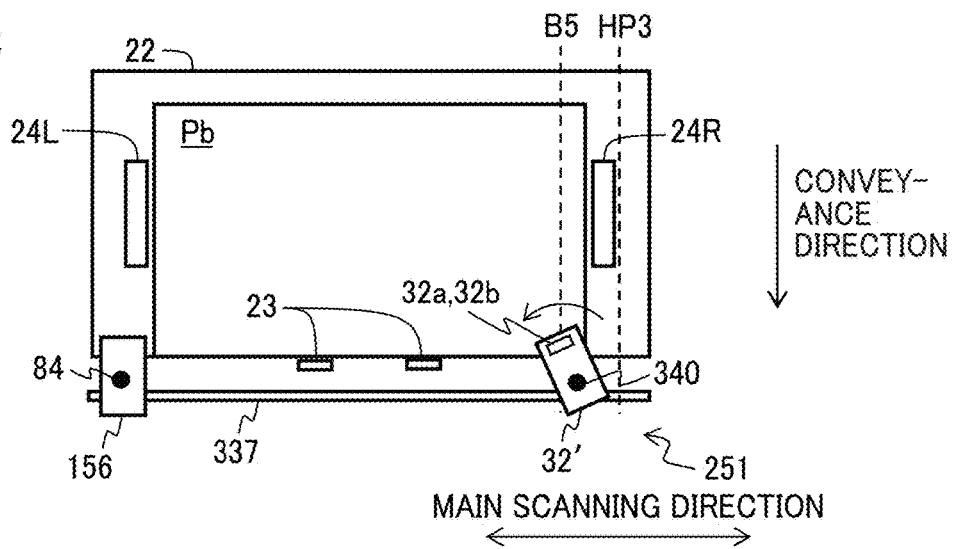

As illustrated in FIGS. 24A to 24C, the edge binder 251 includes the crimper 32'. As illustrated in FIG. 23, the crimper 32' and a stapling unit 156 are disposed downstream from the internal tray 22 in the conveyance direction. In addition, the crimper 32' and the stapling unit 156 are located to face the downstream end, in the conveyance direction, of the sheet bundle Pb placed on the internal tray 22 and is movable in the main scanning direction. Further, the crimper 32' and the stapling unit 156 are respectively rotatable in the forward and reverse directions about a crimper shaft 340 and a stapler shaft 84 both extending in the thickness direction of the sheet bundle Pb placed on the internal tray 22. In other words, the crimper 32' and the stapling unit 156 bind, at a desired angle, a desired position in the main scanning direction on the sheet bundle Pb placed on the internal tray 22 in, for example, corner oblique binding, parallel one-point binding, or parallel two-point binding.

The crimper 32' presses and deforms the sheet bundle Pb with the serrate upper crimping teeth 32a and the serrate lower crimping teeth 32b to bind the sheet bundle Pb. In the following description, such a binding way may be referred to as "crimp binding." In other words, the crimper 32' crimps and binds the sheet bundle Pb or performs the crimp binding on the sheet bundle Pb. On the other hand, the stapling unit 156 passes the staple through a binding position on the sheet bundle Pb placed on the internal tray 22 to staple the sheet bundle Pb.

Each of FIGS. 24A to 24C is a view of the internal tray 22 in the thickness direction of the sheet bundle Pb.

Figure 25:
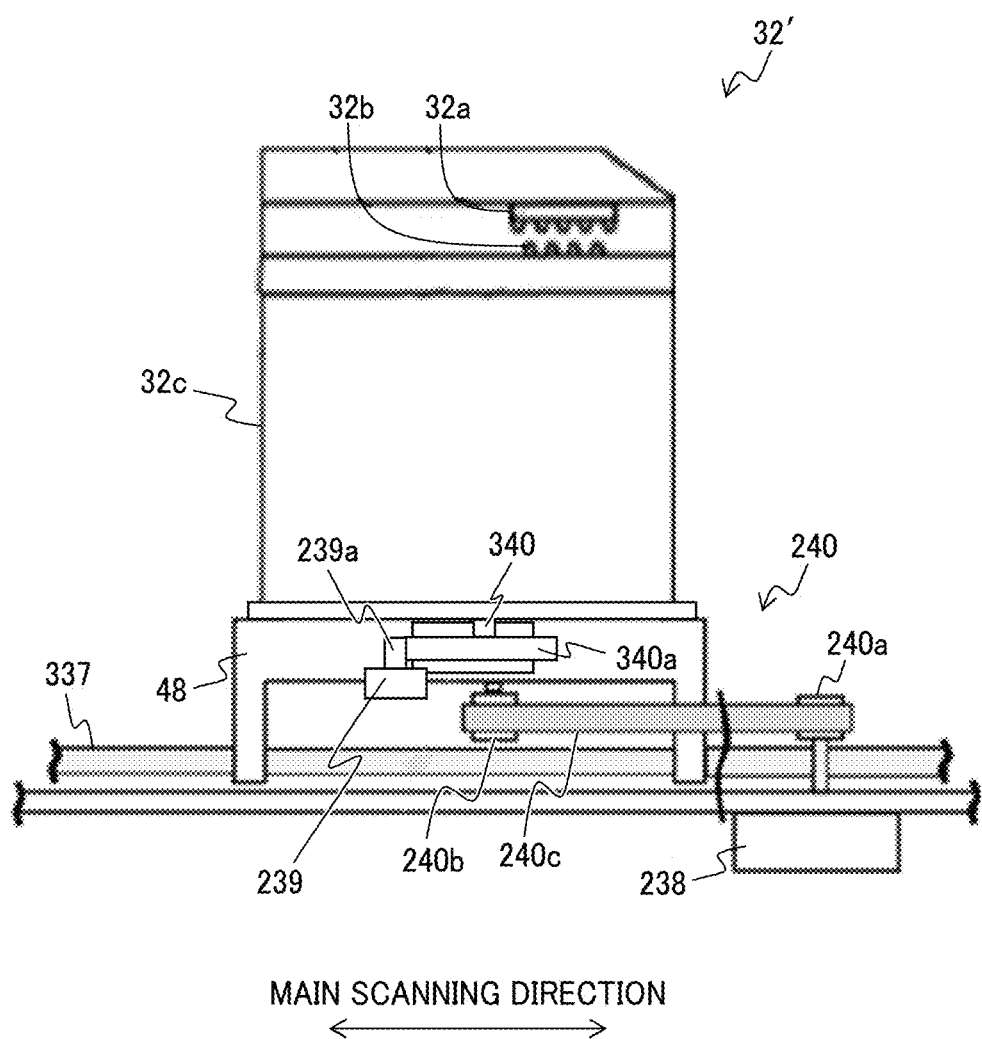
FIG. 25 is a schematic view of a downstream side of a crimper of the post-processing apparatus of FIG. 23 in a conveyance direction.

FIG. 25 is a schematic view of a downstream side of the crimper 32' in the conveyance direction.

As illustrated in FIGS. 24A to 24C, the crimper 32' and a stapling unit 156 are disposed downstream from the internal tray 22 in the conveyance direction. The crimper 32' is movable in the main scanning direction along the surface of the sheet bundle Pb placed on the internal tray 22. The crimper 32' is also rotatable in the forward and reverse directions about the crimper shaft 340 extending in the thickness direction of the sheet bundle Pb placed on the internal tray 22. Similarly, the stapling unit 156 is movable in the main scanning direction of the sheet bundle Pb and is rotatable in the forward and reverse directions about the stapler shaft 84 extending in the thickness direction of the sheet bundle Pb. Since the other configurations of the stapling unit 156 are like those of the stapling unit 155 (illustrated in FIG. 11) of the post-processing apparatus 3 according to the first embodiment, a detailed description thereof will be omitted unless otherwise required.

As illustrated in FIG. 25, the crimper 32' includes a guide rail 337 extending in the main scanning direction at a position downstream from the internal tray 22 in the conveyance direction. The crimper 32' is moved in the main scanning direction along the surface of the sheet bundle Pb placed on the internal tray 22, in other words, along the guide rail 337, by a driving force that is transmitted from a crimper movement motor 238 by a drive transmission assembly 240 including pullies 240a and 240b and a timing belt 240c. The crimper shaft 340 provided with a drive transmission gear 340a is fixed to a bottom face of the crimping frame 32c that holds the components of the crimper 32'. The crimper shaft 340 and the drive transmission gear 340a are held by the base 48 on which the crimping frame 32c is disposed, so as to be rotatable in the forward and reverse directions. The drive transmission gear 340a meshes with an output gear 239a of a crimper pivot motor 239. The crimper 32' is rotated in the forward and reverse directions on the base 48 about the crimper shaft 340 extending in the thickness direction of the sheet P placed on the internal tray 22, by a driving force transmitted from the crimper pivot motor 239 to the crimper shaft 340 via the output gear 239a and the drive transmission gear 340a. The guide rail 337, the crimper movement motor 238, the crimper pivot motor 239, the crimper shaft 340, and the drive transmission assembly 240 construct a driving assembly of the crimper 32'.

The crimper 32' is movable between a standby position HP3 as illustrated in FIG. 24A and a position where the crimper 32' faces a binding position B5 as illustrated in FIGS. 24B and 24C. The standby position HP3 is away in the main scanning direction from the sheet bundle Pb placed on the internal tray 22. For example, in FIGS. 21A to 21C,
the standby position HP is distanced to the right of the sheet bundle Pb along the main scanning direction.

The binding position B5 is a position on the sheet bundle Pb placed on the internal tray 22. However, the specific position of the binding position B5 is not limited to the position illustrated in FIGS. 24B and 24C. The binding position B5 may be one or more positions along the main scanning direction at the downstream end, in the conveyance direction, of the sheet P.

The posture of the crimper 32' changes between the parallel binding posture illustrated in FIG. 24B and the oblique binding posture illustrated in FIG. 24C. In other words, the crimper 32' is rotatable in the forward and reverse directions about the crimper shaft 340. The parallel binding posture is a posture of the crimper 32' in which the length of the upper crimping teeth 32a and the lower crimping teeth 32b (in other words, a rectangular crimp binding trace) is along the main scanning direction. The oblique binding posture is a posture of the crimper 32' in which the length of the upper crimping teeth 32a and the lower crimping teeth 32b (in other words, the rectangular crimp binding trace) is inclined with respect to the main scanning direction.

The rotational angle, which is an angle of the upper crimping teeth 32a and the lower crimping teeth 32b with respect to the main scanning direction, in the oblique binding posture is not limited to the angle illustrated in FIG. 24C. The rotational angle in the oblique binding posture may be any angle provided that the upper crimping teeth 32a and the lower crimping teeth 32b face the sheet bundle Pb placed on the internal tray 22.

Figure 31:
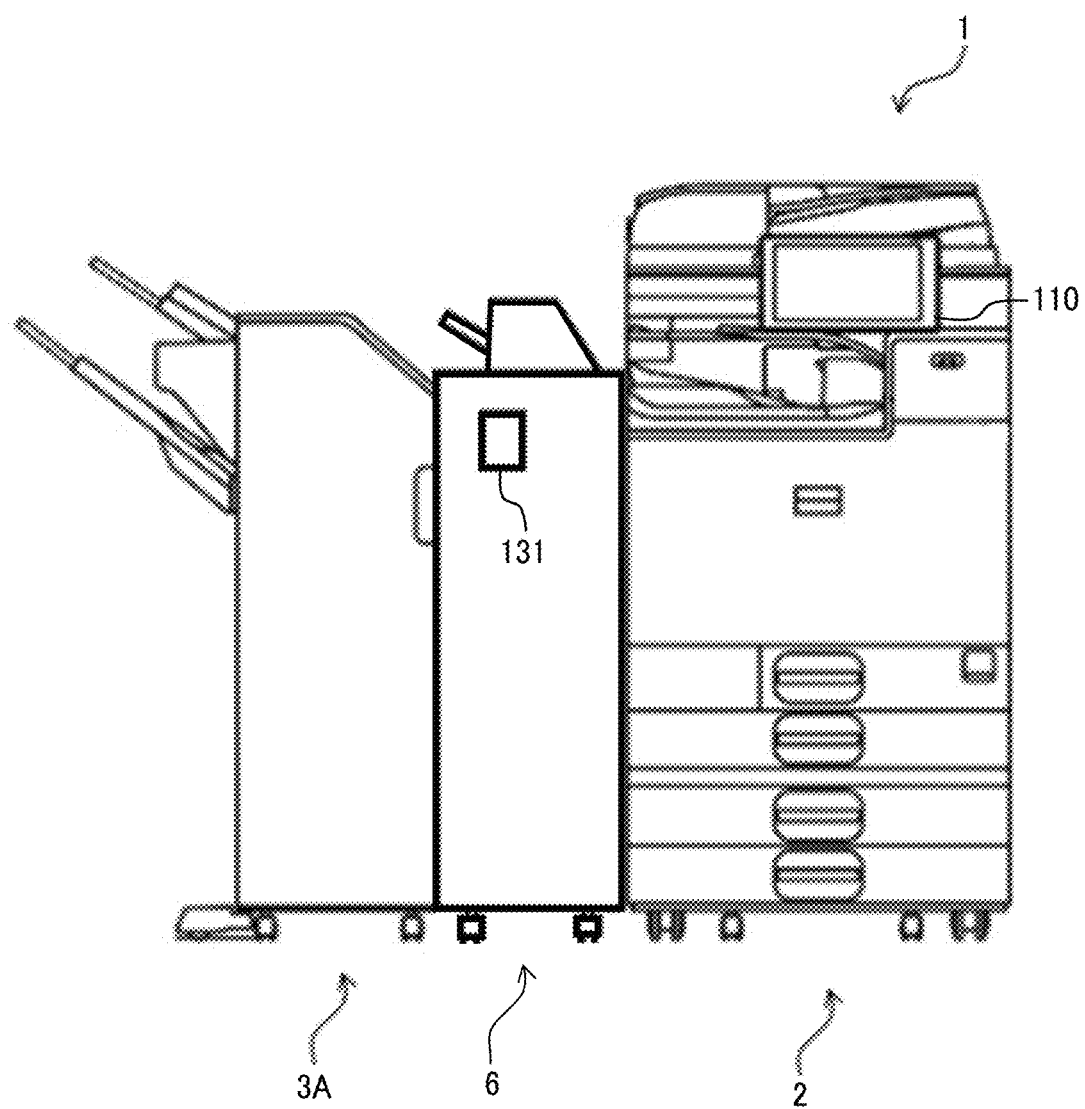
FIG. 31 is a diagram illustrating the overall configuration of an image forming system as a modification of the image forming system of FIG. 1.

The post-processing apparatus 3A includes the liquid applier 131 and a hole punch 132 serving as a processing device. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19. The liquid applier 131 and the hole punch 132 according to the present embodiment are disposed between the conveyance roller pairs 10 and 11. However, the arrangement of the liquid applier 131 and the hole punch 132 is not limited to the arrangement illustrated in FIG. 23. For example, in a case where an inserter 6 is disposed between the image forming apparatus 2 and the post-processing apparatus 3A as illustrated in FIG. 31, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 26A:
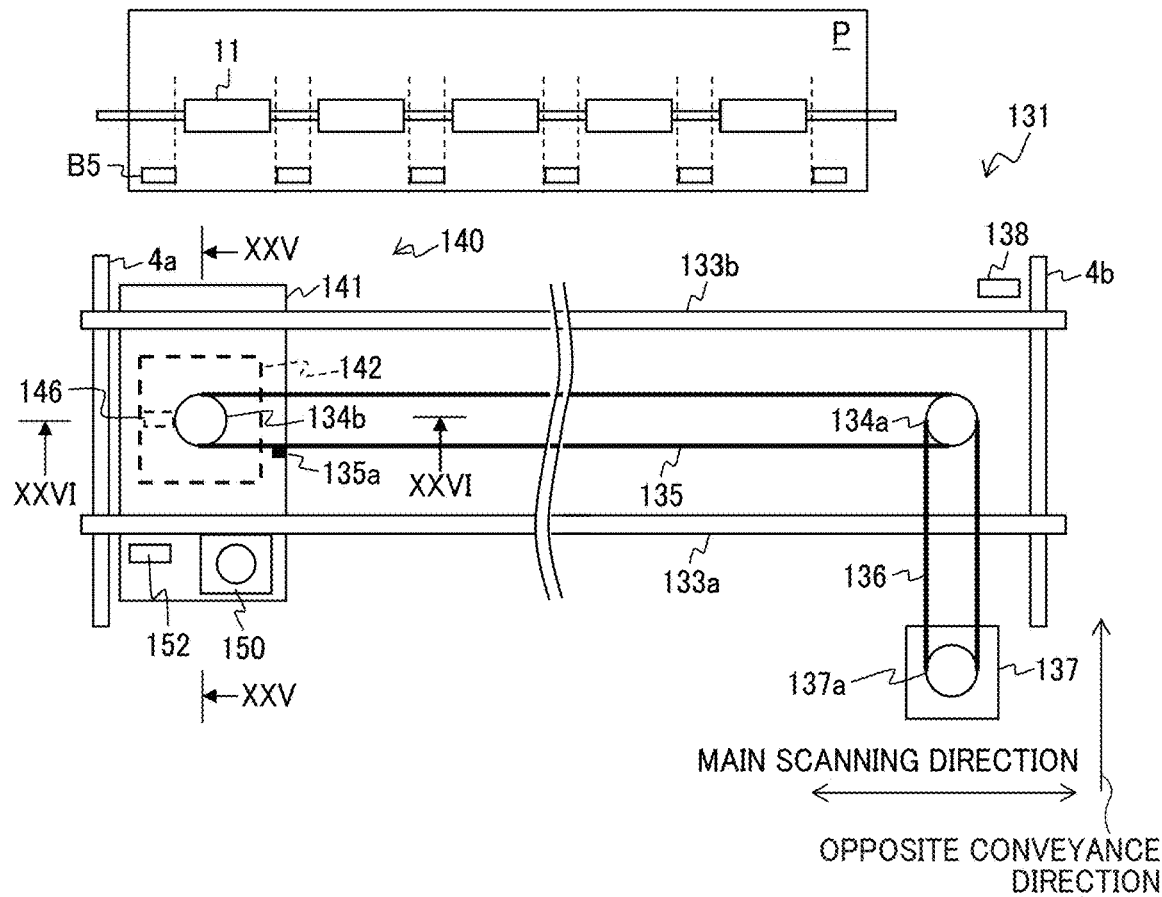
FIGS. 26A and 26B are views of a liquid applier of the post-processing apparatus of FIG. 23 in the thickness direction of the sheet.

As illustrated in FIG. 26A, the conveyance roller pair 11 is located so as not to overlap, in the main scanning direction, the liquid application position B5 on the sheet P to which the liquid is applied by a liquid application head 146 of the liquid applier 131. This is to prevent the amount of liquid at the liquid application position B5 from decreasing due to the plurality of roller pairs contacting the liquid application position B5 when the conveyance roller pair 11 conveys the sheet P. As a result, when the sheet P reaches the crimper 32' disposed downstream from the liquid applier 131 in the opposite conveyance direction, the amount of liquid at the liquid application position B5 is sufficient to maintain the binding strength. Accordingly, the binding strength of the sheet bundle Pb is prevented from decreasing due to a decrease in the amount of liquid at the liquid application position B5 (corresponding to the binding position B5) while the sheet P is conveyed.

In addition, the plurality of roller pairs of the conveyance roller pair 11 that is located so as not to overlap the liquid application position B5 on the sheet P in the main scanning direction prevents the conveying performance of the sheet P from being worse due to the adhesion of liquid to the plurality of roller pairs and further prevents a conveyance jam that may be caused by the worsened conveying performance of the sheet P.

Although only the conveyance roller pair 11 has been described above, the plurality of roller pairs of the conveyance roller pairs 14 and 15 are preferably located so as not to overlap the liquid application position B5 on the sheet P in the main scanning direction, like the plurality of roller pairs of the conveyance roller pair 11.

The liquid applier 131 applies liquid to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processing device disposed near the liquid applier 131 is not limited to the hole punch 132. Alternatively, the processing device may be an inclination corrector that corrects an inclination or skew of the sheet P that is conveyed by the conveyance roller pairs 10 and 11.

Figure 26B:
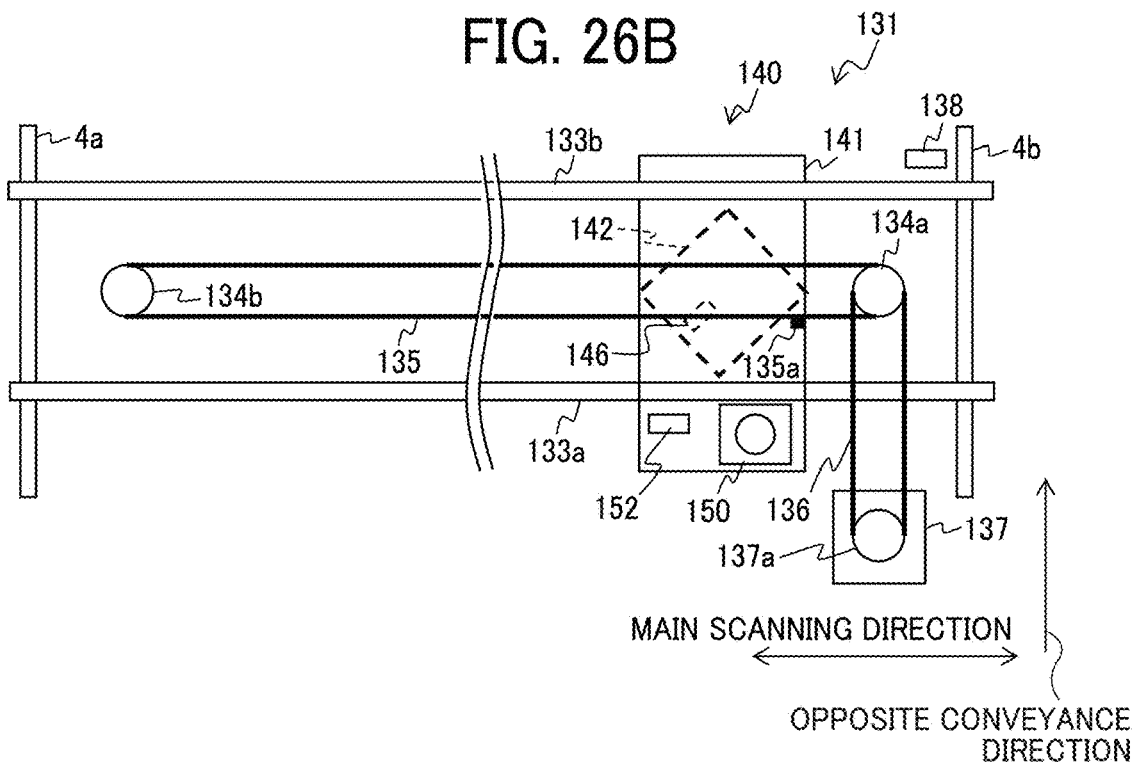

FIGS. 26A and 26B are views of the liquid applier 131 in the thickness direction of the sheet P, according to the second embodiment of the present disclosure.

Figure 27A:
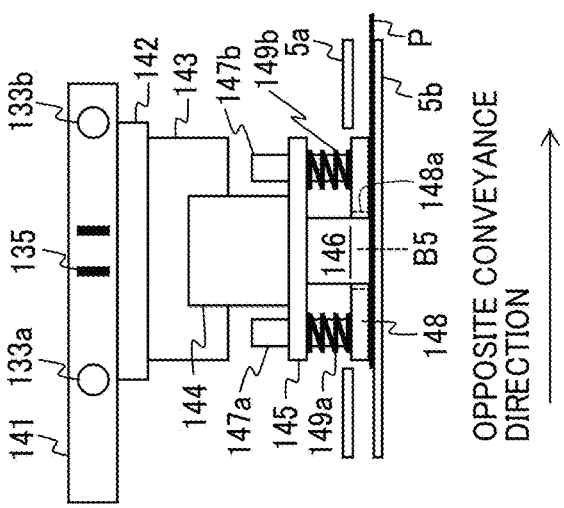
FIGS. 27A to 27C are cross-sectional views of a liquid application unit of the liquid applier taken through XXV-XXV of FIG. 26A.
Figure 27B:
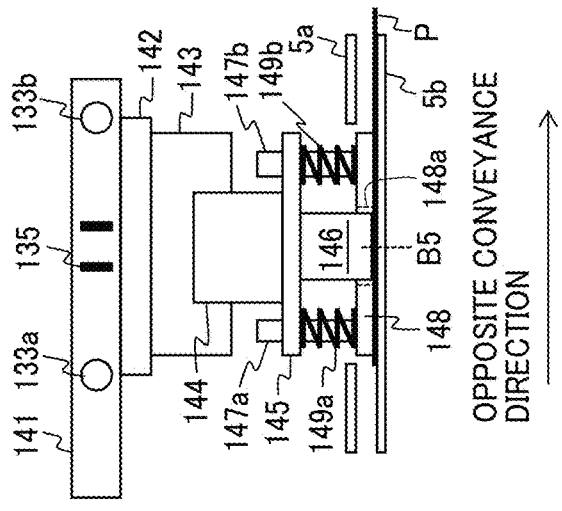
Figure 27C:
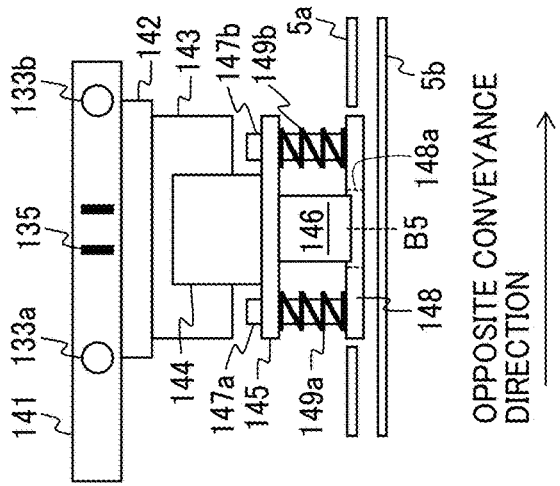

FIGS. 27A to 27C are cross-sectional views of a liquid application unit 140 of the liquid applier 131 taken through XXV-XXV of FIG. 26A.

FIGS. 28A to 28C are cross-sectional views of the liquid application unit 140 of the liquid applier 131 taken through XXVI-XXVI of FIG. 26A.

Figure 29:
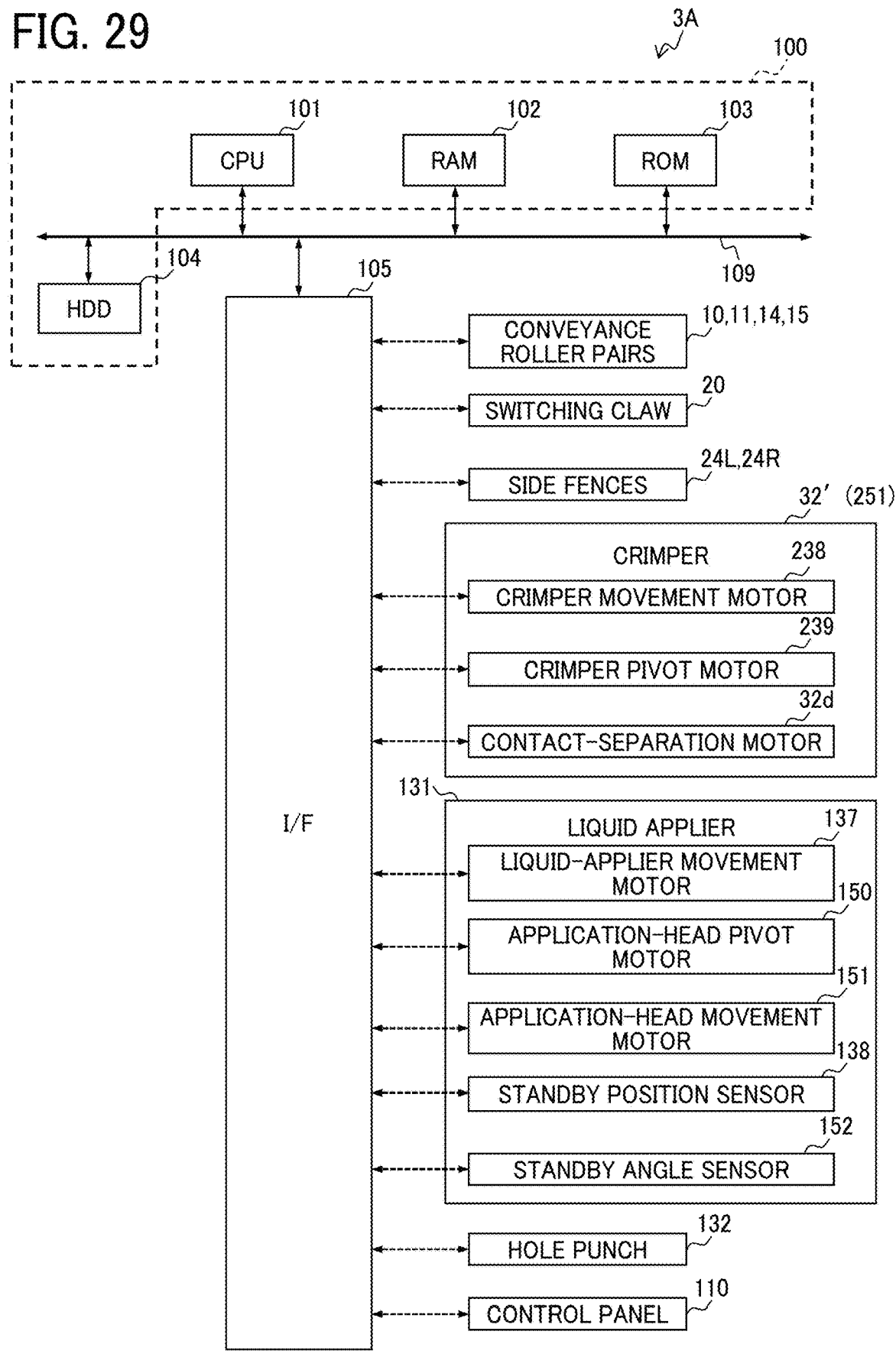
FIG. 29 is a block diagram illustrating a hardware configuration of the post-processing apparatus of FIG. 23.

As illustrated in FIGS. 26A to 28C, the liquid applier 131 includes a pair of guide shafts 133a and 133b, a pair of pulleys 134a and 134b, endless annular belts 135 and 136, a liquid-applier movement motor 137, a standby position sensor 138, which is also illustrated in FIG. 29, and the liquid application unit 140.

The guide shafts 133a and 133b, each extending in the main scanning direction, are apart from each other in the opposite conveyance direction. The pair of guide shafts 133a and 133b is supported by a pair of side plates 4a and 4b of the post-processing apparatus 3A. On the other hand, the pair of guide shafts 133a and 133b supports the liquid application unit 140 such that the liquid application unit 140 can move in the main scanning direction.

The pair of pulleys 134a and 134b is disposed between the guide shafts 133a and 133b in the opposite conveyance direction. On the other hand, the pulleys 134a and 134b are apart from each other in the main scanning direction. The pulleys 134a and 134b are supported by a frame of the post-processing apparatus 3A so as to be rotatable in the forward and reverse directions about the respective shafts extending in the thickness direction of the sheet P.

The endless annular belt 135 is entrained around the pair of pulleys 134a and 134b. The endless annular belt 135 is coupled to the liquid application unit 140 by a connection 135a. The endless annular belt 136 is entrained around the pulley 134a and a driving pulley 137a that is fixed to an output shaft of the liquid-applier movement motor 137. The liquid-applier movement motor 137 generates a driving force to move the liquid application unit 140 in the main scanning direction.

As the liquid-applier movement motor 137 rotates, the endless annular belt 136 circulates around the pulley 134a and the driving pulley 137a to rotate the pulley 134a. As the pulley 134a rotates, the endless annular belt 135 circulates around the pair of pulleys 134a and 134b. As a result, the liquid application unit 140 moves in the main scanning direction along the pair of guide shafts 133a and 133b. The liquid application unit 140 reciprocates in the main scanning direction in response to the rotation direction of the liquid-applier movement motor 137 being switched.

The standby position sensor 138 detects the arrival of the liquid application unit 140 at a standby position in the main scanning direction. The standby position sensor 138 then outputs a standby position signal indicating the detection result to the controller 100, which will be described below with reference to FIG. 29. The standby position sensor 138 is, for example, an optical sensor including a light emitting unit and a light receiving unit. The liquid application unit 140 at the standby position blocks an optical path between the light emitting unit and the light receiving unit. Then, the standby position sensor 138 outputs the standby position signal in response to the light output from the light emitting unit not being received by the light receiving unit. The specific configuration of the standby position sensor 138 is not limited to the configuration described above.

As illustrated in FIGS. 27A to 27C, the conveyance passage inside the post-processing apparatus 3A is defined by an upper guide plate 5a and a lower guide plate 5b, which are apart from each other in the thickness direction of the sheet P. The liquid application unit 140 is located to face an opening of the upper guide plate 5a. In other words, the liquid application unit 140 faces the conveyance passage through the opening of the upper guide plate 5a to face the sheet P conveyed along the conveyance passage.

As illustrated in FIGS. 26A to 28C, the liquid application unit 140 includes a base 141, a rotary bracket 142, a liquid storage tank 143, a mover 144, a holder 145, the liquid application head 146, columns 147a and 147b, a pressure plate 148, coil springs 149a and 149b, an application-head pivot motor 150, an application-head movement motor 151 illustrated in FIG. 29, and a standby angle sensor 152, which is also illustrated in FIG. 29.

The base 141 is supported by the pair of guide shafts 133a and 133b so as to be slidable in the main scanning direction. The base 141 is coupled to the endless annular belt 135 by the connection 135a. On the other hand, the base 141 supports the components of the liquid application unit 140 such as the rotary bracket 142, the liquid storage tank 143, the mover 144, the holder 145, the liquid application head 146, the columns 147a and 147b, the pressure plate 148, the coil springs 149a and 149b, the application-head pivot motor 150, the application-head movement motor 151, and the standby angle sensor 152.

The rotary bracket 142 is attached to a lower face of the base 141 so as to be rotatable in the forward and reverse directions about a shaft extending in the thickness direction of the sheet P. The rotary bracket 142 is rotated in the forward and reverse directions with respect to the base 141 by a driving force transmitted from the application-head pivot motor 150. On the other hand, the rotary bracket 142 holds the liquid storage tank 143, the mover 144, the holder 145, the liquid application head 146, the columns 147a and 147b, the pressure plate 148, and the coil springs 149a and 149b.

The standby angle sensor 152, which is illustrated in FIG. 29, detects that the rotary bracket 142 has reached a standby angle. The standby angle sensor 152 then outputs a standby angle signal indicating the detection result to the controller 100. The standby angle is, for example, an angle for the parallel binding. The standby angle sensor 152 is, for example, an optical sensor including a light emitting unit and a light receiving unit. The rotary bracket 142 at the standby angle blocks an optical path between the light emitting unit and the light receiving unit. Then, the standby angle sensor 152 outputs the standby angle signal in response to the light output from the light emitting unit not being received by the light receiving unit. The specific configuration of the standby angle sensor 152 is not limited to the configuration described above.

Note that FIG. 26A illustrates the rotary bracket 142 in a position for the parallel binding that is performed by the crimper 32' disposed downstream from the liquid applier 131 in a direction in which the sheet P is conveyed. FIG. 26B illustrates the rotary bracket 142 in a position for the oblique binding (i.e., corner binding) that is performed by the crimper 32' disposed downstream from the liquid applier 131 in the direction in which the sheet P is conveyed.

The liquid storage tank 143 stores liquid to be applied to the sheet P. The mover 144 is attached to the liquid storage tank 143 so as to be movable (for example, up and down) in the thickness direction of the sheet P. The mover 144 is moved with respect to the liquid storage tank 143 by a driving force transmitted from the application-head movement motor 151. The holder 145 is attached to a lower end of the mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (for example, sponge or fiber).

The columns 147a and 147b project downward from the holder 145 around the liquid application head 146. The columns 147a and 147b are movable relative to the holder 145 in the thickness direction. The columns 147a and 147b have respective lower ends holding the pressure plate 148. The pressure plate 148 has a through hole 148a at a position where the through hole 148a faces the liquid application head 146. The coil springs 149a and 149b are fitted around the columns 147a and 147b, respectively, between the holder 145 and the pressure plate 148. The coil springs 149a and 149b bias the columns 147a and 147b and the pressure plate 148 in a direction away from the holder 145.

As illustrated in FIGS. 27A and 28A, before the sheet P is conveyed to a position where the sheet P faces the opening of the upper guide plate 5a, the pressure plate 148 is positioned at or above the opening. Subsequently, when the sheet P that is conveyed by the conveyance roller pairs 10 and 11 stops at a position where the liquid application position B5 on the sheet P faces the opening, the application-head movement motor 151 is rotated in a first direction. As a result, the mover 144, the holder 145, the liquid application head 146, the columns 147a and 147b, the pressure plate 148, and the coil springs 149a and 149b are moved down together to allow the pressure plate 148 to contact the sheet P. Note that the liquid application position B5 corresponds to the binding position B5 to be crimped and bound by the edge binder 251, specifically, the crimper 32'.

As the application-head movement motor 151 keeps rotating in the first direction after the pressure plate 148 contacts the sheet P, the coil springs 149a and 149b are compressed to further move down the mover 144, the holder 145, the liquid application head 146, and the columns 147a and 147b. As a result, as illustrated in FIGS. 27B and 28B, a lower face of the liquid application head 146 contacts the sheet P through the through hole 148a. Then, the liquid contained in the liquid application head 146 is applied to the sheet P.

Further rotation of the application-head movement motor 151 in the first direction further strongly presses the liquid application head 146 against the sheet P as illustrated in FIGS. 27C and 28C. Accordingly, an increased amount of liquid is applied to the sheet P. In other words, the liquid applier 131 changes the pressing force of the liquid application head 146 against the sheet P to adjust the amount of liquid to be applied to the sheet P.

On the other hand, the rotation of the application-head movement motor 151 in a second direction opposite to the first direction moves up the mover 144, the holder 145, the liquid application head 146, the columns 147a and 147b, the pressure plate 148, and the coil springs 149a and 149b together. As a result, as illustrated in FIGS. 27A and 28A, the liquid application head 146 and the pressure plate 148 are separated from the sheet P. In other words, the liquid applier 131 includes the liquid application head 146 that can be separated from the sheet P.

FIG. 29 is a block diagram illustrating a hardware configuration of the post-processing apparatus 3A to control the operation of the post-processing apparatus 3A according to the second embodiment of the present disclosure.

As illustrated in FIG. 29, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an OS, various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller that is thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and the switching claw 20, the side fences 24L and 24R, the crimper movement motor 238, the crimper pivot motor 239, the contact-separation motor 32d, the liquid-applier movement motor 137, the application-head pivot motor 150, the application-head movement motor 151, the standby position sensor 138, the standby angle sensor 152, the hole punch 132, and the control panel 110 to the common bus 109. The controller 100 controls, via the I/F 105, the operations of the conveyance roller pairs 10, 11, 14, and 15, the switching claw 20, the side fences 24L and 24R, the crimper movement motor 238, the crimper pivot motor 239, the contact-separation motor 32d, the liquid-applier movement motor 137, the application-head pivot motor 150, the application-head movement motor 151, and the hole punch 132.

On the other hand, the controller 100 acquires, via the I/F 105, detection results from the standby position sensor 138 and the standby angle sensor 152. Although FIG. 29 mainly illustrates the components of the liquid applier 131 and the edge binder 251 (the crimper 32') that executes the edge binding, the components of the saddle binder 28 that executes the saddle binding are controlled by the controller 100 like the components of the liquid applier 131 and the edge binder 251 (the crimper 32') that executes the edge binding.

The control panel 110 includes an operation unit that receives instructions input by a user and a display serving as a notifier that notifies the user of information. Thus, the control panel 110 serves as an operation device. The operation unit includes, for example, hard keys and a touch panel superimposed on the display. The control panel 110 acquires information from the user through the operation unit and provides information to the user through the display.

Figure 30:
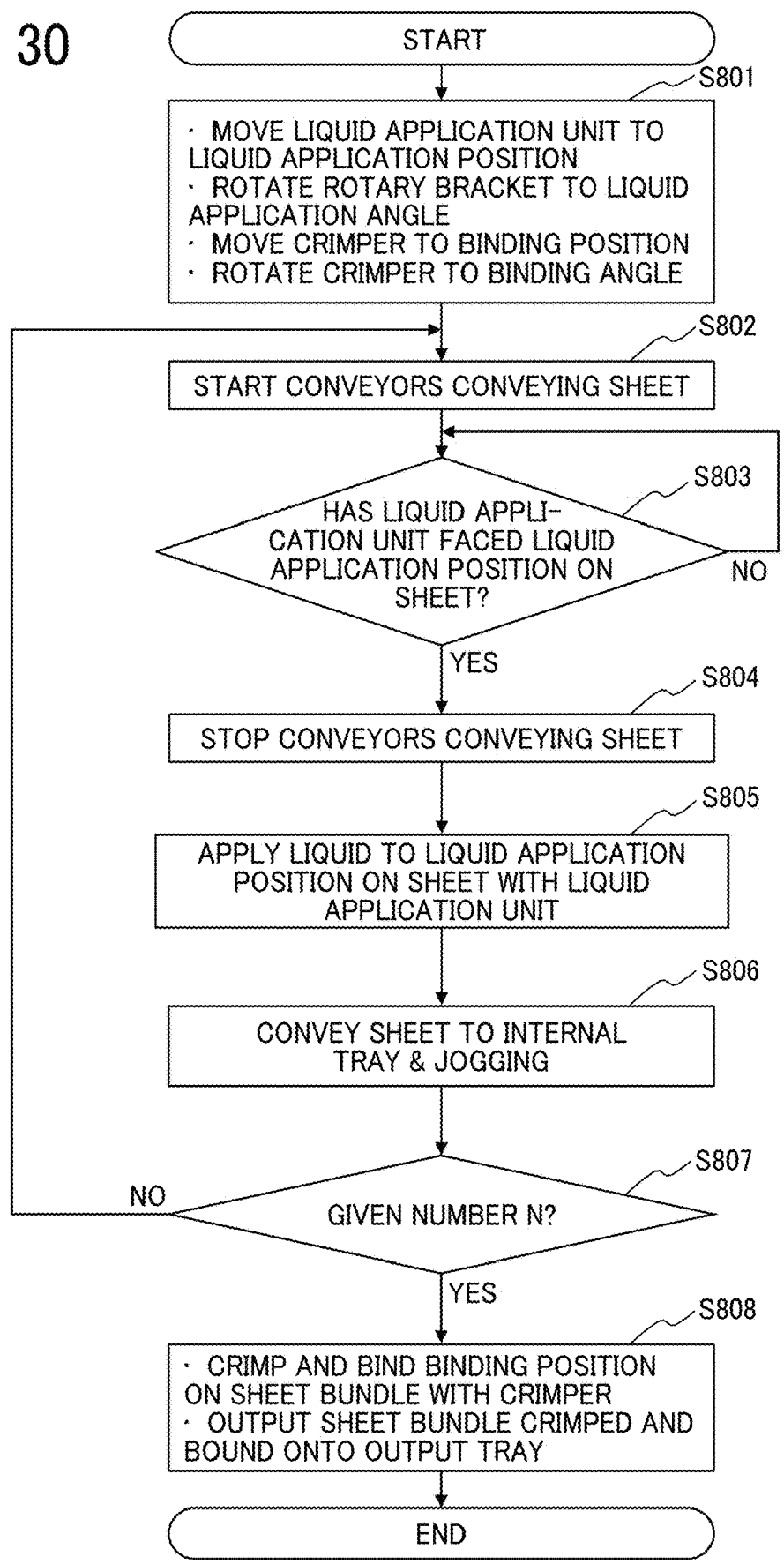
FIG. 30 is a flowchart of post-processing performed by the post-processing apparatus of FIG. 23.

FIG. 30 is a flowchart of post-processing performed by the post-processing apparatus 3A according to the second embodiment.

Specifically, FIG. 30 is a flowchart of a process to execute the one-point binding illustrated in FIGS. 24A to 24C.

For example, the controller 100 executes the post-processing illustrated in FIG. 30 when the controller 100 acquires an instruction to execute the post-processing from the image forming apparatus 2. In the following description, the instruction to execute the post-processing may be referred to as a "post-processing command." The post-processing command includes, for example, the number of sheets P of the sheet bundle Pb, the number of sheet bundles Pb to be bound, the binding position B5 (corresponding to the liquid application position B5), the angle at the binding position B5 (corresponding to an angle at the liquid application position B5), the type of binding (for example, the parallel binding or the oblique binding), and the process that is executed in parallel with the liquid application process (i.e., punching a hole in the present embodiment). In the following description, the number of sheets P of the sheet bundle Pb may be referred to as "given number N" whereas the number of sheet bundles Pb to be bound may be referred to as "requested number of copies M." Note that, at the start of the post-processing, the liquid application unit 140 is at the standby position HP3 (corresponding to the standby position HP3 illustrated in FIGS. 24A to 24C) whereas the rotary bracket 142 is held at the standby angle (corresponding to the "parallel binding posture").

First, in step S801, the controller 100 drives the liquid-applier movement motor 137 to move the liquid application unit 140 (corresponding to the liquid applier) in the main scanning direction such that liquid application head 146 moves from the standby position HP3 to a position where the liquid application head 146 can face the liquid application position B5 (corresponding to the binding position B5 illustrated in FIGS. 24B and 24C). When the type of binding that is instructed by the post-processing command is the "oblique binding," in step S801, the controller 100 also drives the application-head pivot motor 150 to rotate the rotary bracket 142 such that the liquid application head 146 rotates from the standby angle to a liquid application angle corresponding to the "oblique binding posture." It is ascertained based on a pulse signal output from a rotary encoder of the liquid-applier movement motor 137 that the liquid application head 146 has reached the position where the liquid application head 146 can face the liquid application position B5. Similarly, it is ascertained based on a pulse signal output from a rotary encoder of the application-head pivot motor 150 that the liquid application head 146 has reached the liquid application angle. When the type of binding that is instructed by the post-processing command is the "parallel binding," the controller 100 omits the aforementioned operation of rotating the rotary bracket 142. In other words, the liquid application unit 140 moves in the main scanning direction while holding the rotary bracket 142 at the standby angle.

In step S801, the controller 100 also drives the crimper movement motor 238 to move the crimper 32' from the standby position HP3 to the position where the crimper 32' can face the binding position B5 as illustrated in FIGS. 24A and 24B. When the type of binding that is instructed by the post-processing command is the "oblique binding," in step S801, the controller 100 also drives the crimper pivot motor 239 to rotate the crimper 32' from the standby angle to a binding angle corresponding to the "oblique binding posture." It is ascertained based on a pulse signal output from a rotary encoder of the crimper movement motor 238 that the crimper 32' has reached the position where the crimper 32' can face the binding position B5. Similarly, it is ascertained based on a pulse signal output from a rotary encoder of the crimper pivot motor 239 that the crimper 32' has reached the binding angle. When the type of binding that is instructed by the post-processing command is the "parallel binding," the controller 100 omits the aforementioned operation of rotating the crimper 32'. In other words, the crimper 32' moves in the main scanning direction while maintaining the standby angle.

Subsequently, in step S802, the controller 100 drives the conveyance roller pairs 10 and 11 to start conveying the sheet P on which an image is formed by the image forming apparatus 2.

In step S803, the controller 100 determines whether the liquid application position B5 on the sheet P has faced the liquid application unit 140 (more specifically, the liquid application head 146). In other words, the controller 100 determines whether the liquid application unit 140 has faced the liquid application position B5 on the sheet P. When the liquid application position B5 on the sheet P has not faced the liquid application head 146 (NO in step S803), the controller 100 repeats the determination in step S803. In other words, the controller 100 continues driving the conveyance roller pairs 10 and 11 until the liquid application position B5 on the sheet P faces the liquid application head 146.

When the liquid application position B5 on the sheet P has faced the liquid application head 146 (YES in step S803), in step S804, the controller 100 stops the conveyance roller pairs 10 and 11. It is ascertained based on a pulse signal output from a rotary encoder of a motor that drives the conveyance roller pairs 10 and 11 that the liquid application position B5 on the sheet P has faced the liquid application head 146.

In step S805, the controller 100 causes the liquid application unit 140 to execute the process to apply liquid to the liquid application position B5 on the sheet P. More specifically, the controller 100 rotates the application-head movement motor 151 in the first direction to bring the liquid application head 146 into contact with the liquid application position B5 on the sheet P. The controller 100 changes the pressing force of the liquid application head 146 (in other words, the amount of rotation of the application-head movement motor 151) depending on the amount of liquid to be applied to the sheet P.

The amount of liquid to be applied to the sheet P may be the same for all the sheets P of the sheet bundle Pb or may be different for each sheet P. For example, the controller 100 may apply a decreased amount of liquid to the sheet P conveyed later. The amount of rotation of the application-head movement motor 151 may be ascertained based on a pulse signal output from a rotary encoder of the application-head movement motor 151.

Subsequently, in step S806, the controller 100 drives the conveyance roller pairs 10, 11, 14, and 15 to place the sheet P on the internal tray 22. In step S806, the controller 100 also moves the side fences 24L and 24R to align the position, in the main scanning direction, of the sheet P or the sheet bundle Pb placed on the internal tray 22. In short, the controller 100 performs so-called jogging.

Subsequently, in step S807, the controller 100 determines whether the number of sheets P placed on the internal tray 22 has reached the given number N instructed by the post-processing command.

When the controller 100 determines that the number of sheets P placed on the internal tray 22 has not reached the given number N (NO in step S807), the controller 100 executes the operations of steps S802 to S806 again.

When the controller 100 determines that the number of sheets P placed on the internal tray 22 has reached the given number N (YES in step S807), in step S808, the controller 100 causes the crimper 32' to crimp and bind the binding position B5 (corresponding to the liquid application position B5) on the sheet bundle Pb to which the liquid has been applied by the liquid application unit 140.

In step S808, the controller 100 also rotates the conveyance roller pair 15 to output the sheet bundle Pb thus crimped and bound to the second output tray 26.

Then, the controller 100 drives the liquid-applier movement motor 137 to move the liquid application unit 140 to the standby position HP3 and drives the crimper movement motor 238 to move the crimper 32' to the standby position HP3.

When the post-processing command includes an instruction to form a plurality of sheet bundles Pb (i.e., the requested number of copies M), the controller 100 determines whether the number of sheet bundles Pb output to the second output tray 26 has reached the requested number of copies M as in step S909 in FIG. 14. When the controller 100 determines that the number of the sheet bundles Pb output to the second output tray 26 has not reached the requested number of copies M, the controller 100 repeats the operations of steps S802 to S808. When the controller 100 determines that the number of sheet bundles Pb output to the second output tray 26 has reached the requested number of copies M, the controller 100 moves the liquid application unit 140 and the crimper 32' to the standby position HP3 as described above.

The embodiments of the present disclosure are applied to the edge binder 25 that executes the edge binding as described above. However, the embodiments of the present disclosure may be applied to the saddle binder 28 that executes the saddle binding.

The control method described above may be implemented by, for example, a program. In other words, the control method may be executed by a computer causing an arithmetic device, a storage device, an input device, an output device, and a control device to operate in cooperation with each other based on a program. The program may be written in, for example, a storage device or a storage medium and distributed. Alternatively, the program may be distributed through, for example, an electric communication line.

Now, a description is given of some aspects of the present disclosure.

According to a first aspect, a medium processing apparatus includes a liquid applier, a post-processing device, and a controller. The liquid applier includes a liquid application member that applies liquid to a part of a medium, which is at least one medium. The post-processing device binds a bundle of media including the medium to which the liquid is applied by the liquid applier. The controller changes, according to a binding condition for the post-processing device, at least one of an amount of movement of the liquid application member toward the medium and a contact time during which the liquid application member is in contact with the medium.

According to a second aspect, in the medium processing apparatus of the first aspect, the binding condition indicates the number of media of the bundle of media or the thickness of the medium.

According to a third aspect, in the medium processing apparatus of the first or second aspect, the controller increases the amount of movement or the contact time as the number of media of the bundle of media increases or as the thickness of the medium increases.

According to a fourth aspect, the medium processing apparatus of the first to third aspects further includes an operation device that receives an operation of selecting one of a productivity priority mode in which productivity of the post-processing device is prioritized and a binding-strength priority mode in which binding strength exerted by the post-processing device is prioritized. The controller sets the contact time to be shorter when the productivity priority mode is selected through the operation device than when the binding-strength priority mode is selected.

According to a fifth aspect, in the medium processing apparatus according to any one of the first to fourth aspects, the controller increases the amount of movement as the contact time decreases.

According to a sixth aspect, in the medium processing apparatus according to any one of the first to fifth aspects, the binding condition indicates the number of liquid application regions on the medium to which the liquid is applied by the liquid applier or the area of a liquid application region.

According to a seventh aspect, the medium processing apparatus according to any one of the first to sixth aspects further includes a receptacle on which the medium is placed. The receptacle is inclined downward in a conveyance direction of the medium. The liquid application member has an end face to contact the medium placed on the receptacle. The end face is inclined to be farther from the medium placed on the receptacle downstream in the conveyance direction.

According to an eighth aspect, the medium processing apparatus according to any one of the first to sixth aspects further includes a receptacle on which the medium is placed. The liquid application member has an end face to contact the medium placed on the receptacle. The end face includes a first contact surface and a second contact surface farther from the medium than the first contact surface. The controller brings the liquid application member into contact with the medium placed on the receptacle by a first amount of movement to bring the first contact surface out of the first contact surface and the second contact surface into contact with the medium. The controller brings the liquid application member into contact with the medium placed on the receptacle by a second amount of movement greater than the first amount of movement to bring both the first contact surface and the second contact surface into contact with the medium.

According to a ninth aspect, the medium processing apparatus according to any one of the first to sixth aspects further includes a receptacle on which the medium is placed. The liquid application member has an end face convex to the medium to contact the medium placed on the receptacle. The controller changes the amount of movement of the liquid application member toward the medium placed on the receptacle to change the area of contact between the liquid application member and the medium.

According to a tenth aspect, the medium processing apparatus according to any one of the first to ninth aspects further includes a receptacle, a moving assembly, a first liquid storage, a second liquid storage, and a liquid detector. The medium is placed on the receptacle. The moving assembly moves the liquid applier and the post-processing device in a main scanning direction orthogonal to a conveyance direction of the medium, along a surface of the medium placed on the receptacle. The first liquid storage is disposed in the liquid applier to store the liquid to be supplied to the liquid application member. The second liquid storage stores the liquid to be supplied to the first liquid storage. The liquid detector detects an amount of the liquid stored in the first liquid storage. The controller supplies the liquid from the second liquid storage to the first liquid storage in response to the amount of the liquid detected by the liquid detector falling below a lower limit value.

According to an eleventh aspect, the medium processing apparatus according to any one of the first to tenth aspects, the liquid application member is made of an elastically deformable material.

According to a twelfth aspect, an image forming system includes an image forming apparatus and the medium processing apparatus of any one of the first to eleventh aspects. The image forming apparatus forms an image on a medium. The medium processing apparatus binds a plurality of media, including the medium, on each of which the image is formed by the image forming apparatus.

According to one aspect of the present disclosure, a medium processing apparatus that performs the crimp binding after applying liquid to media adjusts the liquid application amount with a simple and inexpensive configuration.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. It is therefore to be understood that the disclosure of this patent specification may be practiced otherwise by those skilled in the art than as specifically described herein and such modifications and alternatives are within the technical scope of the appended claims.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A medium processing apparatus comprising:
a liquid applier including a liquid application member configured to apply liquid to a part of a medium, the medium being at least one medium;
a post-processing device configured to bind a bundle of media including the medium to which the liquid is applied by the liquid applier; and
circuitry configured to
change an amount of the liquid to be applied to the medium based on a number of media in the bundle of media, and
change, according to the number of media in the bundle of media, at least one of an amount of movement of the liquid application member toward the medium or a contact time during which the liquid application member is in contact with the medium.

2. The medium processing apparatus according to claim 1, wherein the circuitry is configured to change at least one of an amount of movement of the liquid application member toward the medium, a contact time during which the liquid application member is in contact with the medium, or an area of contact between the liquid application member and the medium, to change an amount of liquid to be applied to the medium.

3. The medium processing apparatus according to claim 1, wherein the circuitry is configured to increase the amount of movement or the contact time as the number of media of the bundle of media increases.

4. The medium processing apparatus according to claim 1, wherein the liquid application member is made of an elastically deformable material.

5. The medium processing apparatus according to claim 1, wherein the circuitry is configured to change, according to a determination based on both a media thickness and the number of media in the bundle of media, the amount of the liquid to be applied to the medium.

6. An image forming system comprising:
an image forming apparatus configured to form an image on a medium; and
the medium processing apparatus according to claim 1, the medium processing apparatus being configured to bind a plurality of media, including the medium, on each of which the image is formed by the image forming apparatus.

7. A medium processing apparatus comprising:
a liquid applier including a liquid application member configured to apply liquid to a part of a medium, the medium being at least one medium;

a post-processing device configured to bind a bundle of media including the medium to which the liquid is applied by the liquid applier;

circuitry configured to change, according to a binding condition for the post-processing device, at least one of an amount of movement of the liquid application member toward the medium a contact time during which the liquid application member is in contact with the medium; and operation device configured to receive an operation of selecting a binding-strength priority mode in which binding strength exerted by the post-processing device is prioritized, wherein the circuitry is configured to increase an amount of liquid to be applied to the medium when the binding-strength priority mode is selected.

8. The medium processing apparatus of claim 7, wherein, based on the binding-strength priority mode being selected, the circuitry is configured to increase at least one of an amount of movement of the liquid application member toward the medium, a contact time during which the liquid application member is in contact with the medium, or an area of contact between the liquid application member and the medium, to increase the amount of liquid to be applied to the medium.

9. The medium processing apparatus according to claim 7, wherein the circuitry is configured to change, according to a determination based on both a media thickness and a number of media in the bundle of media, the amount of the liquid to be applied to the medium.

10. An image forming system comprising:
an image forming apparatus configured to form an image on a medium; and
the medium processing apparatus according to claim 7, the medium processing apparatus being configured to bind a plurality of media, including the medium, on each of which the image is formed by the image forming apparatus.

11. A medium processing apparatus, comprising:
a liquid applier including a liquid application member configured to apply liquid to a part of a medium, the medium being at least one medium;
a post-processing device configured to bind a bundle of media including the medium to which the liquid is applied by the liquid applier; and
circuitry configured to change an area of contact between the liquid application member and the medium according to a binding condition for the post-processing device.

12. The medium processing apparatus according to claim 11, further comprising a receptacle on which the medium is placed, the receptacle being inclined downward in a conveyance direction of the medium,
wherein the liquid application member has an end face to contact the medium placed on the receptacle,
wherein the end face is inclined to be farther from the medium placed on the receptacle downstream in the conveyance direction, and the circuitry is configured to change an amount of movement of the liquid application member to change the area of contact between the liquid application member and the medium.

13. The medium processing apparatus according to claim 11, further comprising a receptacle on which the medium is placed,
wherein the liquid application member has an end face to contact the medium placed on the receptacle, the end face including a first contact surface and a second contact surface farther from the medium than the first contact surface,
wherein the circuitry is configured to bring the liquid application member into contact with the medium placed on the receptacle by a first amount of movement to bring the first contact surface into contact with the medium, and
wherein the circuitry is configured to bring the liquid application member into contact with the medium placed on the receptacle by a second amount of movement greater than the first amount of movement to bring both the first contact surface and the second contact surface into contact with the medium, and
the circuitry is configured to change an amount of movement of the liquid application member to change the area of contact between the liquid application member and the medium.

14. The medium processing apparatus according to claim 11, further comprising a receptacle on which the medium is placed,
wherein the liquid application member has an end face convex to the medium to contact the medium placed on the receptacle, and
wherein the circuitry is configured to change an amount of movement of the liquid application member toward the medium placed on the receptacle to change the area of contact between the liquid application member and the medium.

15. The medium processing apparatus according to claim 11, wherein the circuitry is configured to change an area of contact between the post-processing device and the medium in the area of contact between the liquid application member and the medium.

16. The medium processing apparatus according to claim 11,
wherein the liquid application member is made of an elastically deformable material.

17. The medium processing apparatus according to claim 11, wherein the circuitry is configured to change, according to a determination based on both a media thickness and a number of media in the bundle of media, an amount of the liquid to be applied to the medium.

18. An image forming system comprising:
an image forming apparatus configured to form an image on a medium; and
the medium processing apparatus according to claim 11, the medium processing apparatus being configured to bind a plurality of media, including the medium, on each of which the image is formed by the image forming apparatus.

* * * * *